(12) United States Patent
Kusuda et al.

(10) Patent No.: US 8,628,397 B2
(45) Date of Patent: Jan. 14, 2014

(54) MULTIPLAYER COMPETITION GAME DEVICE, GAME MACHINE AND GAME PROGRAM

(75) Inventors: Kazuhiro Kusuda, Tokyo (JP); Hirokatsu Yamaguchi, Tokyo (JP); Yukihiro Osaki, Tokyo (JP); Shinichi Ishii, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1713 days.

(21) Appl. No.: 10/581,087

(22) PCT Filed: Nov. 30, 2004

(86) PCT No.: PCT/JP2004/017793
§ 371 (c)(1),
(2), (4) Date: May 31, 2006

(87) PCT Pub. No.: WO2005/058441
PCT Pub. Date: Jun. 30, 2005

(65) Prior Publication Data
US 2008/0287175 A1    Nov. 20, 2008

(30) Foreign Application Priority Data

| Dec. 1, 2003 | (JP) | 2003-402285 |
|---|---|---|
| Dec. 1, 2003 | (JP) | 2003-402307 |
| Dec. 1, 2003 | (JP) | 2003-402313 |
| Dec. 1, 2003 | (JP) | 2003-402322 |
| Dec. 1, 2003 | (JP) | 2003-402329 |

(51) Int. Cl.
*A63F 9/00* (2006.01)
(52) U.S. Cl.
USPC .......................................................... 463/17

(58) Field of Classification Search
USPC ...................................................... 463/17, 42
See application file for complete search history.

(56) References Cited

U.S. PATENT DOCUMENTS 5,879,005 A * 3/1999 Baca .............................. 273/255
6,132,315 A * 10/2000 Miyamoto et al. .............. 463/43
(Continued)

FOREIGN PATENT DOCUMENTS

| JP | 5-7666 A | 1/1993 |
|---|---|---|
| JP | 5-237216 A | 9/1993 |

(Continued)

OTHER PUBLICATIONS

Shukan Fami Tsu, Dec. 27, 2002, No. 17, No. 52, whole No. 732, pp. 141-146.

(Continued)

*Primary Examiner* — Seng H Lim
(74) *Attorney, Agent, or Firm* — Birch, Stewart, Kolasch & Birch, LLP.

(57) ABSTRACT

After the offensive selection element images are moved along the joining direction to the offensive selection image display area (70c) and displayed one after another in an alternating manner thereon, based on the control of the offensive selector (73), the images are halted and displayed in a matrix-wise arrangement. The character property (79) and physical strength value (72) are stored in association with the character, and the character corresponding to a physical strength value (72) equal to or lower than a predetermined final value is determined to be the loser, the physical strength value of the attacked character being calculated using the offensive value and a formula corresponding to the character property and the offensive type. Furthermore, the image of the character determined to be the loser by the winner/loser determinator (76) is varied.

7 Claims, 11 Drawing Sheets

(56) References Cited

U.S. PATENT DOCUMENTS

| | | | |
|---|---|---|---|
| 6,159,100 A * | 12/2000 | Smith | 463/42 |
| 6,165,068 A * | 12/2000 | Sonoda et al. | 463/8 |
| 6,213,871 B1 * | 4/2001 | Yokoi | 463/7 |
| 6,220,964 B1 * | 4/2001 | Miyamoto et al. | 463/43 |
| 6,354,940 B1 * | 3/2002 | Itou et al. | 463/8 |
| 6,375,566 B1 * | 4/2002 | Yamada | 463/1 |
| 6,482,092 B1 * | 11/2002 | Tajiri et al. | 463/43 |
| 6,540,606 B1 * | 4/2003 | Matsukata | 463/1 |
| 6,595,858 B1 * | 7/2003 | Tajiri et al. | 463/31 |
| 6,652,384 B2 * | 11/2003 | Kondo et al. | 463/54 |
| 6,764,402 B2 * | 7/2004 | Tajiri et al. | 463/43 |
| 7,357,719 B2 * | 4/2008 | Yamato et al. | 463/43 |
| 7,371,177 B2 * | 5/2008 | Ellis et al. | 463/42 |
| 2001/0029202 A1 * | 10/2001 | Kondo et al. | 463/31 |
| 2002/0061780 A1 * | 5/2002 | Matsuno et al. | 463/42 |
| 2002/0137563 A1 * | 9/2002 | Kawazu | 463/31 |
| 2002/0142834 A1 * | 10/2002 | Sobue | 463/30 |
| 2003/0008714 A1 * | 1/2003 | Tajiri et al. | 463/43 |
| 2004/0162136 A1 * | 8/2004 | Yamato et al. | 463/29 |
| 2005/0059483 A1 * | 3/2005 | Borge | 463/29 |
| 2005/0151320 A1 * | 7/2005 | Gress | 273/292 |
| 2005/0156382 A1 * | 7/2005 | Gress | 273/298 |
| 2006/0046848 A1 * | 3/2006 | Abe et al. | 463/37 |
| 2006/0154711 A1 * | 7/2006 | Ellis et al. | 463/1 |
| 2007/0087835 A1 * | 4/2007 | Van Luchene | 463/43 |
| 2008/0039169 A1 * | 2/2008 | Harris et al. | 463/9 |
| 2008/0287196 A1 * | 11/2008 | Miki et al. | 463/42 |

FOREIGN PATENT DOCUMENTS

| | | |
|---|---|---|
| JP | 8-196746 A | 8/1996 |
| JP | 8-332282 A | 12/1996 |
| JP | 11-146936 A | 6/1999 |
| JP | 2001-120716 A | 5/2001 |
| JP | 2002-200334 A | 7/2002 |
| JP | 2002-253863 A | 9/2002 |
| JP | 2003-199877 A | 7/2003 |
| JP | 2003-275457 A | 9/2003 |

OTHER PUBLICATIONS

Dengekio, Nov. 1, 2002, vol. 10, No. 14, whole No. 145, pp. 44-45.
Shukan Fami Tsu, No. 17, No. 52, whole No. 732, pp. 141-146, (Dec. 27, 2002).
The Amusement Industry, vol. 31, 11 Gatsugo, pp. 81 (lower left column), (Oct. 26, 2002).
Final Fantasy VII Kaitai Shinsyo, 4th print, Ascii Corp., p. 101 (upper column), p. 197 (lower right column), (Jun. 20, 1997).
Dengekio, vol. 10, No. 14, whole No. 145, pp. 44-45, (Nov. 1, 2002).
Dengeki Game Cube, vol. 3, No. 7, p. 10, (Jun. 1, 2003).

* cited by examiner

MULTIPLAYER COMPETITION GAME DEVICE, GAME MACHINE AND GAME PROGRAM

TECHNICAL FIELD

The present invention relates to a multiplayer competition game device which performs multiplayer competition games by displaying symbols in their varying or halted state in an area for displaying such symbols. The present invention also relates to a game machine and a game program which display symbols in their varying or halted state in an area for displaying symbols, while using a table including data of a plurality of types of symbols. The present invention also relates to a game machine or a game program which makes up to display a dividend list data representing a plurality of prize-winning sequences and the dividend for realization of each of the prize-winning sequences, based on the data of the plurality of types of symbols which can be displayed on the display area. The present invention also relates to a game machine or a game program which performs an ordinary game under a condition that a first numerical data representing a redeemable value has been input or otherwise performs a special game under a condition that a second numerical data has been input. The present invention also relates to a game machine or a game program which performs multiplayer competition games in which a plurality of players compete to capture one or more characters.

BACKGROUND ART

Conventionally, slot game machines incorporating the essence of multiplayer competition games are known. For example, a slot game machine disclosed in Japanese Patent Application Laid-Open No. Hei 8-196746 displays multi-digit numerals in a first and a second numerical display units, varies the numerals randomly before fixing the numerals using a first and a second fixing unit, and calculates the sum of each digit of the fixed numerals using a first and a second adder. Then the sum of the digits of the first numerical display unit is compared with that of the second numerical display unit to determine which one is larger, by using a quantity comparator. A point mark of the player determined to have the larger sum according to the above determination is displayed on the point mark display unit. The player whose point mark reached a predetermined number is then determined to be the winner, by a first determinator. On the other hand, if it is determined by a second determinator that the fixed numerals on both the first and the second display units consist of a specific combination, the player who acquired the combination is determined to be the winner, regardless of the point mark.

In addition, the playing card game board disclosed in Japanese Patent Application Laid-Open No. Hei 5-7666 is provided with a start button, a stop button, as well as a dealer display screen and a player display screen. When operating the start button, the dealer display screen and the player display screen respectively display the playing cards in a randomly alternating state. Now, when operating the stop button, the alternation of the cards is stopped and the dealer display screen and the player display screen each displays a specific card thereon. Then, with a predetermined number of points deducted as bets, dividend points are added to the winner for each of the games. The difference between the numerical values of the dealer's card and the player's card is displayed on the player's current point display screen as the winning or the losing point.

Additionally, a conventional slot game machine employing so-called video reels using virtual reels having symbols such as numerals or patterns preliminarily arranged thereon to be displayed, just as physical reels are used. Also, when halting a virtual reel being rotated to display it at rest, the virtual reel is stopped with a sliding effect suitably generated according to the lottery result based on the lottery table, at a position slightly displaced from where a physical reel is supposed to stop due to inertia, so that the target symbol is displayed at rest.

In addition, conventional game machines such as slot machines have a plurality of reels, each of which displays symbols in their varying or halted state. If the symbols align in a specific sequence, a prize is determined and the player is given with a dividend accordingly. For such a slot machine, there is provided, at the belly door for example, a dividend list listing a plurality of prize-winning sequences and corresponding dividends for the realization of the sequences. Provision of such a dividend list allows the player to think about the prize-winning sequence he or she should aim at, or make sure how much dividend can be expected as a result of the game by realization of the prize-winning sequences.

Also with conventional game machines, numeric data of tokens which represent redeemable value is treated as credit. When playing a game, the player bets a certain amount of credit and acquires credit as a dividend according to the result of the game. Also, with game machines historically known for performing multi-player games, the players consume their credit as entry fee and engages their characters to fight against each other during the game, and the player who wins acquires a certain amount of credit whereas the player who is defeated loses the credit he or she had bet. Such credit may be paid off as redeemable objects such as tokens by the player's operation of the payout button.

[Patent Literature 1] Japanese Patent Application Laid-Open No. Hei 8-196746
[Patent Literature 2] Japanese Patent Application Laid-Open No. Hei 5-7666

DISCLOSURE OF THE INVENTION

However, with the multi-player games known in the prior art, the images being displayed are monotonous and the games have a low strategic characteristic, since the games are played based on cards having characters portrayed thereon. In addition, there has not been any known game machine which can display a plurality of types of symbols in their varying or halted states in a plurality of display areas, and can perform multi-player games in which characters are engaged in competition against each other. By implementing such games, amusement of the games can be enhanced, stirring up the player's interest.

Additionally, with a slot game machine such as mentioned above, the lottery table for determining the symbol to be terminated and displayed may be changed, in which case the above-mentioned sliding effect can increase because the symbol on the virtual reel is fixed, whereby the reel does not intuitively seem to be stopping naturally when being controlled to stop, which may lead to lack of reality in simulating rotation/termination of a physical reel.

In addition, although it may be preferable to inform the players when the lottery table is changed such that a certain sequence can be easily aligned, it has not been realistic with conventional game machines having a limited size display screen because an additional display area must be provided to appropriately display the content of the changed lottery table.

Additionally, with a conventional game machine, the dividend list representing a plurality of prize-winning sequences and the dividend expected by realization of the sequences is preliminarily determined, with the content of the table not allowed to be changed optionally. Thus, the dividend for the realization of a prize-winning sequence has been uniform with little flexibility. It is considered that a game which stirs up the player's interest can be realized by providing more flexibility to such uniformity.

Additionally, with a conventional game machine, if a player's credit runs out while playing a competition game, the game must be temporarily interrupted for the player to make additional bet. Also, if the player does not have sufficient tokens for an additional bet, the game must be stopped. This is an adverse affect which may lessen the interest of a player who wants to continue the game because the game has to be stopped due to circumstances with regard to credit of his or her opponent.

In addition, the conventionally known multiplayer competition games have a low strategic characteristic, since the games are played based on cards having characters portrayed thereon. Also, there has not been any known game in which a plurality of characters make up a party to compete. Furthermore, there has not been any known game machine which displays symbols in their varying or halted state in a plurality of display areas for performing competition games. By implementing such games, amusement of the games can be enhanced, thus, stirring up the interest of the players thereby.

The present invention has been achieved in view of the above-mentioned circumstances and it is an object of the present invention to provide a multiplayer competition game device which can realize a high rendering effect by varying the physical strength value of a character being attacked according to the type and value of the offensive of an opponent character to determine the winner or the loser according to the physical strength value, as well as drastically changing the images of the characters. It is also an object of the present invention to provide a game machine or a game program which can display the motion of virtual reels of a video slot game machine in a realistic manner and display the content of the lottery table being used appropriately on a display screen with a limited space. It is also an object of the present invention to provide a game machine or a game program which can change the constitution of the dividend list for each of the games. It is also an object of the present invention to provide a game machine or a game program which can continue the multiplayer competition game regardless of the amount of the credit left. It is also an object of the present invention to provide a game machine or a game program which can perform a multiplayer competition game having a high strategic characteristic such as developing tactics according to the opponent's behavior.

(1-1) The computer-based, multiplayer competition game device of the present invention has a display unit (70) and a player manipulator (71) for competing to decrease the physical strength of an opponent character to a value equal to or lower than a predetermined final value, by displaying one or more characters provided with a predetermined initial value of physical strength on the display unit (70), sequentially carrying out an offensive against the opponent character based on the player's operation and varying the physical strength value (72) of the attacked character based on the type and value of the offensive, the computer-based, multiplayer competition game device comprising: an offensive selector (73) for selecting the type and value of the offensive; a physical strength value calculator (74) for calculating the change of the physical strength value of the attacked character based on the offensive selected by the offensive selector (73); a physical strength value display controller (75) for displaying the calculated physical strength value on a physical strength value display area (70a) of the display unit (70); a winner/loser determinator (76) for determining the winner and loser of the game; a character image display controller (77) for displaying the image of the characters on a character image display area (70b) of the display unit (70); and an offensive selection image display controller (78) for displaying the offensive selection element image corresponding to the offensive selected by the offensive selector (73) on an offensive selection image display area (70c) of the display unit (70), wherein the offensive selection image display controller (78) comprises: a storage (78a) for storing a plurality of sets of offensive selection element images at least whose offensive type is distinguishable together with their arrangement; and an offensive selection display controller (78b) for displaying a predetermined number of virtual reels in their varying state on an offensive selection image display area using a predetermined number of sets among the plurality of sets of offensive selection element images stored in the storage, and for displaying the virtual reels in their halted state based on the selection by the offensive selector, the physical strength value calculator (74) comprises a character data storage (80) for storing a character property (79) and a physical strength value (72) in association with a character, and calculates and stores the physical strength value of the attacked character using the offensive value and a calculation formula corresponding to the property and offensive type, the winner/loser determinator (76) determines whether or not the physical strength value (72) is equal to or lower than a predetermined final value and, if so, determines that the corresponding character has been defeated, and the character image display controller (77) comprises a character image storage (77a) for storing the image of a character for each of the character properties and, with regard to the character determined to be the loser by the winner/loser determinator (76), varies the image of the character being displayed on the character image display area (70b).

Thus, after the offensive selection element images are moved along the joining direction to the offensive selection image display area (70c) and displayed one after another in an alternating manner thereon based on the control of the offensive selector (73), the images are halted and displayed in a matrix-wise arrangement so that it is possible to inform, as a result of such presentation, what offensive type may be performed in what offensive value. In addition, since the character property (79) and physical strength value (72) are stored in association with the character, and the character corresponding to a physical strength value (72) equal to or lower than a predetermined value is determined to be the loser, where the physical strength value of the attacked character is calculated using the offensive value and a formula corresponding to the character property and the offensive type, it is possible to inform the remaining physical strength value as well as informing the key factor of winning or losing in an easily comprehensible manner. Furthermore, since the image of the character determined to be the loser by the winner/loser determinator (76) is varied, the result of the game can be informed effectively. As a result, it is possible to provide the player who wins the game with a sense of superiority.

(1-2) Additionally, with the multiplayer competition game device of the present invention, the character image display controller (77) varies, when a character on the offensive side is carrying out an offensive, the image of the character according to the offensive type.

Thus, with the character of the offensive side, since the image of the character is varied when carrying out an offensive according to the offensive type, it is possible to clarify the offensive type. In addition, effective rendering becomes possible without displaying the images monotonously. As a result, the player can be impressed with the situation of the offensive.

(1-3) Additionally, with the multiplayer competition game device of the present invention, the character image display controller (77) varies, when a character on the offensive side is carrying out an offensive, the image of the character according to the property of the character.

Thus, with the character of the offensive side, since the image of the character is varied when carrying out an offensive according to the property of the character, it is possible to clarify the property of the character. In addition, effective rendering becomes possible without displaying the images monotonously. As a result, the player can be impressed with the property of the character.

(1-4) Additionally, with the multiplayer competition game device of the present invention, the character image display controller (77) varies, when the physical strength value of a character receiving an offensive is decreasing, the image of the character.

Thus, with the character of the offensive side, since the image of the character is varied when the physical strength value of the character is decreasing, it is possible to clarify the received offensive type and the decrease of the physical strength value. In addition, effective rendering becomes possible without displaying the images monotonously. As a result, the player can be impressed with the received offensive type.

(1-5) Additionally, with the multiplayer competition game device of the present invention, the offensive selection element image includes a common image element recognizable by the player for each offensive type and also a numeric value image element recognizable by the player for each offensive value, and the offensive selection image display controller (78) displays, according to the type and value of the offensive selected by the offensive selector (73), the offensive selection element image including the corresponding common image element and numeric value image element on the offensive selection image display area (70c) in its halted state with a predetermined arrangement.

Thus, since the offensive selection element image including the corresponding common image element and numeric value image element is displayed according to the type and value of the offensive selected by the offensive selector (73) on the offensive selection image display area (70c) in its halted state with a predetermined arrangement, it is possible to visually inform what offensive type may be performed in what level (offensive value). The player in turn may expect, in a case such as receiving the payout when a specific sequence wins a prize in a slot machine, the presentation on the screen with regard to the offensive which is to be carried out.

(2-1) In addition, the game machine of the present invention comprises a display unit having a plurality of display areas and capable of performing, as the game starts, a varying state presentation which varies the presentation of the plurality of display areas so that respective virtual reels of a group of reels consisting of a plurality of virtual reels having a plurality of symbols provided thereon seem to be rotating, and a halted state presentation which displays one or more of the symbols in their halted state on the plurality of display areas; a storage unit for storing data of virtual reels, the number of which exceeding that of the virtual reels to be simultaneously used in a game; a selection unit for selecting, from the stored virtual reels, a plurality of virtual reels configuring a group of virtual reels to be used in the game; a table generation unit for generating a corresponding lottery table according to the plurality of selected virtual reels, wherein the display unit performs the varying state presentation or the halted state presentation, according to the result of the lottery using the lottery tables.

Thus, presentation of symbols based on the selected lottery table can be performed, since the virtual reels corresponding to a lottery table selected intentionally with the player's selecting operation as a trigger, or at an arbitrary timing with an arbitrary selection method, or at a predetermined timing in the course of the game, are represented on respective display areas, lottery table and their varying state presentation or halted state presentation is performed, as the game proceeds, in accordance with the result of the lottery using the lottery table. Thus, the symbols are fixed, eliminating the control of sliding the symbols irrelevant to the lottery result such as the case in which only the lottery table has been changed, and a presentation directly reflecting the lottery result can be performed, which allows a realistic expression of the movement. In addition, since the lottery table being used and the virtual reels being displayed are associated with each other, it becomes possible to appropriately display the content of the lottery table being used on the virtual reel without the need of providing additional display screens.

(2-2) In addition, the game machine of the present invention comprises a display unit having a plurality of display areas and capable of performing, as the game starts, a varying state presentation which varies the presentation of the plurality of display areas so that respective virtual reels of a group of reels consisting of a plurality of virtual reels having a plurality of symbols provided thereon seem to be rotating, and a halted state presentation which displays one or more of the symbols in their halted state on the plurality of display areas; a storage unit for storing data of virtual reels, the number of which exceeding that of the virtual reels to be simultaneously used in a game; a selection unit for selecting, from the stored virtual reels, a plurality of virtual reels configuring a group of virtual reels to be used in the game; a table generation unit for generating a corresponding lottery table according to the plurality of selected virtual reels, wherein the display unit performs the varying state presentation or the halted state presentation, according to the result of the lottery using the lottery tables.

Thus, symbols can be displayed based on the used lottery table, since the virtual reels corresponding to a lottery table selected intentionally with the player's selecting operation as a trigger, or at an arbitrary timing with an arbitrary selection method, or at a predetermined timing in the course of the game, are represented on respective display areas, lottery table and their varying state presentation or halted state presentation is performed, as the game proceeds, in accordance with the result of the lottery using the lottery table corresponding to the selected virtual reels. Thus, the symbols are fixed, eliminating the control of sliding the symbols irrelevant to the lottery result such as the case in which only the lottery table has been changed, and a presentation directly reflecting the lottery result can be performed, which allows a realistic expression of the movement. In addition, since the lottery table being used and the virtual reels being displayed are associated with each other, it becomes possible to appropriately display the content of the lottery table being used on the virtual reel without the need of providing additional display screens. Also, since lottery tables are generated according to a plurality of selected virtual reels, required memory capacity is smaller than the case in which many lottery tables are preliminarily stored, and variation of the lottery tables to be used can be enriched.

(2-3) Additionally, with the game machine of the present invention, the storage unit further stores characters corresponding to the plurality of types of lottery tables or the arranged virtual reels, the selector selects one or more of the plurality of lottery tables, or one or more of the corresponding virtual reels, based on the player's operation of selecting one or more of the characters so that the symbol provided on the virtual reel is a symbol associated with the corresponding character.

Thus, since the symbol provided on the virtual reel is a symbol associated with a corresponding character, whenever a player selects a character the virtual reel is varied according to the character. Thus, the player can be informed of how the selected character is like on the virtual reel. In addition, since a lottery table corresponding to the character is used, a prize-winning sequence specific to the character can be realized, enhancing the amusement of the game. For example, by associating the prize-winning sequence specific to a selected character with the animated image of the character and performing an animated rendering of the image when the prize-winning sequence is realized, the player can be impressed with the realization of the prize-winning sequence specific to the character.

(2-4) In addition, the game program of the present invention causes a computer to read and convert the following processes into executable commands, the processes comprising a process using a plurality of display areas and capable of performing, as the game starts, a varying state presentation which varies the presentation of the plurality of display areas so that respective virtual reels of a group of reels consisting of a plurality of virtual reels having a plurality of symbols provided thereon seem to be rotating, and a halted state presentation which displays one or more of the symbols in their halted state on the plurality of display areas; a process for storing a plurality of lottery tables used for selecting a symbol to be displayed in its halted state whenever a game is played, and data of virtual reels according to the realization probability for each prize-winning sequence in each of the lottery tables; and a process for selecting one or more of the plurality of lottery tables, or one or more of the corresponding virtual reels, wherein the display process displays the virtual reels corresponding to the lottery table selected by the selection unit on respective display areas, and as the game proceeds, performs the varying state presentation or the halted state presentation, according to the result of the lottery using the lottery tables.

Thus, presentation of symbols based on the selected lottery table can be performed, since the virtual reels corresponding to a lottery table selected intentionally with the player's selecting operation as a trigger, or at an arbitrary timing with an arbitrary selection method, or at a predetermined timing in the course of the game, are represented on respective display areas, lottery table and their varying state presentation or halted state presentation is performed, as the game proceeds, in accordance with the result of the lottery using the lottery table. Thus, the symbols are fixed, eliminating the control of sliding the symbols irrelevant to the lottery result such as the case in which only the lottery table has been changed, and a presentation directly reflecting the lottery result can be performed, which allows a realistic expression of the movement. In addition, since the lottery table being used and the virtual reels being displayed are associated with each other, it becomes possible to appropriately display the content of the lottery table being used on the virtual reel without the need of providing additional display screens.

(3-1) In addition, the game machine of the present invention comprises a display unit having a plurality of display areas and capable of performing, as the game starts, a varying state presentation which varies the presentation of the plurality of display areas so that respective virtual reels of a group of reels consisting of a plurality of virtual reels having a plurality of symbols provided thereon seem to be rotating, and a halted state presentation which displays one or more of the symbols in their halted state on the plurality of display areas; a storage unit for storing a lottery table used for selecting one or more of a plurality of sequences represented by a combination of symbols to be displayed in their halted state on the display areas whenever a game is played, and data of virtual reels according to the realization probability for each prize-winning sequence in the lottery tables; and a dividend list data generation unit for generating dividend list data representing the dividend for the realization of at least one of the sequences, wherein the display unit displays the group of virtual reels corresponding to the lottery tables on the respective display areas, and as the game proceeds, displays the dividend list on the screen using the generated dividend data, as well as performing the varying state presentation or the halted state presentation, according to the result of the lottery using the lottery tables.

Thus, the dividend list can be changed according to the data of the lottery table, since dividend list data representing the dividend for the realization of at least one of the sequences is generated based on the lottery table, and the dividend list is displayed on the screen using the generated dividend list data. Therefore, since the dividend list is changed accordingly when the lottery table is changed, the dividend list can be changed in real time as the lottery table is modified. This allows the dividend list, which has been conventionally uniform with little flexibility, to be arbitrarily modified, whereby the sequences which can be realized are varied, leading to an enhanced amusement of the game. In addition, since the dividend list is displayed on the screen according to the generated dividend list data, the player can be informed of the new dividend list.

(3-2) In addition, the game machine of the present invention comprises a display unit having a plurality of display areas and capable of performing, as the game starts, a varying state presentation which varies the presentation of the plurality of display areas so that respective virtual reels of a group of reels consisting of a plurality of virtual reels having a plurality of symbols provided thereon seem to be rotating, and a halted state presentation which displays one or more of the symbols in their halted state on the plurality of display areas; a storage unit for storing a plurality of types of lottery tables used for selecting one or more of a plurality of sequences represented by a combination of symbols to be displayed in their halted state on the display areas whenever a game is played, and data of virtual reels according to the realization probability for each prize-winning sequence in each of the lottery tables; a selection unit for selecting, upon the player's selecting operation, one or more of the plurality of types of lottery tables; and a dividend list data generation unit for generating dividend list data representing the dividend for the realization of at least one of the sequences, wherein the display unit displays the group of virtual reels corresponding to the selected lottery tables on the respective display areas, and as the game proceeds, displays the dividend list on the screen using the generated dividend data, as well as performing the varying state presentation or the halted state presentation, according to the result of the lottery using the lottery tables.

Thus, the dividend list as well as displayable symbols can be changed according to the player's operation, since dividend list data representing the dividend for the realization of at least one of the sequences is generated based on one or more of the selected lottery tables, triggered by the player's selecting operation, and the dividend list is displayed on the screen using the generated dividend list data. Therefore, since the dividend list is changed accordingly when the lottery table data is changed, the dividend list can be changed in real time as the lottery table is modified. This allows the dividend list, which has been conventionally uniform with little flexibility, to be arbitrarily modified according to the player's judgment. As a result, variation of sequences which can be realized is brought about, which may lead to an enhanced amusement of the game. In addition, since the dividend list is displayed on the screen according to the generated dividend list data, the player can be informed of the new dividend list.

(3-3) Additionally, with the game machine of the present invention, the storage unit stores data representing a payout rate, and the dividend list data generation unit generates the dividend list data based on the data representing the payout rate.

Thus, since the dividend list data is generated based on the data representing the payout rate, dividend list can be generated so that it matches the expected payout which the player acquires or the expected profit which the facility acquires.

(3-4) Additionally, with the game machine of the present invention, the display unit performs, when at least one prize-winning sequence is realized, an image presentation as a rendering effect specific to the sequence.

Thus, when one or more prize-winning sequence is realized, an image presentation as a rendering effect specific to the sequence is performed, whereby the player can be informed which prize-winning sequence has been realized. Furthermore, degree of the player's satisfaction due to realization of the prize-winning sequence can be enhanced.

(3-5) In addition, the game machine of the present invention performs a multiplayer competition game for competing to decrease the physical strength of an opponent character to a value equal to or lower than a predetermined final value, by displaying one or more characters provided with a predetermined initial value of physical strength on the display unit, upon carrying out an offensive against the opponent character whenever one or more prize-winning sequences are realized to decrease the physical strength value of the attacked character based on the prize-winning sequences which are realized.

Thus, an offensive is carried out to an opponent character and whenever one or more prize-winning sequences are realized the physical strength value of the opponent character decreases based on the sequence, associating the realized prize-winning sequence with the offensive type thereby. At the same time, the realized sequence and the degree of decrease of the physical strength value of the opponent character are associated with each other. This enables to implement a game for competing to decrease the physical strength value of the opponent character according to the realized sequence, while performing presentation of symbols in their varying state and halted state on the display areas.

(3-6) In addition, the game program of the present invention causes a computer to read and convert the following processes into executable commands, the processes comprising, a process using a plurality of display areas and capable of performing, as the game starts, a varying state presentation which varies the presentation of the plurality of display areas so that respective virtual reels of a group of reels consisting of a plurality of virtual reels having a plurality of symbols provided thereon seem to be rotating, and a halted state presentation which displays one or more of the symbols in their halted state on the plurality of display areas; a process for storing a plurality of lottery tables used for selecting one or more of a plurality of sequences represented by a combination of symbols to be displayed in their halted state on the display areas whenever a game is played, and data of a group of virtual reels according to the probability of winning a prize for each sequence in the lottery tables; a process for generating, based on the lottery tables, dividend list data representing the dividend for the realization of at least one of the sequences; a process for displaying the group of virtual reels corresponding to the lottery tables on the respective display areas, and as the game proceeds, and performing the varying state presentation or the halted state presentation, according to the result of the lottery using the lottery tables; and a process for displaying the dividend list on the screen using the generated dividend data.

Thus, the dividend list can be changed according to the data of the lottery table, since dividend list data representing the dividend for the realization of at least one of the sequences is generated based on the lottery table, and the dividend list is displayed on the screen using the generated dividend list data. Therefore, since the dividend list is changed accordingly when the lottery table is changed, the dividend list can be changed in real time as the lottery table is modified. This allows the dividend list, which has been conventionally uniform with little flexibility, to be arbitrarily modified, whereby the sequences which can be realized are varied, leading to an enhanced amusement of the game. In addition, since the dividend list is displayed on the screen according to the generated dividend list data, the player can be informed of the new dividend list.

(4-1) In addition, the game machine of the present invention, the start of which is triggered by inputting a first numeric data representing a redeemable value, comprises a data input unit for accepting the input of the first numeric data, or a second numeric value data representing a value determined with the game; a main memory for storing the first numeric data, and capable of outputting the stored first numeric data to the data input unit; a sub-memory for storing the second numeric data, and capable of outputting the stored second numeric data to the data input unit; and a game performing unit for performing an ordinary game under a condition that the first numeric data is input from the data input unit, or otherwise performing a special game under a condition that the second numerical data is input from the data input unit.

Thus, since the special game is performed under a condition that the second numerical data is input from the data input unit, the special game can be performed using only the second numeric data regardless of the quantity of the first numeric data stored in the main memory. Therefore, it is possible to continue the special game even if the second numeric data becomes zero or negative during the special game, provided that the first numeric data is stored in the main memory. This allows the player to enjoy the game sufficiently. In particular, the present invention is preferable for multiplayer competition games. Here, it may be arranged such that the second numeric data stored in the sub-memory is decreased by a specified quantity by specifying the quantity of the second numeric data.

(4-2) Additionally, with the game machine of the present invention, the second input numeric data increases or decreases during performance of the special game.

Thus, since the second input numeric data increases or decreases during performance of the special game, it is possible to continue the special game even if the second numeric data becomes zero or negative during the special game, provided that the first numeric data is stored in the main memory. This allows the player to enjoy the game sufficiently.

(4-3) In addition, the game machine of the present invention, the game performing unit outputs the second numeric data to the sub-memory if a predetermined condition is satisfied at the end of the special game.

Thus, if a predetermined condition is satisfied at the end of the special game, the second numeric data is output, which the player can receive as his or her dividend. By outputting the second numeric data, the quantity of the second numeric data in the sub-memory increases, which increase the chance for the player to participate in the special game.

(4-4) In addition, the game machine of the present invention comprises a display unit having a plurality of display areas and capable of performing, as the game starts, a varying state presentation which varies the presentation of the plurality of display areas so that respective virtual reels of a group of reels consisting of a plurality of virtual reels having a plurality of symbols provided thereon seem to be rotating, and a halted state presentation which displays one or more of the symbols in their halted state on the plurality of display areas; and a lottery device for performing a lottery using a plurality of lottery tables for selecting one or more of a plurality of sequences represented by a combination of symbols to be displayed in their halted state on the display areas whenever a game is played, wherein the display unit displays the virtual reels corresponding to the lottery tables on the respective display areas, and as the game proceeds, performs the varying state presentation or the halted state presentation, according to the result of the lottery using the lottery tables, and the game performing unit outputs the first numeric data to the main memory as a prize if at least one of the sequences is realized.

According to the above configuration, the present invention can be applied to a game machine comprising a display unit which can display symbols in their varying state or halted state. In other words, when at least one of the prize-winning sequences is realized, the first numeric data is output as the prize, which can be paid off as a redeemable value. On the other hand, since only the second numeric data increases or decreases in the special game, the dividend to be provided to the player can be distinguished according to the realized sequence and the condition satisfied at the end of the special game. For example, bifurcation of the game may be possible such that the first numeric data is output when a certain sequence is realized during the game, whereas the second numeric data is output if a challenge prepared in the game has been overcome. This allows for enhanced amusement of the game.

(4-5) Additionally, with the game machine of the present invention, the special game is a multiplayer competition game for competing to decrease the physical strength of an opponent character to a value equal to or lower than a predetermined final value, by displaying one or more characters provided with a predetermined initial value of physical strength on the display unit, carrying out an offensive against the opponent character whenever one or more sequences win a prize, and decreasing the physical strength value of the attacked character based on the type of the prize-winning sequence, the game machine comprising a communication interface for transmitting and receiving data to and from another game machine or server device, the sub-memory storing data representing the character, the game performing unit generates, and outputs to the sub-memory, data corresponding to the data representing the opponent character if a predetermined condition is satisfied at the end of the multiplayer competition game.

Thus, if a predetermined condition is satisfied at the end of the multiplayer competition game, data corresponding to the data representing the opponent character is generated and output to the sub-memory. Therefore, it is possible to provide the player who satisfied the condition with a presentation that he or she has captured the opponent character. This allows for implementation of a multiplayer competition game in which a plurality of players mutually compete to capture their characters.

(4-6) Additionally, with the game machine according to claim 16, the condition for performing the special game is such that the second numeric data which is equal to or higher than a predetermined value must be stored in the sub-memory.

Due to the above condition, the player must specify a second predetermined numeric data as entry fee in order to participate in the special game. Therefore, the player must posses the second numeric data which exceeds a specified value in order to play the special game. Accordingly, the player tries to acquire the second numeric data in the ordinary game in order to play the special game. As a result, the game may lead the player to consume his or her first numeric data.

(4-7) In addition, the game program of the present invention, with the start of the game being triggered by inputting a first numeric data representing a redeemable value, which causes a computer to read and convert a series of processes into executable commands, the processes comprises a process for accepting, at a data input unit, the input of the first numeric data, or a second numeric value data representing a value determined the game; a process for storing, in a main memory, the input first numeric data, a process for outputting, from the main memory, the first numeric data, then decreasing the numeric data by a quantity corresponding to the first numeric data which has been output from the main memory, and a process for performing an ordinary game under a condition that the first numeric data is input from the data input unit, or otherwise performing a special game under a condition that the second numerical data is input from the data input unit.

Thus, since the special game is performed under a condition that the second numerical data is input from the data input unit, the special game can be performed using only the second numeric data regardless of the quantity of the first numeric data stored in the main memory. Therefore, it is possible to continue the special game even if the second numeric data becomes zero or negative during the special game, provided that the first numeric data is stored in the main memory. This allows the player to enjoy the game sufficiently. In particular, the present invention is preferable for multiplayer competition games.

(5-1) In addition, the game machine of the present invention comprises a plurality of client devices and a server device which transmits and receives data to and from each of the client devices, and performing a multiplayer competition game in which a plurality of players compete for characters, wherein each of the client devices comprises an operation unit with which a player performs input operation of signals; and a display unit for displaying the situation of the game; the server device comprises a storage unit for storing, in each of the client devices, data representing a plurality of types of characters, each of which has been input by each of the client devices and provided with a different property and its remaining number of times available; an extraction unit for extracting, triggered by the player's selecting operation at each of the client devices, data representing a predetermined number of characters and their remaining number of times available from the data representing the plurality of types of characters and their remaining number of times available; a party formation unit for generating, for each of the client devices, data representing a party consisting of each of the characters, by combining the data representing the extracted characters and their remaining number of times available; and a game performing unit for performing a multiplayer competition game at a plurality of client devices, using the data representing the formed party, wherein the data representing any one of the characters configuring the party which is defeated in the competition is added, together with a predetermined remaining number of times available, to the client device of the side which wins the competition.

According to the above configuration, a multi-station game machine can be realized. As stated above, since a party is formed by a plurality of characters to perform the multiplayer competition game, winning or losing the game may depend on the constitution of the party. As a result, a highly strategic multiplayer competition game can be realized. In addition, the data representing one of the characters configuring the party which lost the game and its remaining number of times available is added to the winner of the game, whereby the winner can newly acquire a character. This allows for implementation of a multiplayer competition game in which the players mutually compete to capture their characters. Here, the defeated side may decrease the remaining number of times available, or leave it unchanged. Also, the data representing one of the characters and their remaining number of times available may be cleared. This strengthens the motivation of competing for the characters.

(5-2) In addition, the game machine of the present invention performs a multiplayer competition game in which a plurality of players compete for characters, and comprises a communication interface for transmitting and receiving data to and from another game machine or server device, an operation unit with which a player performs input operation of signals; and a display unit for displaying the situation of the game; a storage unit for storing data representing a plurality of types of characters, each provided with a different property, and their remaining numbers of times available; an extraction unit for extracting, triggered by the player's selecting operation, data representing a predetermined number of characters and their remaining number of times available from the data representing the plurality of types of characters and their remaining number of times available; a party formation unit for generating data representing a party consisting of each of the characters, by combining the data representing the extracted characters and their remaining number of times available; and a game performing unit for performing a multiplayer competition game, using the data representing the formed party, and data representing the party input from the another game machine, wherein if, as a result of the competition, the another game machine or server device is defeated in the game, the data representing any one of the characters configuring the party of the another game machine or server device which is defeated in the competition is added, together with a predetermined remaining number of times available.

According to the above configuration, a standalone game machine can be realized. A plurality of such machines may be connected via a network to realize a multiplayer competition game among a plurality of game machines. As stated above, since a party is formed by a plurality of characters to perform the multiplayer competition game, winning or losing the game may depend on the constitution of the party. As a result, a highly strategic multiplayer competition game can be realized. In addition, the data representing one of the characters configuring the party which lost the game and its remaining number of times available is added to the winner of the game, whereby the winner can have more characters. This allows for implementation of a multiplayer competition game in which the players mutually compete to capture their characters. Here, the defeated side may decrease the remaining number of times available, or leave it unchanged. Also, the data representing one of the characters and their remaining number of times available may be cleared. This strengthens the motivation of competing for the characters.

(5-3) Additionally, with the game machine of the present invention, the remaining number of times available of the character configuring the party is decreased by a certain number if it is defeated in the competition, whereas the character and its remaining number of times available added to the side which won the competition is approximately equal to the decreased remaining number of times available of the character.

Thus, since the decreased remaining number of times available of the loser of the competition is approximately equal to the character and its remaining number of times available which is input to the winner side, it is possible to keep the total sum of the amusement value to an approximately constant level. This allow for continuously attracting the interest of the players even if many players participate in the game for competition, without rise or fall in the value of the characters or the value of each game. For example, if a character to be input to the winner side has a very high battle capability, its remaining number of times available is set low because the possibility that the character will be defeated is low. On the other hand, if a character to be input to the winner side is very weak, its remaining number of times available is set high so that there will be more chance of continuing the battle because the possibility that the character will be defeated is high.

(5-4) In addition, the data representing any one of the characters configuring the party is deleted upon losing the competition, whereas the character and its remaining number of times available added to the side which won the competition are approximately equal to the deleted character.

Thus, since the character to be deleted at the loser side is approximately equal to the character and its remaining number of times available which is input to the winner side, it is possible to keep the total sum of the amusement value to an approximately constant level. For example, if the remaining number of times available of the character deleted at the loser side is 3, the remaining number of times available of the character to be input to the winner side is set to 3. In addition, a character different from the character which is deleted at the loser side may be input to the winner side. In this case, a character and its remaining number of times available equal to the deleted character and its remaining number of times available will be input to the winner side. For example, if a character having a very high battle capability is deleted at the loser side, with its remaining number of times available being 1, the character to be input to the winner side may have a very low battle capability but its remaining number of times available may be set to 5.

(5-5) Additionally, with the game machine of the present invention, the party formation unit newly generates, when performing the next game, data representing the party, using the data representing the character and its remaining number of times available.

Thus, using the data representing the input character and its remaining number of times available, the data representing a party is newly generated when performing the next game, whereby it is possible to newly form a party using a character captured from the opponent by winning the battle. Accordingly, the more times a player wins the battle the more characters the player acquires, enriching the variation of the constitution of the party to enhance strategic characteristic.

(5-6) Additionally, with the game machine of the present invention, the extraction unit disables, at the next and subsequent games, extraction of at least one of the data representing the character and its remaining number of times available, which together compose the data representing the party used when performing the game.

Thus, extraction of at least one of the character configuring the data representing the party used when performing the game and the data representing its remaining number of times available is disabled at the next and subsequent games, whereby a character which has once been used in the battle becomes unusable. This allows for enhancing the player's motivation to win the battle and capture a character from the opponent, as well as raising the difficulty of forming a party.

(5-7) Additionally, with the game machine of the present invention, the storage unit stores a plurality of types of tables including data representing data representing a plurality of types of characters, each of which is provided with a different property, and data of a plurality of types of symbols which are determined in association with the data representing each of the characters and can be displayed on the display areas, the party formation unit associates, for each of display areas, the data representing the characters, the display unit reads the table corresponding to the data representing the characters, and performs, on the display areas associated with the data representing the characters, a varying state presentation in which a plurality of symbols which were in a halted state on a plurality of display areas are constantly varied into a variety of symbols and displayed, and a halted state presentation in which the symbols being presented in the varying state are halted again and displayed on each of the display areas.

Thus, the table corresponding to the data representing the characters is read out onto the display areas associated with the data representing the characters, and the varying state and the halting state presentations are performed thereon, whereby each display area is associated with a character, and a party composed of respective characters is formed on all of the display areas. This allows a multiplayer competition game to be performed by parties on a plurality of display areas for displaying the symbols in their varying or halted state.

(5-8) In addition, the game program of the present invention performs a multiplayer competition game in which a plurality of players compete for characters, and causes a computer to read and convert the following processes into executable commands, the processes comprising a process for transmitting and receiving data to and from another game machine or server device, a process for inputting signals based on the player's input operation; a process for displaying the situation of the game; a process for storing data representing a plurality of types of characters, each provided with a different property, and their remaining numbers of times available; a process for extracting, triggered by the player's selecting operation, data representing a predetermined number of characters and their remaining number of times available from the data representing the plurality of types of characters and their remaining number of times available; a process for generating data representing a party consisting of each of the characters, by combining the data representing the extracted characters and their remaining number of times available; a process for performing a multiplayer competition game, using the data representing the formed party, and data representing the party input from the another game machine, and a process for adding, if, as a result of the competition, the another game machine or server device is defeated in the game, the data representing any one of the characters configuring the party of the another game machine or server device which loses the competition, together with a predetermined remaining number of times available.

Thus, since a party is formed by a plurality of characters to perform the multiplayer competition game, winning or losing the game may depend on the constitution of the party. As a result, a highly strategic multiplayer competition game can be realized. In addition, the data representing one of the characters configuring the party which lost the game and its remaining number of times available is added to the winner of the game, whereby the winner can have more characters. This allows for implementation of a multiplayer competition game in which the players mutually compete to capture their characters. Here, the defeated side may decrease the remaining number of times available, or leave it unchanged. Also, the data representing one of the characters and their remaining number of times available may be cleared. This strengthens the motivation of competing for the characters.

EFFECT OF THE INVENTION (1) According to the multiplayer competition game device of the present invention, after the offensive selection element images are moved along the joining direction to the offensive selection image display area ($70c$) and displayed one after another in an alternating manner thereon, based on the control of the offensive selector ($73$), the images are halted and displayed in a matrix-wise arrangement, so that it is possible to inform, as a result of such presentation, what offensive type may be performed in what offensive value. In addition, since the character property ($79$) and physical strength value ($72$) are stored in association with the character, and the character corresponding to a physical strength value ($72$) equal to or lower than a predetermined final value is determined to be the loser, the physical strength value of the attacked character being calculated using the offensive value and a formula corresponding to the character property and the offensive type, it is possible to inform the remaining physical strength value as well as informing the key factor of winning or losing in an easily comprehensible manner. Furthermore, since the image of the character determined to be the loser by the winner/loser determinator ($76$) is varied, the result of the game can be informed effectively. As a result, it is possible to provide the player who wins the game with a sense of superiority.

Also according to the multiplayer competition game device of the present invention, with the character of the offensive side, since the image of the character is varied when carrying out an offensive according to the offensive type, it is possible to clarify the offensive type. In addition, effective rendering becomes possible without displaying the images monotonously. As a result, the player can be impressed with the situation of the offensive.

Also according to the multiplayer competition game device of the present invention, with the character of the offensive side, since the image of the character is varied when carrying out an offensive according to the property of the character, it is possible to clarify the property of the character. In addition, effective rendering becomes possible without displaying the images monotonously. As a result, the player can be impressed with the property of the character.

Also according to the multiplayer competition game device of the present invention, with the character of the offensive side, since the image of the character is varied when the physical strength value of the character is decreasing, it is possible to clarify the received offensive type and the decrease of the physical strength value. In addition, effective rendering becomes possible without displaying the images monotonously. As a result, the player can be impressed with the received offensive type.

Also according to the multiplayer competition game device of the present invention, since the offensive selection element image including the corresponding common image element and numeric value image element is displayed according to the type and value of the offensive selected by the offensive selector (73) on the offensive selection image display area (70*c*) in its halted state with a predetermined arrangement, it is possible to visually inform what offensive type may be performed in what level (offensive value). The player in turn may expect, in a case such as receiving the payout when a specific sequence wins a prize in a slot machine, the presentation on the screen with regard to the offensive which is to be carried out.

(2) Also according to the game machine of the present invention, presentation of symbols based on the selected lottery table can be performed, since the virtual reels corresponding to the selected lottery table are displayed on respective display areas and presented in their varying state or halted state according to the result of the lottery using the lottery table as the game proceeds. Thus, a presentation directly reflecting the lottery result can be performed, which allows a realistic expression of the movement. In addition, since the lottery table being used and the virtual reels being displayed are associated with each other, it becomes possible to appropriately display the content of the lottery table being used on the virtual reel without the need of providing additional display screens. Therefore the player can easily recognize, with the aid of the displayed group of virtual reels, that the winning probability of each of the symbol types has been changed as well as the changed content.

Also according to the game machine of the present invention, presentation of symbols based on the selected lottery table can be performed, since the group of virtual reels corresponding to the selected lottery table are displayed on respective display areas and presented in their varying state or halted state according to the result of the lottery using the lottery table as the game proceeds. Thus, a presentation directly reflecting the lottery result can be performed, which allows a realistic expression of the movement. In addition, since the lottery table being used and the virtual reels being displayed are associated with each other, it becomes possible to appropriately display the content of the lottery table being used on the virtual reel without the need of providing additional display screens. Also, since lottery tables are generated according to a plurality of selected virtual reels, required memory capacity is smaller than the case in which many lottery tables are preliminarily stored, and variation of the lottery tables to be used can be enriched.

Also according to the game machine of the present invention, since the symbols provided on the group of virtual reels are symbols associated with corresponding characters, whenever a player selects a character the virtual reel is varied according to the character. Thus, the player can be informed of what the selected character is like on the virtual reel. In addition, since a lottery table corresponding to the character is used, a prize-winning sequence specific to the character can be realized, enhancing the amusement of the game. For example, by associating the prize-winning sequence specific to a selected character with the animated image of the character and performing an animated rendering of the image when the prize-winning sequence is realized, the player can be impressed with the realization of the prize-winning sequence specific to the character.

Also according to the game program of the present invention, presentation of symbols based on the selected lottery table can be performed, since the virtual reels corresponding to the selected lottery table are displayed on respective display areas and presented in their varying state or halted state according to the result of the lottery using the lottery table as the game proceeds. Thus, a presentation directly reflecting the lottery result can be performed, which allows a realistic expression of the movement. In addition, since the lottery table being used and the virtual reels being displayed are associated with each other, it becomes possible to appropriately display the content of the lottery table being used on the virtual reel without the need of providing additional display screens. Therefore the player can easily recognize, with the aid of the displayed group of virtual reels, that the winning probability of each of the symbol types has been changed as well as the changed content.

(3) Also according to the game machine of the present invention, the dividend list can be changed according to the data of the lottery table, since dividend list data representing the dividend for the realization of at least one of the sequences is generated based on the lottery table, and the dividend list is displayed on the screen using the generated dividend list data. Therefore, since the dividend list is changed accordingly when the lottery table is changed, the dividend list can be changed in real time as the lottery table is modified. This allows the dividend list, which has been conventionally uniform with little flexibility, to be arbitrarily modified, whereby the sequences which can be realized are varied, leading to an enhanced amusement of the game. In addition, since the dividend list is displayed on the screen according to the generated dividend list data, the player can be informed of the new dividend list.

Also according to the game machine of the present invention, the dividend list as well as displayable symbols can be changed according to the player's operation, since dividend list data representing the dividend for the realization of at least one of the sequences is generated based on one or more of the selected lottery tables, triggered by the player's selecting operation, and the dividend list is displayed on the screen using the generated dividend list data. Therefore, since the dividend list is changed accordingly when the lottery table data is changed, the dividend list can be changed in real time as the lottery table is modified. This allows the dividend list, which has been conventionally uniform with little flexibility, to be arbitrarily modified according to the player's judgment. As a result, variation of sequences which can be realized is brought about, which may lead to an enhanced amusement of the game. In addition, since the dividend list is displayed on the screen according to the generated dividend list data, the player can be informed of the new dividend list.

Also with the game machine of the present invention, since the dividend list data is generated based on the data representing the payout rate, dividend list can be generated so that it matches the expected payout which the player acquires or the expected profit which the facility acquires.

Also according to the game machine of the present invention, when one or more prize-winning sequence is realized, an image presentation as a rendering effect specific to the sequence is performed, whereby the player can be informed which prize-winning sequence has been realized. Furthermore, degree of the player's satisfaction due to realization of the prize-winning sequence can be enhanced.

Also according to the game machine of the present invention, since an offensive is carried out to an opponent character and the physical strength value of the opponent character decreases whenever one or more prize-winning sequences are realized based on the sequence, the realized prize-winning and the offensive type are associated with each other. At the same time, the realized sequence and the degree of decrease of the physical strength value of the opponent character are associated with each other. This enables to implement a game for competing to decrease the physical strength value of the opponent character according to the realized sequence, while performing presentation of symbols in their varying state and halted state on the display areas.

Also according to the game program of the present invention, the dividend list can be changed according to the data of the lottery table, since dividend list data representing the dividend for the realization of at least one of the sequences is generated based on the lottery table, and the dividend list is displayed on the screen using the generated dividend list data. Therefore, since the dividend list is changed accordingly when the lottery table is changed, the dividend list can be changed in real time as the lottery table is modified. This allows the dividend list, which has been conventionally uniform with little flexibility, to be arbitrarily modified, whereby the sequences which can be realized are varied, leading to an enhanced amusement of the game. In addition, since the dividend list is displayed on the screen according to the generated dividend list data, the player can be informed of the new dividend list.

(4) Also according to the game machine of the present invention, since the special game is performed under a condition that the second numerical data is input from the data input unit, the special game can be performed using only the second numeric data regardless of the quantity of the first numeric data stored in the main memory. Therefore, it is possible to continue the special game even if the second numeric data becomes zero or negative during the special game, provided that the first numeric data is stored in the main memory. This allows the player to enjoy the game sufficiently. In particular, the present invention is preferable for multi-player competition games. Here, it may be arranged such that the second numeric data stored in the sub-memory is decreased by a specified quantity by specifying the quantity of the second numeric data.

Also according to the game machine of the present invention, since the second input numeric data increases or decreases during performance of the special game, it is possible to continue the special game even if the second numeric data becomes zero or negative during the special game, provided that the first numeric data is stored in the main memory. This allows the player to enjoy the game sufficiently.

Also according to the game machine of the present invention, if a predetermined condition is satisfied at the end of the special game the second numeric data is output, which the player can receive as his or her dividend. By outputting the second numeric data, the quantity of the second numeric data in the sub-memory increases, which increase the chance for the player to participate in the special game.

Also according to the game machine of the present invention, the present invention can be applied to a game machine comprising a display unit which can display symbols in their varying state or halted state. In other words, when at least one of the prize-winning sequences is realized, the first numeric data is output as the prize, which can be paid off as a redeemable value. On the other hand, since only the second numeric data increases or decreases in the special game, the dividend to be provided to the player can be distinguished according to the realized sequence and the condition satisfied at the end of the special game. For example, bifurcation of the game may be possible such that the first numeric data is output when a certain sequence is realized during the game, whereas the second numeric data is output if a challenge prepared in the game has been overcome. This allows for enhanced amusement of the game.

Also according to the game machine of the present invention, if a predetermined condition is satisfied at the end of the multiplayer competition game, data corresponding to the data representing the opponent character is generated and output to the sub-memory. Therefore, it is possible to provide the player who satisfied the condition with a presentation that he or she has captured the opponent character. (The description seems that the opponent character is captured by actually exchanging data of the characters. However, actually, the data representing the opponent character is merely informed, and the player who received the information demonstrates as if he or she has captured the opponent character by generating and displaying data so that a character corresponding to the data is added to the player's existing characters.) This allows for implementation of a multiplayer competition game in which a plurality of players mutually compete to capture their characters.

Also according to the game machine of the present invention, the player must specify a second predetermined numeric data as entry fee in order to participate in the special game. Therefore, the player must posses the second numeric data which exceeds a specified value in order to play the special game. Accordingly, the player tries to acquire the second numeric data in the ordinary game in order to play the special game. As a result, the game may lead the player to consume his or her first numeric data.

Also according to the game program of the present invention, since the special game is performed under a condition that the second numerical data is input from the data input unit, the special game can be performed using only the second numeric data regardless of the quantity of the first numeric data stored in the main memory. Therefore, it is possible to continue the special game even if the second numeric data becomes zero or negative during the special game, provided that the first numeric data is stored in the main memory. This allows the player to enjoy the game sufficiently. In particular, the present invention is preferable for multiplayer competition games.

Also according to the game machine of the present invention, since a party is formed by a plurality of characters to perform the multiplayer competition game, winning or losing the game may depend on the constitution of the party. As a result, a highly strategic multiplayer competition game can be realized. In addition, the data representing one of the characters configuring the party which lost the game and its remaining number of times available is added to the winner of the game, whereby the winner can newly acquire a character. This allows for implementation of a multiplayer competition game in which the players mutually compete to capture their characters. Here, the defeated side may decrease the remaining number of times available, or leave it unchanged. Also, the data representing one of the characters and their remaining number of times available may be cleared. This strengthens the motivation of competing for the characters.

Also according to the game machine of the present invention, since a party is formed by a plurality of characters to perform the multiplayer competition game, winning or losing the game may depend on the constitution of the party. As a result, a highly strategic multiplayer competition game can be realized. In addition, the data representing one of the characters configuring the party which lost the game and its remaining number of times available is added to the winner of the game, whereby the winner can have more characters. This allows for implementation of a multiplayer competition game in which the players mutually compete to capture their characters. Here, the defeated side may decrease the remaining number of times available, or leave it unchanged. Also, the data representing one of the characters and their remaining number of times available may be cleared. This strengthens the motivation of competing for the characters.

Also according to the game machine of the present invention, since the decreased remaining number of times available of the loser of the competition is approximately equal to the character and its remaining number of times available which is input to the winner side, it is possible to keep the total sum of the amusement value to an approximately constant level. This allow for continuously attracting the interest of the players even if many players participate in the game for competition, without rise or fall in the value of the characters or the value of each game. For example, if a character to be input to the winner side has a very high battle capability, its remaining number of times available is set low because the possibility that the character will be defeated is low. On the other hand, if a character to be input to the winner side is very weak, its remaining number of times available is set high so that there will be more chance of continuing the battle because the possibility that the character will be defeated is high.

Also according to the game machine of the present invention, since the character to be deleted at the loser side is approximately equal to the character and its remaining number of times available which is input to the winner side, it is possible to keep the total sum of the amusement value to an approximately constant level. For example, if the remaining number of times available of the character deleted at the loser side is 3, the remaining number of times available of the character to be input to the winner side is set to 3. In addition, a character different from the character which is deleted at the loser side may be input to the winner side. In this case, a character and its remaining number of times available equal to the deleted character and its remaining number of times available will be input to the winner side. For example, if a character having a very high battle capability is deleted at the loser side, with its remaining number of times available being 1, the character to be input to the winner side may have a very low battle capability but its remaining number of times available may be set to 5.

Also according to the game machine of the present invention, using the data representing the added character and its remaining number of times available, the data representing a party is newly generated when performing the next game, whereby it is possible to newly form a party using a character captured from the opponent by winning the battle. Thus, the more times a player wins the battle the more characters the player acquires, enriching the variation of the constitution of the party to enhance strategic characteristic.

Also according to the game machine of the present invention, extraction of at least one of the data representing the character and its remaining number of times available, which together compose the data representing the party used when performing the game, is disabled at the next and subsequent games, whereby a character which has once been used in the battle becomes unusable. This allows for enhancing the player's motivation to win the battle and capture a character from the opponent, as well as raising the difficulty of forming a party.

Also according to the game machine of the present invention, the table corresponding to the data representing the characters is read out onto the display areas associated with the data representing the characters, and the varying state and the halting state presentations are performed thereon, whereby each display area is associated with a character, and a party composed of respective characters is formed on all of the display areas. This allows a multiplayer competition game to be performed by parties on a plurality of display areas for displaying the symbols in their varying or halted state.

Also according to the game program of the present invention, since a party is formed by a plurality of characters to perform the multiplayer competition game, winning or losing the game may depend on the constitution of the party. As a result, a highly strategic multiplayer competition game can be realized. In addition, the data representing one of the characters configuring the party which lost the game and its remaining number of times available is added to the winner of the game, whereby the winner can have more characters. This allows for implementation of a multiplayer competition game in which the players mutually compete to capture their characters. Here, the defeated side may decrease the remaining number of times available, or leave it unchanged. Also, the data representing one of the characters and their remaining number of times available may be cleared. This strengthens the motivation of competing for the characters.

BEST MODES FOR CARRYING OUT THE INVENTION

First Embodiment

Figure 1:
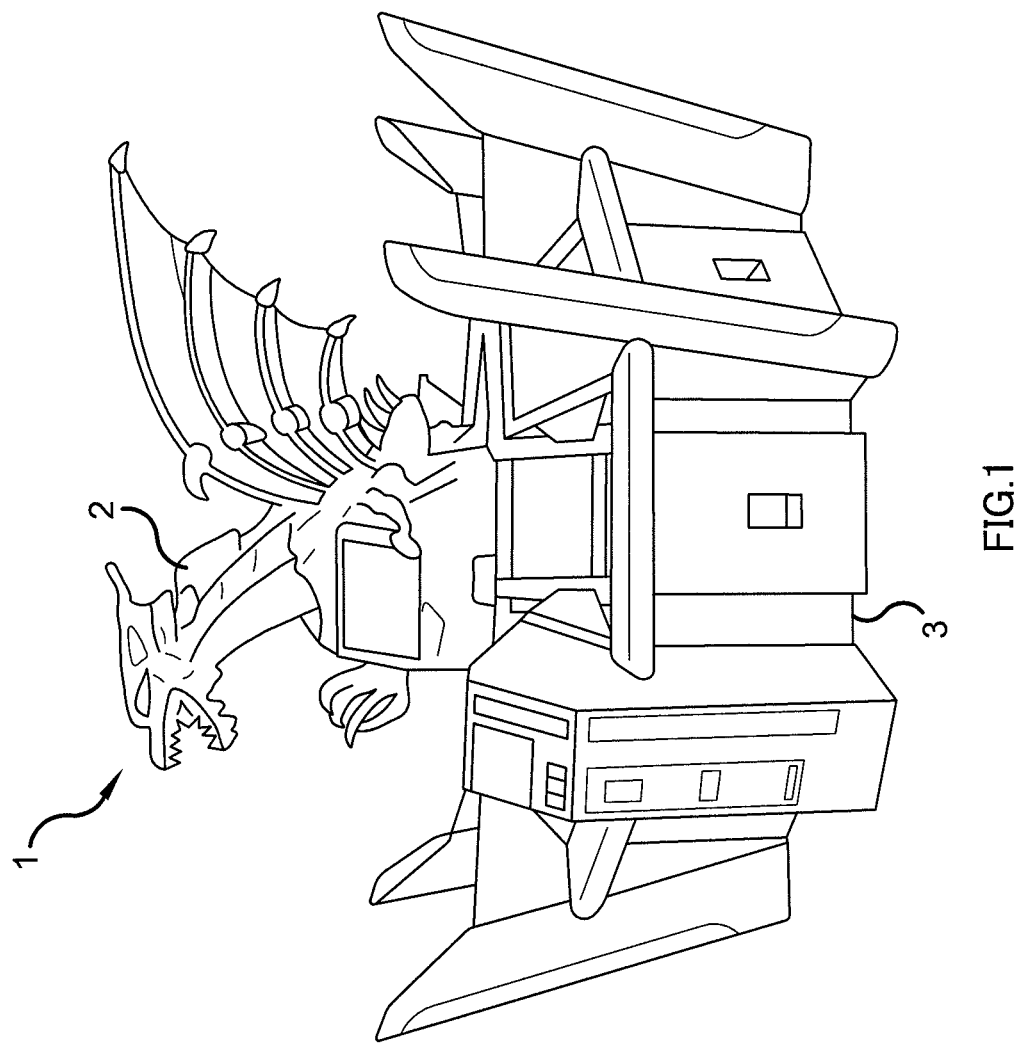
FIG. 1 is a view showing the appearance of the game machine according to the present invention.

A game machine as a multiplayer competition game device according to the present invention is configured as a token game machine, that is, a slot machine employing a video reel system in which three reels are displayed on a video. By using the video reels, a multiplayer competition game, in which characters are made to compete with each other, is played. Each character is represented as a "monster" having its own character.

A player can select any three monsters from among a plurality of monsters. A party is formed by the selected monsters and each monster is associated with each of the above-mentioned reels. Each reel uses a table in accordance with the associated monster. Due to this, a reel band having an arrangement of symbols corresponding to the monster is determined and the symbol specific to the monster is displayed in its varying or halted state. After the monsters are associated with all of the reels, a dividend list is created based on the data of the symbols included in the table. The dividend list data is displayed on the screen as a dividend list.

The physical strength value, the favorite trick (fighting ability or defending ability), and the arrangement of symbols in the reel band differ from monster to monster, therefore, a plurality of monsters are combined to realize various sequences. For example, such characteristics are generated that "vulnerable to a fire offensive but well defended against a magic offensive" or "the offensive power is low but the physical strength is high and good at a fight of attrition". Then, since the symbols to be arranged on one reel are fixed, it is not possible to set the character of a monster that is well defended against all kinds of offensive and there is established a relationship of strength like that between stone, scissors, and paper in a finger flashing game.

In the present game machine, the symbol is displayed in its varying state on the video reel and after a lapse of a predetermined time, it is displayed in its halted state and when a particular prize-deserving sequence is realized, a dividend is paid and a rendering of carrying out an offensive against the opponent monster is performed. The attacked monster decreases its physical strength value. Two players carry out an offensive and protect against the offensive by rotating the reels by turns and when the physical strength value of a monster of one of the players is decreased to zero, the other player wins the game.

Further, there are two concepts of value, that is, "credit" and "magic point" in regard to the present game machine. "Credit" relates to insertion or payout of a token as in the general token game. "Magic point" is a concept of value specific to the present game machine. In other words, it has nothing to do directly with the credit and increases or decreases in a particular game, having a concept of its own BET and WIN (dividend).

The games played with the present game machine are divided into a Short play, an Original game, and a Jackpot game. A Short-play is ready when lines (1 to 5) are set by operating a bet button after inserting a token. In other words, this is a game that has obviated an entry card for reading and writing data via magnetism. A player competes with a computer (client device) using a predetermined monster. Because no entry card is required, a player can participate in a game readily. The object of the Short-play is to make a player understand the contents of the game and move to a "multiplayer competition game" to be described later. After preparations are made, when a start button is operated, the reels rotate and if a predetermined combination of symbols appears, damage is given to the monster of the opponent (computer, here) and a dividend is paid. Each time the opponent monster is defeated, the player gains a victory bonus (for example, ten tokens) and if the player wins three consecutive games, it is made possible for him/her to play a Jackpot game to be described later.

By the way, the Short-play is played based on the following supplementary rules. (1) A player takes the first action in all of the battles, that is, the player is first to realize a sequence when the reels rotate and stop and gain its dividend. (2) The level of the opponent monster becomes higher in order of "1→2→3", therefore, the opponent becomes stronger each time the player wins. Here, the "level of a monster" is the offensive power that decreases the physical strength value of the opponent monster and the resistivity that prevents its own physical strength value from decreasing when attacked by the opponent, both the offensive power and the resistivity being expressed by a numeric value. For example, when the level of a monster becomes high, the resistivity increases and the reduction in physical strength value becomes less for the same offensive, or the offensive power increases and damage (reduction in physical strength value of the opponent) given to the opponent becomes greater by the same offensive (the same sequence), and the probability of the final victory becomes higher. (3) The physical strength value of the monster selected by the player is fully restored for each game. (4) When the monster selected by the player is defeated, the level of the opponent monster returns to 1 and the physical strength value is restored by half. (5) Immediately after a battle starts, the opponent monster does not carry out an offensive until the offensive of the player hits the monster. In other words, no prize-deserving sequence is realized on the opponent (computer) side until a particular prize-deserving sequence is realized on the player side. (6) When "the monster symbols (symbols representing predetermined monsters as described above)" align in a line during the battle, the monster of the player turns into a monster with a higher level. As a result, the probability of the victory of the player becomes higher. On the other hand, when defeated in the battle, the original situation returns. In other words, the probability of the victory of the player is returned to the state before it is raised. (7) When a Jackpot-game to be described later ends, the monster of the player turns into a monster with a higher level. As a result, the probability of the final victory of the player becomes higher. On the other hand, when defeated in the battle, the original situation returns. In other words, the probability of the victory of the player is returned to the state before it is raised.

The Jackpot game is a game in which a player competes with a computer (server device arranged in the center). The server device has a case formed into a monster called "Goddragon" and a monster selected by a player competes with "Goddragon". When the offensive against Goddragon is effective, that is, when a particular sequence is realized, the player is given a hit dividend, that is, a dividend corresponding to the realized sequence and all of the dividends can be gained as a bonus. When Goddragon is defeated, the player can further gain a clear bonus. The Jackpot game is a free game and all of the gained dividends are turned into the credit. In the Jackpot-game, the time for a play is limited and after a lapse of a predetermined time, an offensive is carried out automatically.

The Original game is a game played over a long period of time using an entry card for reading and writing data via magnetism. A player inserts an entry card into a card insertion slot to participate in a game. The Original game is provided with the following five kinds of game aspect. That is, (1) Mission, (2) Tournament, (3) Blend, (4) Shop, and (5) Data.

Mission is a game in which, for example, a player clears 12 stages and hidden stages and is a game aspect the object of which is to collect a magic point, which is a point specific to the game, and a monster. It is a game in which a player competes with a computer (client device) and gains only a dividend of a token, that is, a credit during battle. When a player wins the battle, the player can gain a monster (three lives). In other words, data representing the monster and its life is input to the player side and written into a memory. Then, it is made possible to play a game again using the data representing the monster and its life. The life of a monster is a numeric value having the meaning of so-called life (the number of lives), indicative of the limit of the number of times (when the physical strength value is lost, it is regarded as one time) the monster can be used in the game. The life represents the remaining number of times available of the monster. On the other hand, when defeated, the life of the monster used is reduced by one. When a player wins and ends the game, the player gains the magic point as a bonus. The result of the game is recorded in the entry card.

The Tournament is a game in the form of a tournament in which a player competes with another player. In other words, players bet the magic points gained in the Mission and make their monsters to compete with each other. Only players having the magic point (10 to 30) specified for each tournament and monsters that meet the condition of participation can participate in the game. The condition of participation is that the number of remaining lives is equal to or greater than a value of criterion that the level is equal to or greater than a value of criterion, etc., which can be set in accordance with a game. A player pays a tournament fee (9 to 75 BETs), however, the magic point is used for the battle fee other than that. In other words, a player bets the magic point and gains the magic point as a dividend. A player gains a monster of the opponent each time the player wins, that is, data representing a monster corresponding to the opponent monster and its life is added. On the other hand, when defeated, the lives of all the monsters used in the battle are reduced by one, respectively. Therefore, when defeated in the battle, the number of times available of the monster is reduced. Here, a monster is represented on a card and displayed on the screen, therefore, to gain a monster means to gain a card of the monster on the screen. The card in hand can be used in a competition as a monster in hand. Thus, if a player continues to win to the last, the player wins the championship and can play the Jackpot-game in which to compete with Goddragon.

The Blend is a game aspect in which a plurality of monsters are combined to give birth to a new monster. In other words, by using data representing a plurality of monsters and their lives, data representing a new monster and its life is generated. When the same monsters are blended, the kind of monster remains the same and only their lives and scores are added. When different kinds of monster are blended, a new monster is generated and the life of the monster is half the total lives or half plus 0.5 and the score is initialized. When a Blend is performed, respective different credits in accordance with respective monsters are required. By the way, as a result of Blend, it is set that data representing a monster called "Goldmonster" is generated with a slight probability, which monster gives a large dividend although limited to only one battle.

The Shop is a game aspect in which a player purchases a monster for 10 credits. When a player operates to direct purchase, the credit possessed by the player is reduced by 10, data of any one of monsters is generated, and the player gains the card of the monster on the screen. By the way, although the probability is slight, it is set that data representing a monster called "Goldmonster" is generated as a result of purchase.

The Data is a game aspect in which the monsters possessed by a player or the score of the player is displayed. By specifying a particular monster, it is possible to display the score (the number of battles, the number of victories, the percentage of victories to the total number of battles, the total points gained in its life) of the monster alone.

FIG. 1 is an appearance view of the game machine according to the present embodiment. A game machine 1 is provided with a server device 2 arranged in the center, having a case the appearance of which is formed into a shape of a monster, and a plurality of client devices 3 around the server device 2. Each client device 3 comprises components required for the individual players to play a game, including a plurality of operation buttons and a display unit for displaying images. Each player plays a multiplayer competition game using the client device 3 and when a player wins the championship in the tournament, the player can participate in a free game in which the player competes with the server device 2 in the center. The case of the server device 2 having a shape of a monster enhances the effect of a rendering and provides the effect to raise the challenging spirit of a player.

Figure 2:
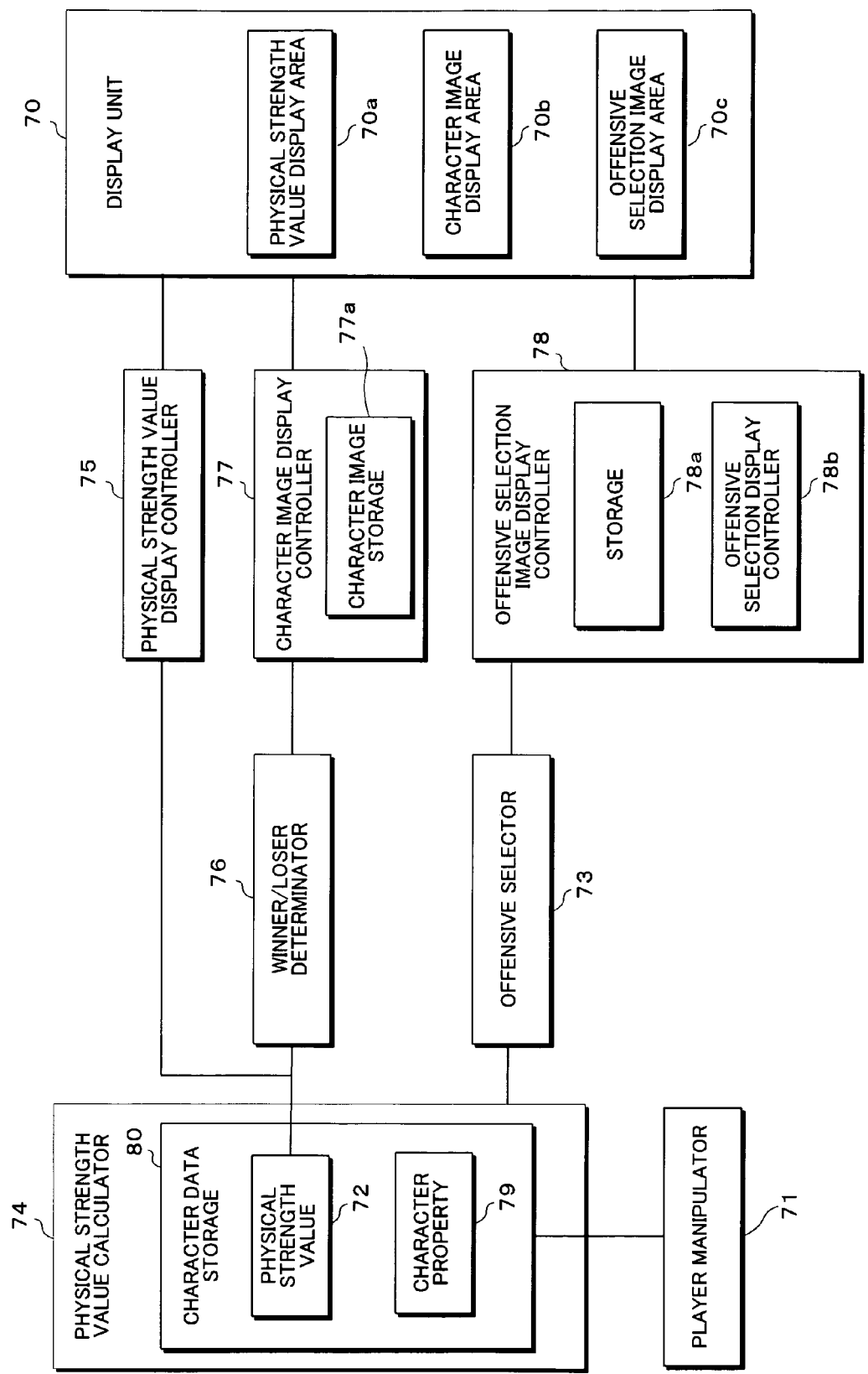
FIG. 2 is a block diagram conceptually showing the functionality of the game machine according to the present invention.

FIG. 2 is a block diagram conceptually showing the functions of the present game machine. A display unit 70 displays various images such as letters, figures, and symbols. The display unit 70 has a physical strength value display area 70a for displaying the physical strength value of a character by a bar graph etc., a character image display area 70b for displaying the image of a character such as a monster with which a player competes, and an offensive selection image display area 70c for displaying the situation of selection of a offensive kind or selection of a offensive value by virtual reels that rotate and stop. A player manipulator 71 is one with which a player performs operation relating to a game, having various operation buttons, a bet button, a token insertion slot, a token payout slot, etc. An offensive selector 73 selects an offensive type and an offensive value of an offensive against a character and determines positions at which the virtual reels stop. A physical strength value calculator 74 calculates the change of the physical strength value of the attacked character based on the offensive selected by the offense selector 73. A physical strength value display controller 75 displays the physical strength value calculated as above on the physical strength value display area 70a of the display unit 70. A winner or loser determinator 76 judges the winner and loser of a game. A character image display controller 77 displays the image of the above-mentioned character on the character image display area 70b of the display unit 70. An offensive selection image display controller 78 displays an offensive selection element image corresponding to the offensive selected by the offense selector 73 on the offensive selection image display area 70c of the display unit 70.

The offensive selection image display controller 78 has a storage 78a for storing a plurality of sets of offensive selection element images for which at least the type of the offensive can be discriminated along with their arrangement and an offensive selection display controller 78b for displaying the predetermined number of virtual reels in their varying and halted states on the offensive selection image display area using predetermined sets among the plurality of sets of offensive selection element images stored in the storage. Then, the offensive selection display controller 78b displays the virtual reels based on their halted state on the halt position determined by the offensive selector 73.

The offensive selector 73 selects an offensive type and an offensive value and controls the offensive selection image display controller 78 to display the offensive selection element image corresponding to at least the offensive type in its halted state in the predetermined arrangement on the offensive selection image display area 70c. The physical strength value calculator 74 has a character data storage 80 for storing a character property 79 and a physical strength value 72 after associating them with the character and calculates, works, and stores the physical strength value of the attacked character using a calculation expression corresponding to the character property 79 and the offensive type. For example, A, B, and C ranks are set in accordance with the matching degree between the character property and the offensive type and in the case of A, the offensive value is subtracted from the physical strength value and the result is stored again, in the case of B, two-thirds of the offensive value is subtracted from the physical strength value and the result is stored again, and in the case of C, one-third of the offensive value is subtracted from the physical strength value and the result is stored again. In other words, A means that the character is vulnerable to the offensive and C means that the character is well-defended against the offensive. The winner and loser determinator 76 judges whether or not the physical strength value 72 is equal to or lower than a predetermined final value, 0, for example, and judges that the character corresponding to the physical strength value 72 equal to or lower than the predetermined final value is the loser. The character image display controller 77 has a character image storage 77a for storing the image of a character for each character property and changes the image displayed on the character image display area 70b of the character judged to be the loser by the winner and loser determinator 76 by reducing its size or making it become extinct.

Figure 3:
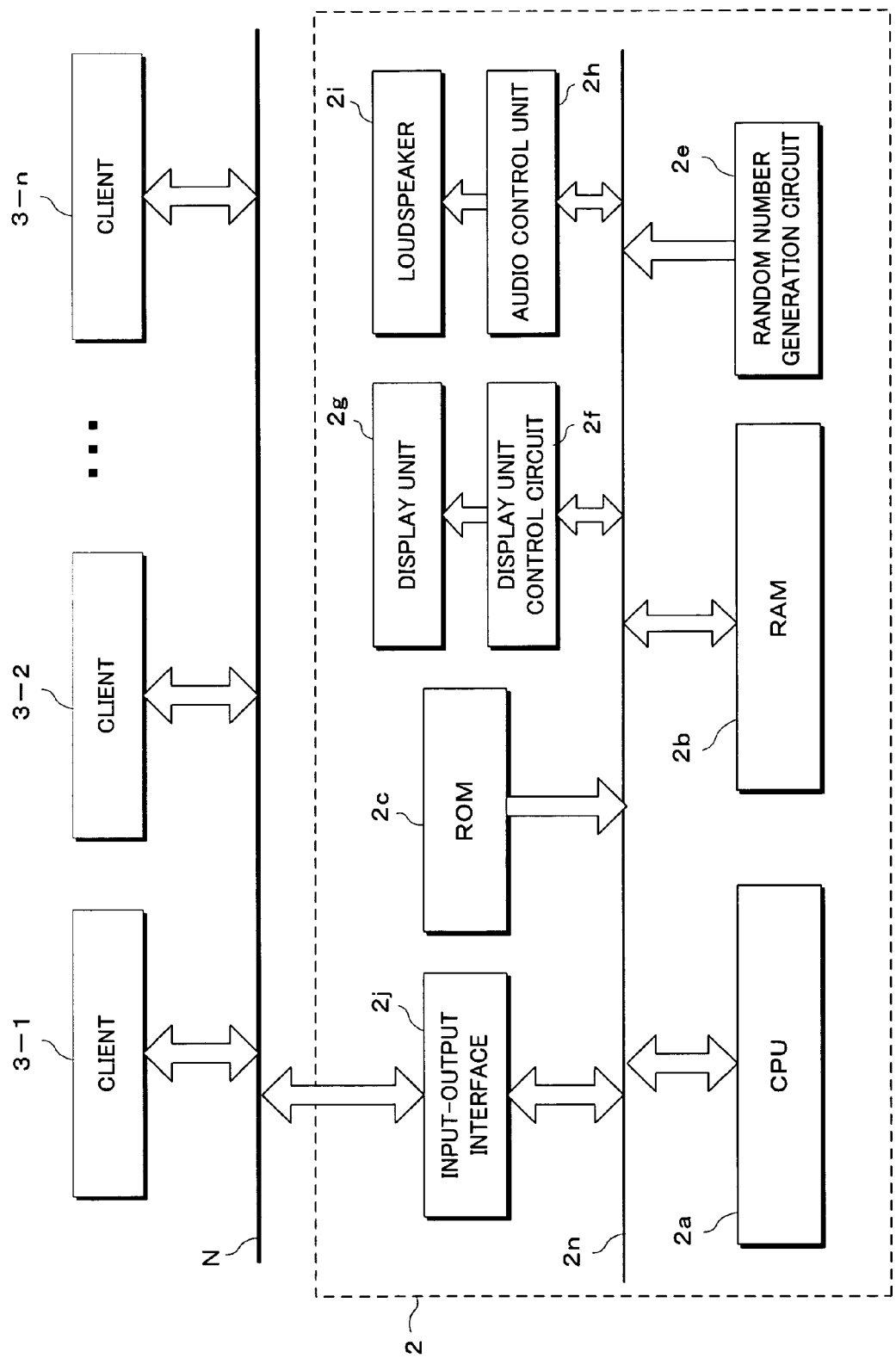
FIG. 3 is a block diagram showing the electric configuration of the server device.
Figure 6:
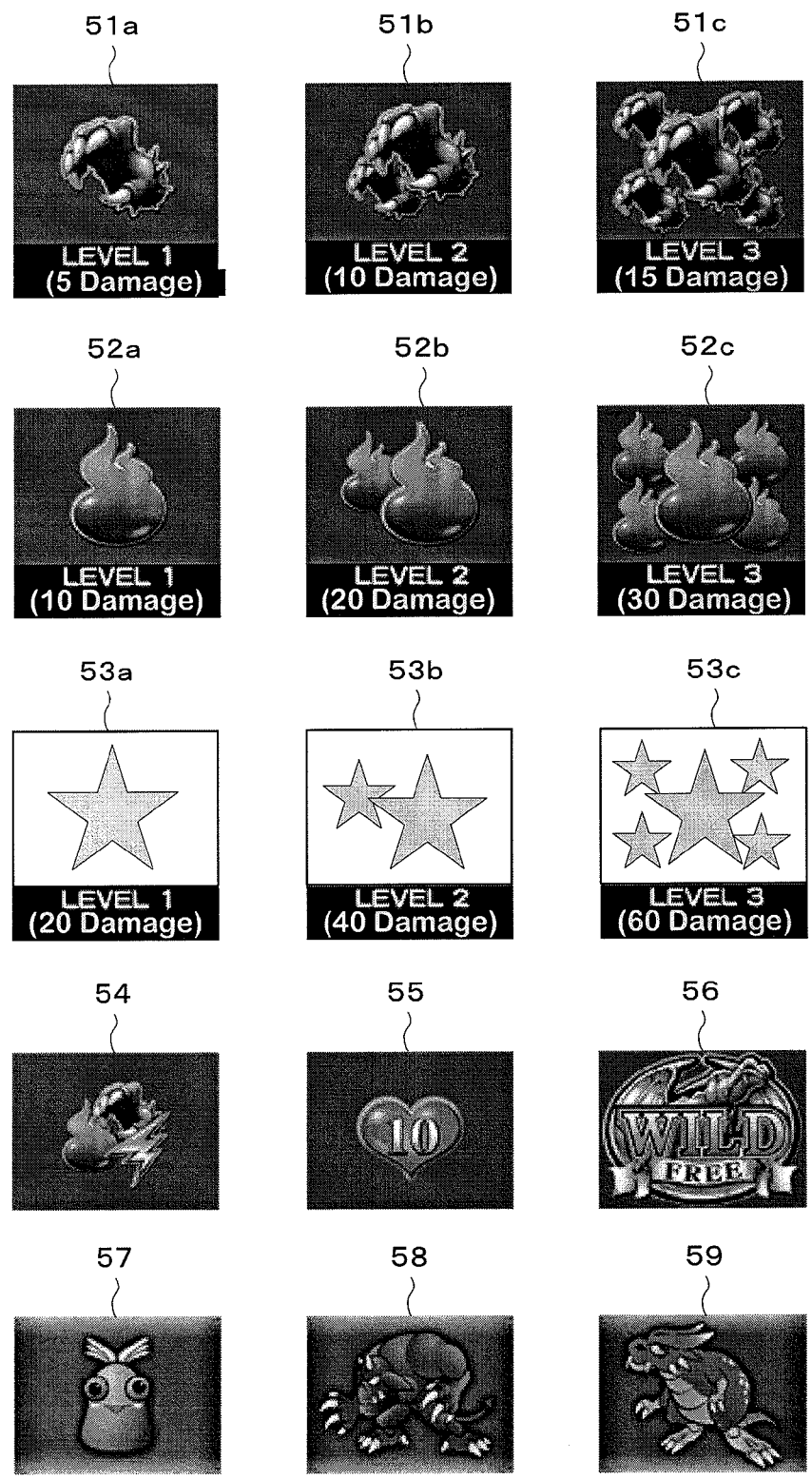
FIG. 6 is a view showing characters which can be displayed on the reels.
Figure 7:
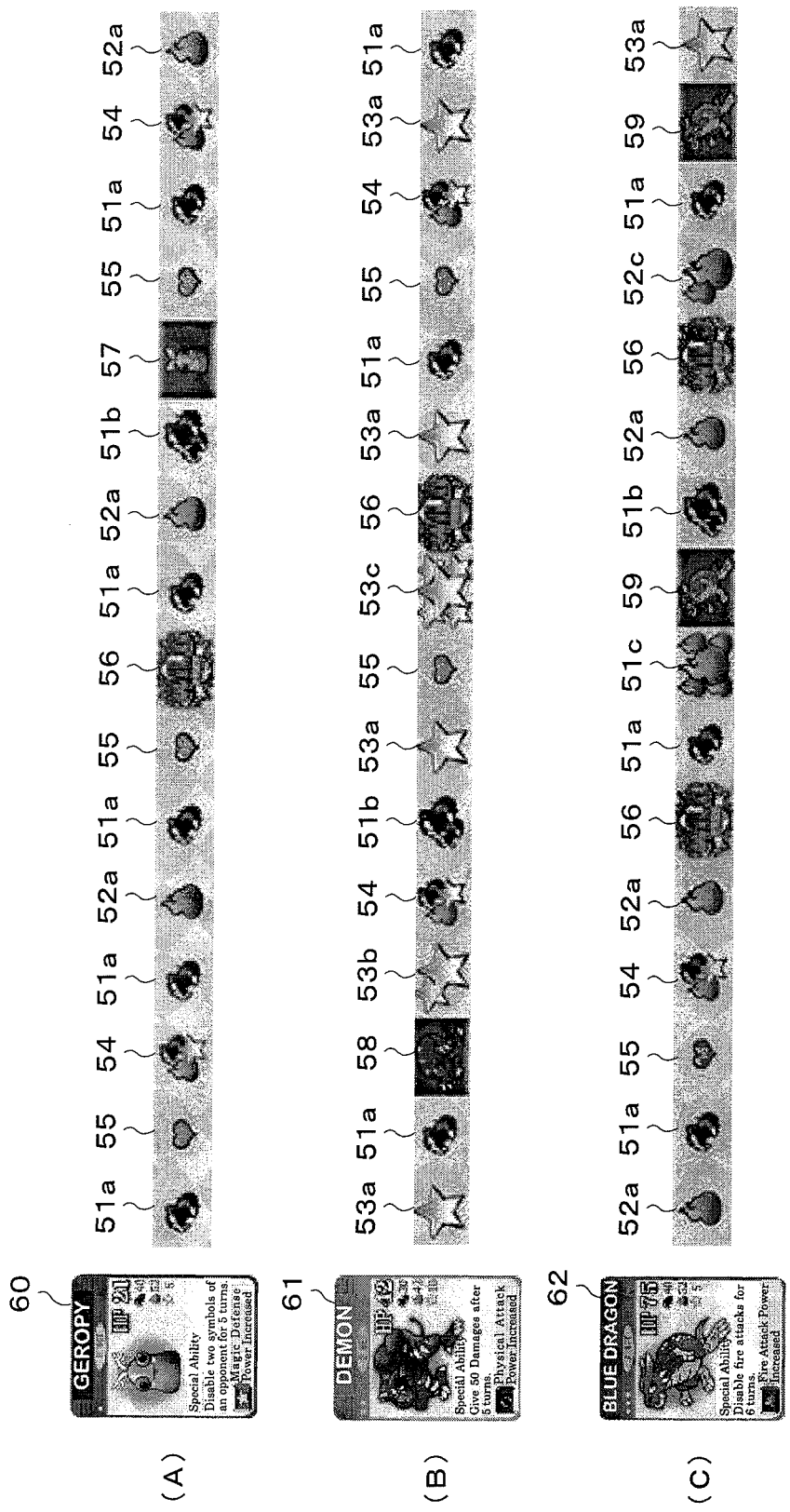
FIG. 7(A) is a view showing a card displaying a monster named "Geropee", and a table representing the symbols corresponding to the monster and their arrangement.
FIG. 7(B) is a view showing a card displaying a monster named "Daemon", and a table representing the symbols corresponding to the monster and their arrangement.
FIG. 7(C) is a view showing a card displaying a monster named "Blue Dragon", and a table representing the symbols corresponding to the monster and their arrangement.

FIG. 3 is a block diagram showing an electrical configuration of the server device 2. In the server device 2, a CPU 2a reads out data from a RAM 2b and a ROM 2c or writes data into the RAM 2b. Then, a control operation is performed in accordance with a program set in advance. In the ROM 2c, in addition to a control program for controlling the action of the game machine 1, data of the symbols that can be displayed on the reels, data representing each monster, and various kinds of tables (the arrangement of the symbols configuring the reel band as shown in FIG. 7) corresponding to the data representing each monster are stored as shown in FIG. 6 and FIG. 7, and these are read out and used as the need arises. The data representing each monster is displayed as a card until it is selected by a player.

A random number generation circuit 2e generates fixed random numbers. Data relating to images is output to a display unit 2g consisting of, for example, a liquid crystal display device, via a display unit control circuit 2f that performs image processing etc. On the display unit 2g, letters, still images, motion videos, etc., are displayed. It is not necessarily required for the server device 2 to have the display unit 2g. Data relating to audios is output from the CPU 2a to a loudspeaker 2i via an audio control unit 2h that performs audio processing, amplification, etc. The respective components perform transmission and reception of data to each other via a control bus 2n. Then, the server device 2 performs transmission and reception with each of client devices 3-1 to 3-n via an input-output interface 2j and a bus N.

Figure 4:
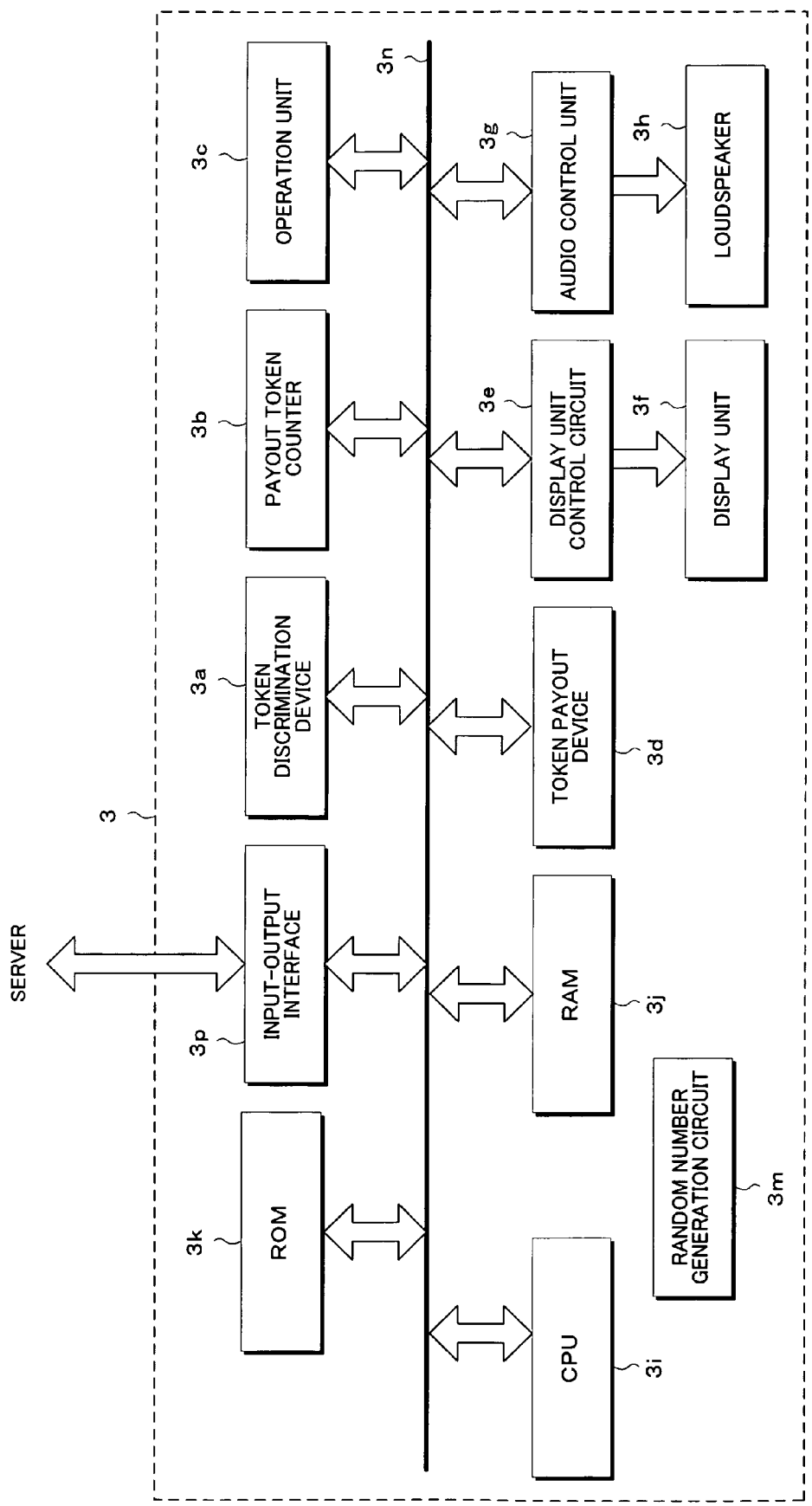
FIG. 4 is a block diagram showing the electric configuration of the client device.
Figure 5:
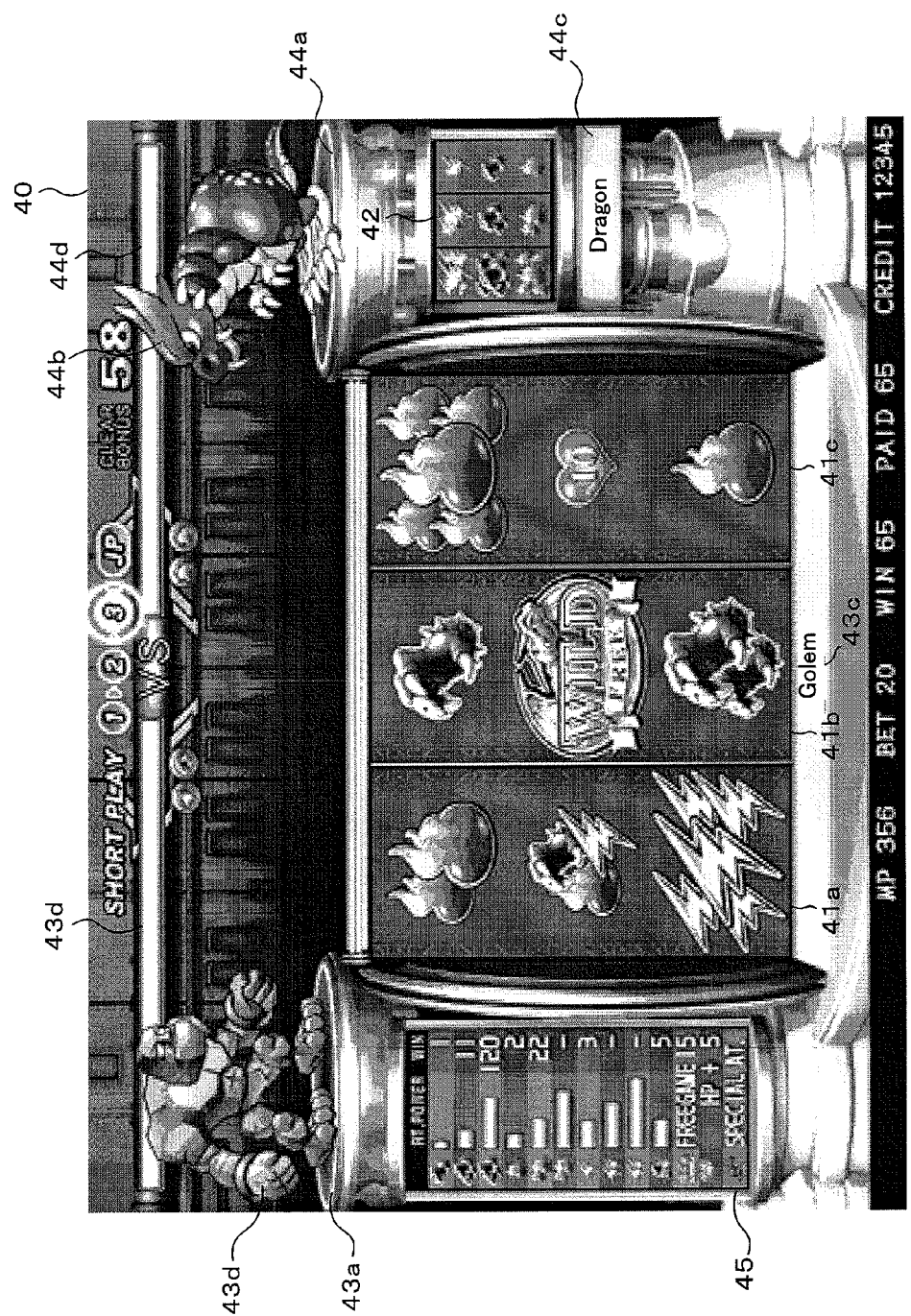
FIG. 5 is a view showing an exemplary screen displayed by the display unit.

FIG. 4 is a block diagram showing an electrical configuration of the client device 3. A token discrimination device 3a judges whether or not a token is proper and a payout token counter 3b counts the number of tokens to be paid. An operation unit 3c comprises a plurality of operation buttons, a start button, etc., and inputs a signal when a player operates these operation buttons and the start button. A token payout device 3d performs payout of tokens. Data relating to images is output to a display unit 3f consisting of, for example, a liquid crystal display device, via a display unit control circuit 3e that performs image processing etc. On the display unit 3f, letters, still images, motion videos, etc., are displayed. For example, images as shown in FIG. 5 are displayed. Data relating to audios is output to a loudspeaker 3h via an audio control unit 3g that performs audio processing, amplification, etc. The respective components perform transmission and reception of data to each other via a control bus 3n while being controlled by a CPU 3i. The CPU 3i reads out data from a RAM 3j and a ROM 3k or writes data into the RAM 3j. Then, a control operation is performed in accordance with a program set in advance. In the ROM 3k, a program for controlling image display, a program for controlling audios, etc., are stored and these are read out and used as the need arises. A random number generation circuit 3m generates fixed random numbers. The client device 3 performs transmission and reception of data with the server device 2 via an input-output interface 3p.

The display unit 2g and the display unit 3f configure a display unit and the RAM 2b or the ROM 2c configures a character storage, a character image storage, and a storage. Further, the operation unit 3c configures a player operation unit and the CPU 2a, the RAM 2b, and the ROM 2c configure an offensive selector, a physical strength value calculator, a physical strength value display controller, a winner and loser determinator, a character image display controller, and an offensive selection image display controller.

FIG. 5 is a diagram showing an example of a screen displayed on the display unit 3f of the client device 3. The center of a screen 40 is an offensive selection image display area and three reels 41a to 41c that display a plurality of kinds of symbol in the varying or halted state are displayed. On the right end of the screen 40, a sub screen 42 that displays the state of the reels of the opponent in a competition is displayed. With the present game machine, a player can select the card of a monster by operating the operation buttons on the operation unit 3c. Then, the player associates the cards of a monster arbitrarily selected with each of the reels 41a to 41c. This operation may be performed by the player following guidance. For example, a message "which monster you select as a boss?" or a message "which monster you use for the first reel?" is displayed and at the same time, cards of a plurality of monsters are displayed on the screen. Then, the card of a monster can be determined in accordance with the operation using the operation buttons and when a "determination button (enter key)" is operated, the selected monster is associated with the reel.

An area 43a on the left side of the screen 40 is a character image display area of a player and a monster 43b associated with the center reel 41b is displayed thereon among the three monsters selected by the player. The name of the monster 43b is displayed on a name display area 43c provided below the reels 41a to 41c. The physical strength value of the monster 43b is displayed by a bar graph 43d on the physical strength value display area of the character of the player on the upper left side of the screen. On the other hand, an area 44a on the right side of the screen 40 is a character image display area of the opponent in a competition and a monster 44b associated with the center reel on the opponent side is displayed thereon among the three monsters selected by another player, who will be the opponent in the competition, or the computer. The name of the monster 44b is displayed on a name display area 44c provided below the sub screen 42. The physical strength value of the monster 44b is displayed by a bar graph 44d on the physical strength value display area of the opponent character in the competition on the upper right side of the screen.

In a dividend list 45, a dividend to be paid to a player is displayed in accordance with a sequence realized by a combination of symbols displayed on the respective reels 41a to 41c. Normally, when the respective symbols are displayed in the halted state on the respective reels 41a to 41c after displayed in the varying state, a rendering is performed by an animation in which the monster 43*b* and the monster 44*b* fight with each other on the top portion of the screen 40. For example, in the case of the offensive, an animation is displayed in which the monster hits, kicks, bites, etc., the opponent. An animation in which the monster blows a flame against the opponent etc. may be displayed. Further, the image of the monster may be changed in accordance with the property of the monster on the offensive side. For example, in the case of a two-footed monster, an animation in which the monster stamps, kicks the opponent, etc., is displayed. In the case of a monster with a motif of wild beasts, an animation in which the monster roars out, shows its teeth, etc., is displayed. In this manner, by changing the images of the scene of the offensive by the monster and the monster itself, it is made possible to make clear the offensive type, the property of the monster, etc. Further, the image display is prevented from becoming monotonous and it is made possible to perform an effective rendering. As a result, it is possible to impress a player with the scene of the offensive. Furthermore, when attacked by the opponent, the physical strength value of the monster decreases and at this time, it may also be possible to change the image of the monster. In other words, when the physical strength value of the attacked monster decreases, the scene in which the monster is injured and writhes in agony is displayed in an animation. Due to this, it is possible to make clear the offensive received and reduction in physical strength value. However, when a special offensive is carried out, a rendering by an effect animation using the entire screen 40 is displayed. For example, an animation in which a monster moves around on the entire screen 40, the size of a monster is increased, etc., is displayed. At this time, it may also be possible to change the color, to display flashing, or to display the image of lighting.

As shown in FIG. 6, there exist many kinds of symbol to be displayed on the respective reels 41*a* to 41*c*. In FIG. 6, symbols 51*a* to 51*c* are those for carrying out a physical offensive. When certain symbols align in a line (prize-deserving line), the monster 43*b* selected by the player carries out a physical offensive against the opponent monster 44*b*. By the way, the fighting power is that of a symbol with the lowest level. Symbols 52*a* to 52*c* are those for carrying out a fire offensive. When certain symbols align in a line, the monster 43*b* carries out a fire offensive against the opponent monster 44*b*. By the way, the fighting power is that of a symbol with the lowest level. Symbols 53*a* to 53*c* are those for carrying out a magic offensive. When certain symbols align in a line, the monster 43*b* carries out a magic offensive against the opponent monster 44*b*. By the way, the fighting power is that of a symbol with the lowest level.

A symbol 54 is one for carrying out a multiple offensive. When the symbols 54 align in a line, the monster 43*b* carries out a physical offensive, a fire offensive, and a magic offensive simultaneously against the opponent monster 44*b*. At this time, each offensive is carried out with the fighting power supposed to be level 1. The level of the fighting power indicates the degree that the physical strength value of the opponent monster can be decreased and when the numeric value is large, it is possible to decrease the physical strength value of the opponent monster more. Further, it is possible for the symbol 54 to perform the same function as that of the symbol of a physical offensive, a fire offensive, or a magic offensive with level 1, that is, the symbol 51*a*, the symbol 52*a*, and the symbol 53*a*. A symbol 55 is one for restoring the physical strength. When the symbols 55 align in a line the physical strength value of the monster 43*b* is restored by a fixed numeric value. A symbol 56 is a wild symbol. The symbol 56 has a function of being replaced with any symbol except that of a monster. When the symbols align in a line, a free game starts, which can be started without betting. Symbols 57 to 59 are those representing the respective monsters. When one or more (three in total) monsters are revealed on the respective three reels 41*a* to 41*c*, the respective monsters' favorite tricks are displayed on the screen the player can put it into action by selecting one of the tricks according to the guidance on the screen. The favorite trick that can be put into action differs depending on the kind of a monster.

In the game machine according to the present embodiment, the level, favorite trick, reel property, and BET fee are determined for each monster. As shown in FIG. 7(A) to FIG. 7(C), these are displayed on cards 60 to 62 representing monsters. The level represents the degree of the ability of the monster. The physical strength value is a value that determines the initial physical strength of the monster. The favorite trick is an attribute of the offensive that the monster has and can be increased or decreased. The reel property is determined by the ratio between the numbers of symbols representing a physical offensive, those representing a fire offensive, and those representing a magic offensive in the reel band. The bet fee is the number of BETs required to use the monster in a game. The BET fee differs from monster to monster and a monster with a higher level has a higher probability that the player will win, therefore, the BET fee is higher.

In the game machine according to the present embodiment, monsters configuring a reel band differ depending on the kind of monster. In other words, a table used as a reel band includes data of a plurality of kinds of symbol and differs from monster to monster. For example, as shown in FIG. 7(A), on a table corresponding to a monster called "Geropy", the symbols 51*a* representing a physical offensive and the symbols 52*a* representing a fire offensive are large in number, therefore, the offensive power is not high. In other words, even if the symbols align in a line, the degree that the physical strength value of the opponent monster can be decreased is low. On the other hand, the table is abundant in symbols 55 that restore the physical strength value by 30, therefore, the monster has many chances to recover even if attacked. As shown in FIG. 7(B), a table corresponding to a monster called "Demon" includes many symbols 51*a* and 51*b* representing a physical offensive and many symbols 53*a* to 53*c* representing a magic offensive, therefore, the offensive power is high. In other words, when the symbols align in a line, the degree that the physical strength value of the opponent monster can be decreased is high. As shown in FIG. 7(C), a table corresponding to a monster called "Bluedragon" includes many symbols 52*a* to 52*c* representing a fire offensive and also includes the two wild symbols 56, therefore, the offensive power is high. In other words, when the symbols align in a line, the degree that the physical strength value of the opponent monster can be decreased is high. As described above, the tables specific to the respective monsters are stored in the ROM 2*c* and function as reel bands when associated with respective reels by a player.

As described above, a table includes a monster or data relating to the action of the monster, therefore, the monster selected by a player or the symbol relating to the monster is displayed in the varying or halted state. When the monster selected by the player or the symbol relating to the monster is displayed in the halted state, the monster takes the action of the offensive relating to the symbol, therefore, it is possible to inform the player in advance of the action of the monster by means of the display of the above-mentioned symbol in the halted state. For example, when the monster selected as above is "Bluedragon", the symbol representing Bluedragon and the symbol representing the favorite offensive of Bluedragon are included on the table, therefore, when a prize-deserving sequence due to the symbols is realized, it is possible to impress the player that a prize-deserving sequence specific to Bluedragon is realized by displaying an animation in which the offensive action specific to Bluedragon is taken.

Next, the operation of the game machine according to the present embodiment is explained. First, in the Short play, it is assumed that a party is composed of three of the same monsters. Therefore, the three reels display symbols based on the same table. Since the table includes only one kind of symbol for performing the favorite trick of the monster, it is possible for the monster to perform only one favorite trick. As a monster of a player, any one of monsters with the lowest level (for example, level 1) is selected. If the player loses a game, a monster is selected again by lottery. As a monster to be an opponent to the player, any one of monsters with a level slightly higher than the lowest level (for example, level 2) is selected in the first round. Then, in the second round, any one of monsters with, for example, level 3 is selected, and in the third round, any one of monsters with a still higher level, for example, level 4 is selected. After preparations are made, when a start button is operated, the reels rotate and if a predetermined combination of symbols appears, damage is given to the monster of the opponent (computer, here) and a dividend is paid. Each time the opponent monster is defeated, the player gains a victory bonus (for example, a credit of ten tokens) and if the player wins three consecutive games, it is made possible to play the Jackpot game. In the Jackpot game, the same monster appears at all times.

Next, the Mission is explained. In Mission 1, a player plays one battle game with an opponent. After paying a challenging fee (for example, three BETs), the player determines members configuring a party while observing the boss (monster) of the opponent. The boss is a monster associated with the center reel and plays the leading role of the party and its character determines the policy of strategy. "Members" are monsters to be associated with the right reel and the left reel and configure the party together with the boss (this applies to other positions). During the battle, a credit is bet and a game to gain (WIN) the credit is played. The player first initiates an offensive and if the player wins, it is possible to gain a monster. In other words, data representing the monster is output to the RAM 2b. The monster the player gains is any one of the three opponent monsters. Further, the player gains one life and the magic point (5 MP). On the other hand, if defeated, the life of any one of the monsters in the party is decreased by one. The monster is selected at random.

In Mission 2, a player plays two battle games with an opponent. The order of the battle is the same as that in Mission 1 and two game are played with the same party. After paying a challenging fee (for example, four BETs), the player determines members configuring a party while observing the boss (monster) of the opponent. If the player wins the first game, the player gains any one of the three opponent monsters (two lives) and plays the second game. If the player loses the first game, the game is over. If the player wins the second game, the player becomes "Clear" and gains one more monster and the bonus magic point, for example, 10 MP. On the other hand, if defeated, the life of any one of the monsters in the party is decreased by one. The monster is selected at random.

In Mission 3, a player plays three battle games with an opponent. A party is composed of a boss and four members. By the way, a system is employed, in which a member (monster) once used is retreated into a monster holder. In other words, it is assumed that a monster selected as a member can be used only once, a monster selected as a boss is fixed, and a monster gained from the opponent can be used. As described above, a member (monster) used once is retreated into the monster holder, therefore, a monster once used in a battle cannot be used any longer. Due to this, the level of difficulty in forming a party is increased and it is made possible to excite a player's desire to win the game to gain a monster from the opponent. If the player wins three consecutive games, the player becomes "Clear" and gains the bonus magic point.

In the first round, the player selects three monsters from the party to form a battle team and fights a battle. If the player wins the game, the player gains any one of the three monsters of the opponent (three lives). On the other hand, if defeated, the game is over at this point and the life of any one of monsters in the party is decreased by one. The monster is selected at random. In the second round, the player selects two members (monsters) from among the party consisting of the members (monsters) excluding the members used in the first round and the monster gained from the opponent and added to the party, forms a battle team, and fights a battle. If the player wins the game, the player gains any one of the three monsters of the opponent (three lives). On the other hand, if defeated, the game is over at this point and the life of anyone of monsters in the party is decreased by one. The monster is selected at random. In the third round, the player forms a battle team from the three monsters, that is the members left to the last and the monster gained from the opponent, and fights a battle. If the player wins the game, the player gains any one of the monsters of the opponent (three lives) and the bonus magic point (20 MP). On the other hand, if defeated, the game is over at this point and the life of any one of monsters in the party is decreased by one.

As described above, a party is newly formed using the gained monster when the next game is played, therefore, the more times the player win the game, the player's monsters increase in number to diversify the party configurations, and it is made possible for the games to have a higher strategic characteristic.

Next, in the Tournament, respective players form respective parties of their own and play tournament games. This is a game in which only players who have a specified magic point determined in advance can participate. The game proceeds in such a way that after paying a tournament participation fee on credit, a player bets the magic point and tries to win the magic point. Therefore, it is acceptable that the magic point becomes zero or negative. In the Tournament, a player wins the first prize if the player wins three consecutive games. At first, a player has seven monsters and the monster used once is moved to the monster holder and confined therein. Therefore, the monster cannot be used in the next and following games. However, if a player wins a competition, the player can gain a monster and use the gained monster in the next and following games. Therefore, if a player wins three consecutive games, the player will use up all the monsters including the gained monster as a result. On the other hand, if defeated in the competition, the life of a monster in the party is decreased. A player can make only one party participate in a game. By the way, if the number of players who participate in the Tournament is less than the number of players who can participate, a computer functions as a participant. A player who wins the championship in the Tournament can challenge the Jackpot game, which is a free game.

Figure 8:
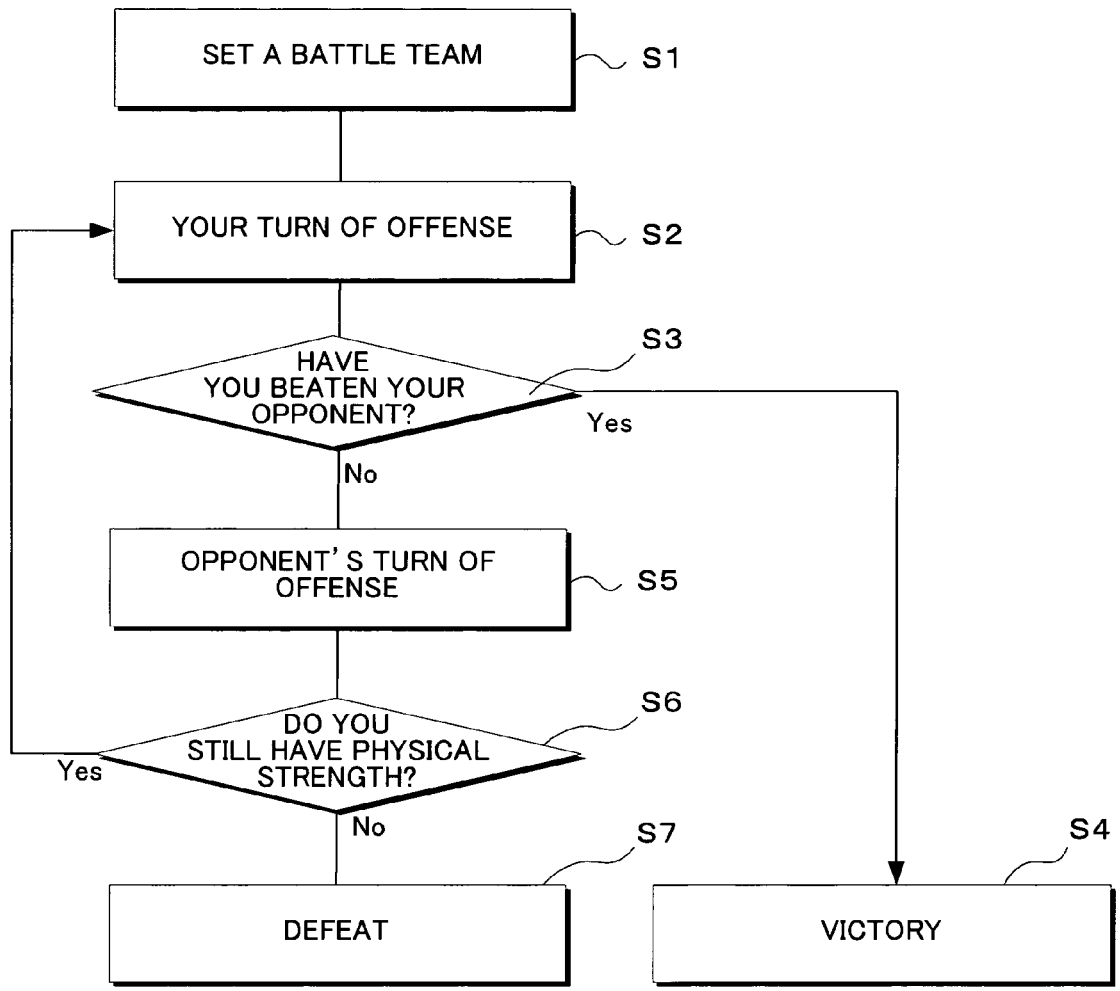
FIG. 8 is a flowchart showing the flow of the game.
Figure 9:
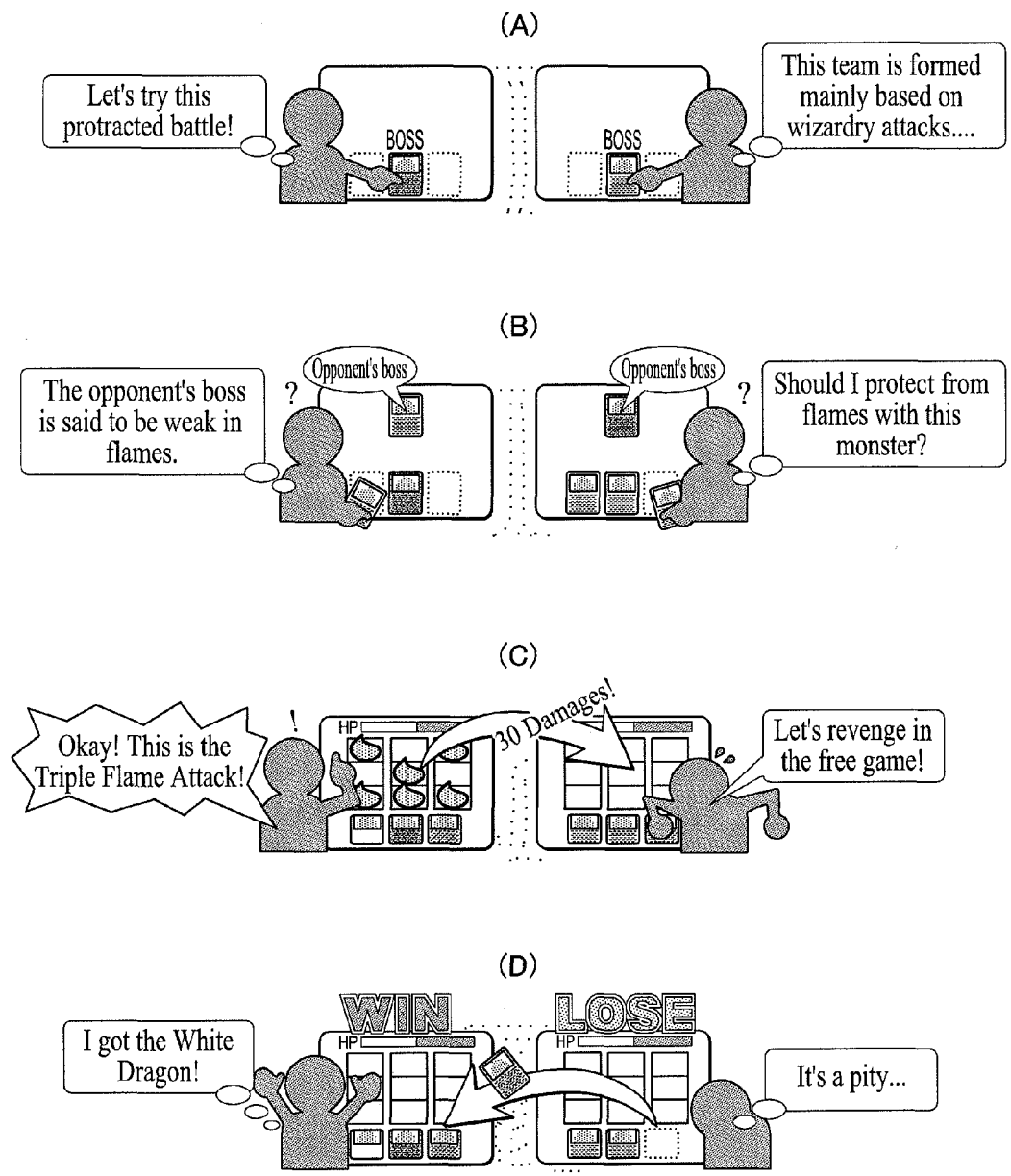
FIG. 9(A) is a view how a party is being formed.
FIG. 9(B) is a view how a party is being formed.
FIG. 9(C) is a view how a battle is being fought.
FIG. 9(D) is a view how a battle has been settled.

FIG. 8 is a flow chart showing a specific flow of the Tournament game. First, after betting the required number of BETs, a player determines a battle team (party) (step S1). Here, as shown in FIG. 9(A), a monster to be associated with the center reel is determined. The monster will be the "boss" and plays the leading role in the party and the policy of strategy is determined by its character. For example, as shown in the figure, a player on the left side tries to set a monster having a high recuperative power and good at a fight of attrition as the boss. A player on the right side tries to set a monster as the boss, which monster has a high magic offensive power, that is, with which monster, the degree is large that the physical strength value of the opponent monster is decreased when the symbols 53a to 53c for carrying out a magic offensive align in a line, or which monster corresponds to the reel including many symbols 53a to 53c on the table, or which monster corresponds to the reel including many symbols 53c in particular. Next, monsters to be associated with the right reel and the left reel are determined. These monsters configure the party as the "members". At this stage, the opponent boss can be recognized by each other, therefore, each player determines monsters as members while estimating the opponent's strategy. For example, as shown in FIG. 9(B), the player on the left side observes the opponent boss and judges that the boss is a monster vulnerable to a flame (a fire offensive), that is, the degree is large that the physical strength value is decreased when the symbols 52a to 52c for carrying out a fire offensive align on the player's side. The player on the right side tries to add a monster to the party, which monster is well-defended against a fire offensive, that is, with which monster, the degree is small that the physical strength value is decreased when the symbols 52a to 52c for carrying out a fire offensive align in a line on the opponent side, because the boss monster of the player is vulnerable to a fire offensive. Since the game has two objects, one is to defeat the opponent in the competition and the other is to increase the number of tokens, selection of a monster (card) to be associated with a reel affects achievement of both the objects. In the present game machine, when a monster is associated with a reel, a dividend list is displayed in a real time manner. Therefore, it is possible for a player to select a monster to be associated with a reel from a strategic standpoint while comparing the reel property and the dividend list. The total value of the physical strength values of the three monsters configuring the party is set as an initial physical strength of the party. When all of the monsters are associated with the reels, dividend list data is generated and displayed as a dividend list on the screen 40.

Next, each player rotates the reels by turns and carries out an offensive against the opponent party. Then, on each of the reels 41a to 41c, a symbol corresponding to the offensive type and the offensive value selected by the CPU 2a is displayed in its halted state. Due to this, it is possible to visually inform the player of the kind of offensive to be carried out and the level thereof (offensive value). For example, when it is selected to carry out a physical offensive, the symbol (any one of 51a to 51c) representing a physical offensive is displayed in its halted state in the line. Due to this, the player comes to expect the display of an image about the offensive to be carried out from now as in the case where the player receives payout when a predetermined sequence is realized on a slot machine.

The monster on the offensive side changes its image in accordance with the offensive type when carrying out an offensive. In other words, in the case of a physical offensive, an animation in which the monster hits, kicks, or bites the opponent monster is displayed. In the case of a fire offensive, an animation in which the monster blows a flame against the opponent etc. is displayed. Further, the image of the monster may be changed in accordance with the property of the monster on the offensive side. For example, in the case of a two-footed monster, an animation in which the monster stamps, kicks the opponent, etc., is displayed. In the case of a monster with a motif of wild beasts, an animation in which the monster roars out, shows its teeth, etc., is displayed. In this manner, by changing the images of the scene of the offensive by the monster and the monster itself, it is made possible to make clear the offensive type, the property of the monster, etc. Further, the image display is prevented from becoming monotonous and it is made possible to perform an effective rendering. As a result, it is possible to impress a player with the scene of the offensive.

When a player carries out an offensive (step S2), the player judges whether or not the opponent is defeated (step S3). In other words, the player judges whether or not the physical strength value of the opponent monster can be decreased to zero. For example, as shown in FIG. 9(C), a fire offensive is being carried out against the party of the player on the right side because the symbols of fire offensive align in a line in the party of the player on the left side. When the opponent is defeated, the player is the winner in the battle (step S4). If the opponent is not defeated, then the opponent carries out an offensive (step S5). At this time, when a monster is attacked by the opponent, the physical strength value of the monster decreases and it may be possible to change the image of the monster at that time. In other words, when the physical strength value of the attacked monster decreases, the scene in which the monster is injured and writhes in agony is displayed in an animation. Due to this, it is possible to make clear the offensive received and the reduction in physical strength value. Further, the image display is prevented from becoming monotonous and it is made possible to display an effective rendering. As a result, it is possible to impress a player with the received offensive. As described above, the physical strength value of the party of the player decreases when attacked by the opponent, therefore, it is judged whether or not the physical strength value of the party of the player still remains (step S6). Then, when the physical strength value of the party of the player still remains, the next step will be step S2, where the player carries out an offensive. On the other hand, in step S6, when no physical strength value of the party of the player remains, the player is the loser (step S7).

When the player on the left side wins as a result of the battle described above, as shown in FIG. 9(D), the player receives a bonus dividend, that is, a predetermined number of credits to be given to the winner in a battle and gains any one of the opponent monsters. In other words, data representing the monster and its life is added to the player side and written into a memory. Then, it is made possible to play a game again using the data representing the monster and its life. Further, the player gains the above-mentioned magic point (for example, 10 MP). On the other hand, on the defeated player side on the right side, the lives of all the monsters in the party decrease by one.

Here, there is a fixed correspondence between the life value of the monster that the player on the left side has gained and the life value each monster configuring the party of the player on the right side has lost. For example, when the monster that the player on the left side has gained is a strong monster, its life value is decreased and on the other hand, when the monster that the player on the left side has gained is a weak monster, its life value is increased. In other words, the number of lives the loser side in the competition loses is equivalent to the monster and the number of lives input to the winner side in the competition, therefore, it is made possible to keep constant a payout rate to be set.

By the way, it may also be possible to cause any one of monsters configuring the party to become extinct when defeated in the competition. In this case also, the monster and its life that the winner side in the competition gains is assumed to be approximately equivalent to the monster that has become extinct. Due to this, it is made possible to keep almost constant the total of the game values. Due to this, even if many players participate in a game and have a competition, it is unlikely that the value of a character or the value of a game increases or decreases, and it is possible to attract the interest of a player continuously. For example, when the number of lives that a monster that has become extinct on the loser side in the competition is three, then the number of lives of the monster that the winner side in the battle is set to three. Further, it may also be possible to set so that the winner side gains a monster different from the monster that has become extinct on the lower side in the competition. In this case, the winner side gains a monster and its life equivalent to the monster that has become extinct and its life. For example, when a monster having a very high fighting ability becomes extinct on the loser side and its number of lives is 1, it may also be possible to set the number of lives of a monster that the winner side gains to five although it has a low fighting ability.

In the above-mentioned embodiment, a case where a competition is done between two players is described, however, the present invention can be applied to a case where a competition is done among three or more players. In such a case, players rotate and stop the virtual reels by turns to select an offensive type and an offensive value, and the physical strength values of the characters of all of the other players are changed based on a predetermined calculation expression, and a character whose physical strength value becomes equal to or lower than a predetermined value is judged to be a loser and excluded from the competition. In this case, it is not necessary that all of the players be human beings, and it is a matter of course that a client device or a server device can play a role of a player instead of a human being.

Second Embodiment

A game machine according to the present embodiment is configured as a token game machine and is a slot machine that employs a video reel system in which three reels are displayed on a video. In other words, as in a case where actual reels are used, virtual reels on which symbols to be displayed are arranged in advance are displayed on a video and thus a slot machine is configured. Then, by using the video reels, a multiplayer competition game is played in which characters compete with each other. Each character is represented as a "monster" having its own character.

A player can select any three monsters from among four or more monsters. The respective selected monsters are associated with the respective virtual reels described above. Each lottery table is associated with each virtual reel and used. Due to this, a reel band of a virtual reel having an arrangement of symbols in accordance with the monster is determined and the symbol specific to the monster is displayed in its varying or halted state. Besides the physical strength value, the favorite trick (fighting ability or defending ability) differ from monster to monster, the arrangement of symbols in the reel band differ from each other, therefore, by combining a plurality of monsters, how likely each symbol aligns, that is, how likely a prize-deserving sequence is realized is characterized by the selected monster. For example, if it is assumed that the kind of symbol equals the kind of offensive, a symbol has three kinds, that is, "fire", "physical", and "magic", and each symbol has three levels, then, there are eventually nine kinds of prize-deserving sequences and nine kinds of offensive. Then, a certain monster is caused to have a characteristic that "it is vulnerable to a fire offensive, however, well-defended against a magic offensive" etc. In the reel band corresponding to the monster, many "fire" symbols are arranged and the prize-winning probability of the "fire" symbol is high in the reel. If two more like monsters are selected, a virtual reel group in which the three "fire" symbols align and it is likely that a prize-deserving sequence is realized.

Then, since the symbols to be arranged on one reel are fixed, it is not possible to set the character of a monster that is well defended against all kinds of offensive and there is established a relationship of strength like that between stone, scissors, and paper in a finger flashing game.

By the way, it may also be possible to configure so that a special prize-deserving sequence is realized under a certain condition by setting a symbol other than above in actual.

In the present game machine, symbols are displayed in their varying state on the video reel and then displayed in their halted state after a lapse of a predetermined period of time, and when a particular prize-deserving sequence is realized, a dividend is given and a rendering of offensive against the opponent monster is performed. The attacked monster decreases its physical strength value. Two players carry out offensive and defense by rotating the reels by turns and when the physical strength value of a monster of one of the players is decreased to zero, the other player wins the game.

Further, there are two concepts of value, that is, "credit" and "magic point" in regard to the present game machine. "Credit" relates to insertion or payout of a token as in the general token game. "Magic point" is a concept of value specific to the present game machine. In other words, it has nothing to do directly with the credit and increases or decreases in a particular game, having a concept of its own BET and WIN (dividend).

The games played with the present game machine are divided into a Short play, an Original game, and a Jackpot game. A Short-play is ready when lines (1 to 5) are set by operating a bet button after inserting a token. In other words, this is a game that has obviated an entry card for reading and writing data via magnetism. A player competes with a computer (client device) using a predetermined monster. Because no entry card is required, a player can participate in a game readily. The object of the Short-play is to make a player understand the contents of the game and move to a "multiplayer competition game" to be described later. After preparations are made, when a start button is operated, the reels rotate and if a predetermined combination of symbols appears, damage is given to the monster of the opponent (computer, here) and a dividend is paid. Each time the opponent monster is defeated, the player gains a victory bonus (for example, ten tokens) and if the player wins three consecutive games, it is made possible for him/her to play a Jackpot game to be described later.

By the way, the Short-play is played based on the following supplementary rules. (1) A player takes the first action in all of the battles, that is, the player is first to realize a prize-deserving sequence when the reels rotate and stop and gain its dividend. (2) The level of the opponent monster, that is, the probability of the final victory of the opponent becomes higher in order of "1→2→3", therefore, the opponent becomes stronger each time the player wins. (3) The physical strength value of the monster selected by the player is fully restored for each game. (4) When the monster selected by the player is defeated, the level of the opponent monster returns to 1 and the physical strength value is restored by half. (5) Immediately after a battle starts, the opponent monster does not carry out an offensive until the offensive of the player hits the monster. In other words, no prize-deserving sequence is realized on the opponent (computer) side until a particular prize-deserving sequence is realized on the player side. (6) When "the monster symbols (symbols representing predetermined monsters as described above)" align in a line during the battle, the monster of the player turns into a monster with a higher level. As a result, the probability of the victory of the player becomes higher. On the other hand, when defeated in the battle, the original situation returns. In other words, the probability of the victory of the player is returned to the state before it is raised. (7) When a Jackpot-game to be described later ends, the monster of the player turns into a monster with a higher level. As a result, the probability of the final victory of the player becomes higher. On the other hand, when defeated in the battle, the original situation returns. In other words, the probability of the victory of the player is returned to the state before it is raised.

The Jackpot game is a game in which a player competes with a computer (server device arranged in the center). The server device has a case formed into a monster called "Goddragon" and a monster selected by a player competes with "Goddragon". When the offensive against Goddragon is effective, that is, when a particular prize-deserving sequence is realized, the player is given a hit dividend, that is, a dividend corresponding to the realized prize-deserving sequence and all of the dividends can be gained as a bonus. When Goddragon is defeated, the player can further gain a clear bonus. The Jackpot game is a free game and all of the gained dividends are turned into the credit. In the Jackpot-game, the time for a play is limited and after a lapse of a predetermined time, an offensive is carried out automatically.

The Original game is a game played over a long period of time using an entry card for reading and writing data via magnetism. A player inserts an entry card into a card insertion slot to participate in a game. The Original game is provided with the following five kinds of game aspect. That is, (1) Mission, (2) Tournament, (3) Blend, (4) Shop, and (5) Data. The Mission is a game in which, for example, a player clears 12 stages and hidden stages and is a game aspect the object of which is to collect a magic point, which is a point specific to the game, and a monster. It is a game in which a player competes with a computer (client device) and gains only a dividend of a token during battle. When a player wins the battle, the player can gain a monster (for example, three lives). In other words, data representing the monster and its life is input to the player side and written into a memory. Then, it is made possible to play a game again using the data representing the monster and its life. The life of a monster is a numeric value having the meaning of so-called life (the number of lives), indicative of the limit that the monster can be used in the game. On the other hand, when defeated, the life of the monster used is reduced by one. When a player wins and ends the game, the player gains the magic point as a bonus. The result of the game is recorded in the entry card.

The Tournament is a game in the form of a tournament in which a player competes with another player. In other words, players bet the magic points gained in the Mission and make their monsters to compete with each other. Only players having the magic point (10 to 30) specified for each tournament and monsters that meet the condition of participation can participate in the game. The condition of participation is that the number of remaining lives is equal to or greater than a value of criterion that the level is equal to or greater than a value of criterion, etc., which can be set in accordance with a game. A player pays a tournament fee (9 to 75 BETS), however, the magic point is used for the battle fee other than that. In other words, a player bets the magic point and gains the magic point as a dividend. A player gains a monster of the opponent each time the player wins, that is, data representing a monster corresponding to the opponent monster and its life is input. On the other hand, when defeated, the lives of all the monsters used in the battle are reduced by one, respectively. Therefore, when defeated in the battle, the chance that the monster can be used is reduced. Here, a monster is represented on a card, therefore, to gain a monster means to gain a card of the monster, that is, the data representing the card of the monster is input. If a player continues to win to the last, the player wins the championship and can play the Jackpot-game in which to compete with Goddragon.

The Blend is a game aspect in which a plurality of monsters are combined to give birth to a new monster. In other words, by using data representing a plurality of monsters and their lives, data representing a new monster and its life is generated. When the same monsters are blended, the kind of monster remains the same and only their lives and scores are added. When different kinds of monster are blended, a new monster is generated and the life is half the total lives and the score is initialized. When a Blend is performed, respective different credits in accordance with respective monsters are required. By the way, as a result of Blend, it is set that data representing a monster called "Goldmonster" is generated with a slight probability, which monster gives a large dividend although limited to only one battle.

The Shop is a game aspect in which a player purchases a monster for 10 credits. By the way, although the probability is slight, it is set that data representing a monster called "Goldmonster" is generated as a result of purchase.

The Data is a game aspect in which the monsters possessed by a player or the score of the player is displayed. By specifying a particular monster, it is possible to display the score (the number of battles, the number of victories, the percentage of victories to the total number of battles, the total points gained in its life) of the monster alone.

FIG. 1 is an appearance view of the game machine according to the present embodiment. The game machine 1 is provided with the server device 2 arranged in the center, having a case the appearance of which is formed into a shape of a monster, and the plurality of client devices 3 around the server device 2. Each client device 3 comprises components required for the individual players to play a game, including a plurality of operation buttons and a display unit for displaying images. Each player plays a multiplayer competition game using the client device 3 and when a player wins the championship in the tournament, the player can participate in a free game in which the player competes with the server device 2 in the center. The case of the server device 2 having a shape of a monster enhances the effect of a rendering and provides the effect to raise the challenging spirit of a player.

FIG. 3 is a block diagram showing an electrical configuration of the server device 2. In the server device 2, the CPU 2a reads out data from the RAM 2b and the ROM 2c or writes data into the RAM 2b. Then, a control operation is performed in accordance with a program set in advance. In the ROM 2c, in addition to a control program for controlling the action of the game machine 1, data of the symbols that can be displayed on the reels, data representing each monster, various kinds of lottery tables corresponding to the data representing each monster, and a table (the arrangement of the symbols configuring the reel band as shown in FIG. 7) configuring a virtual reel corresponding to the lottery table are stored as shown in FIG. 6 and FIG. 7, and these are read out and used as the need arises. By the way, a lottery table refers to a set of the width of a numeric value (lottery classification) determined for each of a plurality of prize-deserving sequences. The data representing each monster is displayed as a card until it is selected by a player.

The random number generation circuit 2e generates fixed random numbers. Data relating to images is output to the display unit 2g consisting of, for example, a liquid crystal display device, via the display unit control circuit 2f that performs image processing etc. On the display unit 2g, letters, still images, motion videos, etc., are displayed. It is not necessarily required for the server device 2 to have the display unit 2g. Data relating to audios is output from the CPU 2a to the loudspeaker 2i via the audio control unit 2h that performs audio processing, amplification, etc. The respective components perform transmission and reception of data to each other via the control bus 2n. Then, the server device 2 performs transmission and reception with each of the client devices 3-1 to 3-n via the input-output interface 2j and the bus N.

FIG. 4 is a block diagram showing an electrical configuration of the client device 3. The token discrimination device 3a judges whether or not a token is proper and the payout token counter 3b counts the number of tokens to be paid. The operation unit 3c comprises a plurality of operation buttons, a start button, etc., and inputs a signal when a player operates these operation buttons and the start button. The token payout device 3d performs payout of tokens. Data relating to images is output to the display unit 3f consisting of, for example, a liquid crystal display device, via the display unit control circuit 3e that performs image processing etc. On the display unit 3f, letters, still images, motion videos, etc., are displayed. For example, images as shown in FIG. 5 are displayed. Data relating to audios is output to the loudspeaker 3h via the audio control unit 3g that performs audio processing, amplification, etc. The respective components perform transmission and reception of data to each other via the control bus 3n while being controlled by the CPU 3i. The CPU 3i reads out data from the RAM 3j and the ROM 3k or writes data into the RAM 3j. Then, a control operation is performed in accordance with a program set in advance. In the ROM 3k, a program for controlling image display, a program for controlling audios, etc., are stored and these are read out and used as the need arises. The random number generation circuit 3m generates fixed random numbers. The client device 3 performs transmission and reception of data with the server device 2 via the input-output interface 3p.

The display unit 2g and the display unit 3f configure a display unit and the RAM 2b or the ROM 2c configures storage unit. Further, the operation unit 3c configures a selection unit and the CPU 2a, the RAM 2b, and the ROM 2c configure a table creation unit.

FIG. 5 is a diagram showing an example of a screen displayed on the display unit 3f of the client device 3. In the center of the screen 40, the three reels 41a to 41c (virtual reels) that display a plurality of kinds of symbol in the varying or halted state are displayed. On the right end of the screen 40, the sub screen 42 that displays the state of the reels of the opponent in a competition is displayed. With the present game machine, a player can select the card of a monster by operating the operation buttons on the operation unit 3c. Then, the player associates the cards of a monster arbitrarily selected with each of the reels 41a to 41c. This operation may be performed by the player following guidance. For example, a message "which monster you select as a boss?" or a message "which monster you use for the first reel?" is displayed and at the same time, cards of a plurality of monsters are displayed on the screen. Then, the card of a monster can be determined in accordance with the operation using the operation buttons and when a "determination button (enter key)" is operated, the selected monster is associated with the reel. Triggered by the selection of the monster (character), the corresponding lottery table and the corresponding virtual reel are selected.

In the area 43a on the left side of the screen 40, the monster 43b associated with the center reel 41b is displayed among the three monsters selected by the player. The name of the monster 43b is displayed on the name display area 43c provided below the reels 41a to 41c. The physical strength value of the monster 43b is displayed by the bar graph 43d. On the other hand, in the area 44a on the right side of the screen 40, the monster 44b associated with the center reel on the opponent side is displayed among the three monsters selected by another player, who will be the opponent in the competition, or the computer. The name of the monster 44b is displayed on the name display area 44c provided below the sub screen 42. The physical strength value of the monster 44b is displayed by the bar graph 44d. In the dividend list 45, a dividend to be paid to a player is displayed in accordance with a prize-deserving sequence realized by a combination of symbols displayed on the respective reels 41a to 41c. In other words, after the monsters are associated with all of the reels, dividend list data is generated based on the data of the symbols included in the lottery table. Based on the dividend list data, a dividend list is displayed on the screen.

Normally, when the respective symbols are displayed in the halted state on the respective reels 41a to 41c after displayed in the varying state, a rendering is performed by an animation in which the monster 43b and the monster 44b fight with each other on the top portion of the screen 40. For example, in the case of the offensive, an animation is displayed in which the monster hits, kicks, bites, etc., the opponent. An animation in which the monster blows a flame against the opponent etc. may be displayed. Further, the image of the monster may be changed in accordance with the property of the monster on the offensive side. For example, in the case of a two-footed monster, an animation in which the monster stamps, kicks the opponent, etc., is displayed. In the case of a monster with a motif of wild beasts, an animation in which the monster roars out, shows its teeth, etc., is displayed. In this manner, by changing the images of the scene of the offensive by the monster and the monster itself, it is made possible to make clear the offensive type, the property of the monster, etc. Further, the image display is prevented from becoming monotonous and it is made possible to perform an effective rendering. As a result, it is possible to impress a player with the scene of the offensive. Furthermore, when attacked by the opponent, the physical strength value of the monster decreases and at this time, it may also be possible to change the image of the monster. In other words, when the physical strength value of the attacked monster decreases, the scene in which the monster is injured and writhes in agony is displayed in an animation. Due to this, it is possible to make clear the offensive received and reduction in physical strength value. However, when a special offensive is carried out, a rendering by an effect animation using the entire screen 40 is displayed. For example, an animation in which a monster moves around on the entire screen 40, the size of a monster is increased, etc., is displayed. At this time, it may also be possible to change the color, to display flashing, or to display the image of lighting.

As shown in FIG. 6, there exist many kinds of symbol to be displayed on the respective reels 41a to 41c. In FIG. 6, the symbols 51a to 51c are those for carrying out a physical offensive. When certain symbols align in a line (prize-deserving line), the monster 43b selected by the player carries out a physical offensive in accordance with the displayed level against the opponent monster 44b and if tokens are bet, payout is done in accordance with the number of bets. By the way, the fighting power and the number of tokens for payout are in accordance with the dividend list of the symbol with the lowest level. Symbols 52a to 52c are those for carrying out a fire offensive. When certain symbols align in a line, the monster 43b carries out a fire offensive in accordance with the displayed level against the opponent monster 44b and if tokens are bet, payout is done in accordance with the number of bets. By the way, the fighting power and the number of tokens for payout are in accordance with the dividend list of the symbol with the lowest level. This also applies to the symbols 53a to 53c.

The symbol 54 is one for carrying out a multiple offensive. When the symbols 54 align in a line, the monster 43b carries out a physical offensive, a fire offensive, and a magic offensive simultaneously against the opponent monster 44b. At this time, each offensive is carried out with the fighting power supposed to be level 1. The level indicates the degree that the physical strength value of the opponent monster can be decreased and when the numeric value is large, it is possible to decrease the physical strength value of the opponent monster more. Further, it is possible for the symbol 54 to perform the same function as that of the symbol of a physical offensive, a fire offensive, or a magic offensive with level 1, that is, the symbol 51a, the symbol 52a, and the symbol 53a. The symbol 55 is one for restoring the physical strength. When the symbols 55 align in a line the physical strength value of the monster 43b is restored by a fixed numeric value. The symbol 56 is a wild symbol. The symbol 56 has a function of being replaced with any symbol except that of a monster. When the symbols align in a line, a free game starts, which can be started without betting. The symbols 57 to 59 are those representing the respective monsters. When one or more (three in total) monsters are revealed on the respective three reels 41a to 41c, the respective monsters' favorite tricks are displayed on the screen the player can put it into action by selecting one of the tricks according to the guidance on the screen. The favorite trick that can be put into action differs depending on the kind of a monster.

In the game machine according to the present embodiment, the level, favorite trick, reel property, and BET fee are determined for each monster. As shown in FIG. 7(A) to FIG. 7(C), these are displayed on the cards 60 to 62 representing monsters. The level represents the degree of the ability of the monster. The physical strength value is a value that determines the initial physical strength of the monster. The favorite trick is an attribute of the offensive that the monster has and can be increased or decreased. The reel property is determined by the ratio between the numbers of symbols representing a physical offensive, those representing a fire offensive, and those representing a magic offensive in the reel band. The bet fee is the number of BETs required to use the monster in a game. The BET fee differs from monster to monster and a monster with a higher level has a higher probability that the player will win, therefore, the BET fee is higher.

In the game machine according to the present embodiment, monsters configuring a reel band differ depending on the kind of monster. In other words, a table having data of symbols configuring a reel band differs from monster to monster. For example, as shown in FIG. 7(A), on a table corresponding to a monster called "Geropy", the symbols 51a representing a physical offensive and the symbols 52a representing a fire offensive are large in number, therefore, the offensive power is not high. In other words, even if the symbols align in a line, the degree that the physical strength value of the opponent monster can be decreased is low. On the other hand, the table is abundant in symbols 55 that restore the physical strength value by 30, therefore, the monster has many chances to recover even if attacked. As shown in FIG. 7(B), a table corresponding to a monster called "Demon" includes many symbols 51a and 51b representing a physical offensive and many symbols 53a to 53c representing a magic offensive, therefore, the offensive power is high. In other words, when the symbols align in a line, the degree that the physical strength value of the opponent monster can be decreased is high. As shown in FIG. 7(C), a table corresponding to a monster called "Bluedragon" includes many symbols 52a to 52c representing a fire offensive and also includes the two wild symbols 56 that can function as any symbol, therefore, the offensive power is high. In other words, when the symbols align in a line, the degree that the physical strength value of the opponent monster can be decreased is high. As described above, the tables specific to the respective monsters are stored in the ROM 2c and function as reel bands when associated with respective reels by a player. Here, a relationship between a lottery table and a reel band is briefly described as follows. For example, in a case where 20 symbols can be provided on a reel band and the probability that each symbol stops on the display area is set to $1/20$ (equal probability), if a reel band is provided with in total the five symbols 52a to 52c representing a fire offensive, the probability that the symbol of the kind representing a fire offensive stops is $5/20$, that is, $1/4$. If a reel band is provided with in total the ten symbols 52a to 52c representing a fire offensive, the probability that the symbol of the kind representing a fire offensive stops is $10/20$, that is, $1/2$, and the probability that the symbol of the kind representing a fire offensive stops is higher than the case where the five symbols are provided. In this example, the prize-winning probability is in simple proportion to the number of symbols of a predetermined kind, however, the relationship is not limited this. It is only necessary that the relationship be such a predetermined one in which the prize-winning probability of the symbol configuring a larger ratio in the total number of symbols is higher than that of the symbol configuring a smaller ratio and for example, such a relationship may be acceptable in which the prize-winning probability for two symbols is twice that for one symbol, the probability for three symbols is four times that for one symbol, and the probability for four symbols is eight times that for one symbol. Then, it is possible to adjust an actual payout rate by providing a difference in accordance with the payout rate in weight between symbols. In other words, it is possible to finely adjust the payout rate by providing weighted coefficients instead of determining the prize-winning probability by, for example, only the number of symbols. For example, it may also be possible to set the probability of symbols realizing a sequence with a high dividend to a probability lower than that simply calculated from the number of symbols as above by providing weights that take into account the payout rate.

As described above, a lottery table and a virtual reel include a monster or data relating to the action of the monster, therefore, the monster selected by a player or the symbol relating to the monster is displayed in the varying or halted state. When the monster selected by the player or the symbol relating to the monster is displayed in the halted state, the monster takes the action of the offensive relating to the symbol, therefore, it is possible to inform the player in advance of the action of the monster by means of the display of the above-mentioned symbol in the halted state. For example, when the monster selected as above is "Bluedragon", the symbol representing Bluedragon and the symbol representing the favorite offensive of Bluedragon are included on the table, therefore, when a prize-deserving sequence due to the symbols is realized, it is possible to impress the player that a prize-deserving sequence specific to Bluedragon is realized by displaying an animation in which the offensive action specific to Bluedragon is taken.

Next, the operation of the game machine according to the present embodiment is explained. FIG. 8 is a flow chart showing a flow of a game. First, after betting the required number of BETs, a player determines a battle team (party) (step S1). Here, as shown in FIG. 9(A), a monster to be associated with the center reel is determined. The monster will be the "boss" and plays the leading role in the party and the policy of strategy is determined by its character. For example, as shown in the figure, a player on the left side tries to set a monster having a high recuperative power and good at a fight of attrition as the boss. A player on the right side tries to set a monster as the boss, which monster has a high magic offensive power, that is, with which monster, the degree is large that the physical strength value of the opponent monster is decreased when the symbols 53a to 53c for carrying out a magic offensive align in a line.

Next, monsters to be associated with the right reel and the left reel are determined. These monsters configure the party as the "members". At this stage, the opponent boss can be recognized by each other, therefore, each player determines monsters as members while estimating the opponent's strategy. For example, as shown in FIG. 9(B), the player on the left side observes the opponent boss and judges that the boss is a monster vulnerable to a flame (a fire offensive), that is, the degree is large that the physical strength value is decreased when the symbols 52a to 52c for carrying out a fire offensive align on the player's side. The player on the right side tries to add a monster to the party, which monster is well-defended against a fire offensive, that is, with which monster, the degree is small that the physical strength value is decreased when the symbols 52a to 52c for carrying out a fire offensive align in a line on the opponent side, because the boss monster of the player is vulnerable to a fire offensive. Since the game has two objects, one is to defeat the opponent in the competition and the other is to increase the number of tokens, selection of a monster (card) to be associated with a reel affects achievement of both the objects. In the present game machine, when a monster is associated with a reel, a dividend list is displayed in a real time manner. Therefore, it is possible for a player to select a monster to be associated with the reel from a strategic standpoint in order to advance the game and/or increase the number of tokens while comparing the reel property with the dividend list. Here, it may also be possible to set a symbol with a high offensive power at a time in a competition as a symbol with a high dividend but a low prize-winning probability in regard to an increase in the number of tokens and aim at a high-risk/high-return of token by selecting the reel on which such symbols are mainly arranged and the monsters to increase the offensive power at a time in the competition, or conversely, it may also be possible to increase the number of offensives in a competition and reduce the risk that the number of tokens is reduced considerably at a time by selecting the reel on which symbols with a low offensive power at a time in the competition and a low dividend but with a high prize-winning probability are mainly arranged and the monsters.

Then, the total value of the physical strength values of the three monsters configuring the party is set as the initial physical strength of the party.

When all of the monsters are associated with the reels, dividend list data is generated. The CPU 2a reads out the respective tables of the three monsters associated with the respective reels 41a to 41c and generates dividend list data representing a plurality of prize-deserving sequences and their dividends when they are realized using the data of the symbols included in the tables. When dividend list data is generated, the payout rate is taken into account. In other words, dividend list data is generated so that the predetermined value (number of tokens gained)/(number of tokens bet) is obtained. By the way, when the payout rate is adjusted by adjusting the prize-winning probability for each symbol, fixed data can be used as dividend list data. It may also be possible to adjust the payout rate by adjusting both the payout rate by the prize-winning probability and the payout rate by the dividend list.

Next, each player rotates the reels by turns and carries out an offensive against the opponent party together with payout of the number of tokens corresponding to that when symbols align and the increase in token credit. When a player carries out an offensive (step S2), the player judges whether or not the opponent is defeated (step S3). In other words, the player judges whether or not the physical strength value of the opponent monster can be decreased to zero. For example, as shown in FIG. 9(C), a fire offensive is being carried out against the party of the player on the right side because the symbols of fire offensive align in a line in the party of the player on the left side. When the opponent is defeated, the player is the winner in the battle (step S4). If the opponent is not defeated, then the opponent carries out an offensive (step S5). When attacked by the opponent, the physical strength value of the party of the player decreases, therefore, it is judged whether or not the physical strength value of the party of the player still remains (step S6). Then, when the physical strength value of the party of the player still remains, the next step will be step S2, where the player carries out an offensive. On the other hand, in step S6, when no physical strength value of the party of the player remains, the player is the loser (step S7).

When the player on the left side wins as a result of the battle described above, as shown in FIG. 9(D), the player receives a bonus dividend, that is, a predetermined number of credits to be given to the winner in a battle and gains any one of the opponent monsters. In other words, data representing the monster and its life is added to the player side and written into a memory. Then, it is made possible to play a game again using the data representing the monster and its life. Further, the player gains the above-mentioned magic point. On the other hand, on the defeated player side on the right side, the lives of all the monsters in the party decrease by one.

Here, there is a fixed correspondence between the life value of the monster that the player on the left side has gained and the life value each monster configuring the party of the player on the right side has lost. For example, when the monster that the player on the left side has gained is a strong monster, its life value is decreased and on the other hand, when the monster that the player on the left side has gained is a weak monster, its life value is increased.

As described above, according to the game machine concerning the present embodiment, the virtual reel corresponding to the lottery table selected with the player's selecting operation as a trigger is displayed in each display area and a varying state presentation or a halted state presentation is performed in accordance with the lottery result using the lottery table as the game proceeds, therefore, it is possible to display symbols based on the selected lottery table. Because of this, when symbols are fixed, it is necessary to control symbols having nothing to do with the lottery result to slide, however, the present invention has obviated this and a display that reflects the lottery result directly can be produced, therefore, it is made possible to express the action with reality. Further, the lottery table to be used corresponds to the virtual reel to be displayed, therefore, it is made possible to display the contents of the lottery table in use properly on the virtual reel without the need to provide another display screen. In the present embodiment, the lottery table, the virtual reel, or the character (monster) is selected with the player's selecting operation as a trigger, however, it may also be possible to select randomly with any timing, or to select a predetermined or any character etc. intentionally as the game proceeds, for example, with a predetermined timing such as when a predetermined scene is displayed.

In the game machine according to the present embodiment, when a player associates a monster with each reel (virtual reel) by selection, a plurality of kinds of symbol that can be displayed on the reel are determined. Then, a corresponding lottery table in accordance with the reel is created. In other words, as in the present embodiment, instead of that a plurality of tables are stored in advance in the ROM 2c, a lottery table is created by executing a program when a monster is selected. Specifically, when a player associates a particular monster with a reel, a process for reading out the data of the symbol specific to the monster from the ROM 2c is performed and a process for creating a lottery table is performed based on the data of the read-out symbol. On the other hand, a virtual reel band is formed using the data of the read-out symbol and the symbol is displayed in its varying state using the reel band. A lottery is held based on the created lottery table and a symbol displayed in its varying state is displayed in its halted state in accordance with the lottery result.

As described above, the virtual reel corresponding to the selected lottery table is displayed on each display area and a varying state presentation or a halted state presentation is performed in accordance with the lottery result using the lottery table as the game proceeds, therefore, it is possible to display symbols based on the selected lottery table. Because of this, a display that reflects the lottery result directly can be produced, therefore, it is made possible to express the action with reality. Further, the lottery table to be used corresponds to the virtual reel to be displayed, therefore, it is made possible to display the contents of the lottery table in use properly on the virtual reel without the need to provide another display screen. Since the corresponding lottery table is created in accordance with the selected plurality of virtual reels, the required memory capacity is less compared to the case where many lottery tables are stored in advance and the number of variations of the lottery tables to be used can be increased.

The operation characteristic to the present invention is performed by causing a computer to execute a game program. In other words, the game program is characterized by causing a computer to read and convert processes into executable commands, which processes include: a process capable of performing each of a varying state presentation that changes the display of a plurality of display areas so that each virtual reel in a reel group consisting of a plurality of virtual reels on which a plurality of symbols are arranged using the plurality of display areas as the game starts and a halted state presentation that displays a state in which any one of the symbols is halted in the plurality of display areas; a process for storing a plurality of kinds of lottery table for selecting for each play any one of a plurality of sequences represented by a combination of symbols displayed in their halted state in the display areas, and data of the virtual reel corresponding to the prize-winning probability of each sequence in each lottery table; a process for selecting either the plurality of kinds of lottery table or the virtual reel group; and a process for further displaying the virtual reel group corresponding to the lottery table selected by the selection unit in the above-mentioned displaying process in each of the display areas and performing the varying state presentation or the halted state presentation as the play proceeds.

As described above, the virtual reel group corresponding to the selected lottery table is displayed in each display area and a varying state presentation or a halted state presentation is performed in accordance with the lottery result using the lottery table as the game proceeds, therefore, it is possible to display symbols based on the selected lottery table. Because of this, a display that reflects the lottery result directly can be produced, therefore, it is made possible to express the action with reality. Further, the virtual reel corresponding to the selected lottery table is displayed, therefore, it is made possible to display the contents of the lottery table in use properly on the virtual reel without the need to provide another display screen.

The above-mentioned program is available in a state of being recorded in a recording medium such as CD-ROM and DVD. Further such a program is available by receiving signals transmitted by a computer, that is, a transmitter, via a transmission medium such as a communication network consisting of public telephone lines, private telephone lines, cable TV lines, radio communication lines, etc., configuring a network. The signals are computer data signals embodied in a predetermined carrier including a program. At the time of the transmission, it is only necessary to transmit at least part of the program in the transmission medium. In other words, it is not necessary for all the data configuring the above-mentioned program to present in the transmission medium at a time. Transmission methods for transmitting a program from the computer include continuous transmission of the data configuring the program and intermittent transmission thereof.

Third Embodiment

A game machine according to the present embodiment is configured as a token game machine, that is, a slot machine employing a video reel system in which three reels are displayed on a video. By using the video reels, a multiplayer competition game, in which characters are made to compete with each other, is played. Each character is represented as a "monster" having its own character.

A player can select any three monsters from among a plurality of monsters. The selected monster is associated with each of the reels described above. Each reel uses a table in accordance with the associated monster. Due to this, a reel band having an arrangement of symbols in accordance with the monster is determined and the symbol specific to the monster is displayed in its varying or halted state.

After the monsters are associated with all of the reels, dividend list data is generated based on the data of the symbols included in the table. The dividend list data is displayed on the screen as a dividend list. Due to this, it is possible to change the contents of the dividend list in accordance with the kind of the monster. Because of this, the dividend list, which used to be a stereotyped one, can be changed arbitrarily, therefore, the prize-deserving sequences that can be realized can be changed, and it is made possible to enhance amusement of the game. Further, a dividend list is displayed based on the generated dividend list data, therefore, it is possible to inform a player of a new dividend list.

The physical strength value, the favorite trick (fighting ability or defending ability), and the arrangement of symbols in the reel band differ from monster to monster, therefore, a plurality of monsters are combined to realize various prize-reserving sequences. For example, such characteristics are generated that "vulnerable to a fire offensive but well defended against a magic offensive" or "the offensive power is low but the physical strength is high and good at a fight of attrition". Here is established a relationship like that between stone, scissors, and paper in a finger flashing game.

In the present game machine, symbols are displayed in their varying state on the video reel and then displayed in their halted state after a lapse of a predetermined period of time, and when a particular prize-deserving sequence is realized, a dividend is given and a rendering of offensive against the opponent monster is performed. The attacked monster decreases its physical strength value. Two players carry out offensive and defense by rotating the reels by turns and when the physical strength value of a monster of one of the players is decreased to zero, the other player wins the game.

Further, there are two concepts of value, that is, "credit" and "magic point" in regard to the present game machine. "Credit" relates to insertion or payout of a token as in the general token game. "Magic point" is a concept of value specific to the present game machine. In other words, it has nothing to do directly with the credit and increases or decreases in a particular game, having a concept of its own BET and WIN (dividend).

The games played with the present game machine are divided into a Short play, an Original game, and a Jackpot game. A Short-play is ready when lines (1 to 5) are set by operating a bet button after inserting a token. In other words, this is a game that has obviated an entry card for reading and writing data via magnetism. A player competes with a computer (client device) using a predetermined monster. Because no entry card is required, a player can participate in a game readily. The object of the Short-play is to make a player understand the contents of the game and move to a "multi-player competition game" to be described later. After preparations are made, when a start button is operated, the reels rotate and if a predetermined combination of symbols appears, damage is given to the monster of the opponent (computer, here) and a dividend is paid. Each time the opponent monster is defeated, the player gains a victory bonus (for example, ten tokens) and if the player wins three consecutive games, it is made possible for him/her to play a Jackpot game to be described later.

By the way, the Short-play is played based on the following supplementary rules. (1) A player takes the first action in all of the battles, that is, the player is first to realize a prize-deserving sequence when the reels rotate and stop and gain its dividend. (2) The level of the opponent monster becomes higher in order of "1→2→3", therefore, the opponent becomes stronger each time the player wins. Here, the "level of a monster" is the offensive power that decreases the physical strength value of the opponent monster and the resistivity that prevents its own physical strength value from decreasing when attacked by the opponent, both the offensive power and the resistivity being expressed by a numeric value. For example, when the level of a monster becomes high, the resistivity increases and the reduction in physical strength value becomes less for the same offensive, or the offensive power increases and damage (reduction in physical strength value of the opponent) given to the opponent becomes greater by the same offensive (the same sequence), and the probability of the final victory becomes higher. (3) The physical strength value of the monster selected by the player is fully restored for each game. (4) When the monster selected by the player is defeated, the level of the opponent monster returns to 1 and the physical strength value is restored by half. (5) Immediately after a battle starts, the opponent monster does not carry out an offensive until the offensive of the player hits the monster. In other words, no prize-deserving sequence is realized on the opponent (computer) side until a particular prize-deserving sequence is realized on the player side. (6) When "the monster symbols (symbols representing predetermined monsters as described above)" align in a line during the battle, the monster of the player turns into a monster with a higher level. As a result, the probability of the victory of the player becomes higher. On the other hand, when defeated in the battle, the original situation returns. In other words, the probability of the victory of the player is returned to the state before it is raised. (7) When a Jackpot-game to be described later ends, the monster of the player turns into a monster with a higher level. As a result, the probability of the final victory of the player becomes higher. On the other hand, when defeated in the battle, the original situation returns. In other words, the probability of the victory of the player is returned to the state before it is raised.

The Jackpot game is a game in which a player competes with a computer (server device arranged in the center). The server device has a case formed into a monster called "Goddragon" and a monster selected by a player competes with "Goddragon". When the offensive against Goddragon is effective, that is, when a particular prize-deserving sequence is realized, the player is given a hit dividend, that is, a dividend corresponding to the realized prize-deserving sequence and all of the dividends can be gained as a bonus. When Goddragon is defeated, the player can further gain a clear bonus. The Jackpot game is a free game and all of the gained dividends are turned into the credit. In the Jackpot-game, the time for a play is limited and after a lapse of a predetermined time, an offensive is carried out automatically.

The Original game is a game played over a long period of time using an entry card for reading and writing data via magnetism. A player inserts an entry card into a card insertion slot to participate in a game. The Original game is provided with the following five kinds of game aspect. That is, (1) Mission, (2) Tournament, (3) Blend, (4) Shop, and (5) Data.

Mission is a game in which, for example, a player clears 12 stages and hidden stages and is a game aspect the object of which is to collect a magic point, which is a point specific to the game, and a monster. It is a game in which a player competes with a computer (client device) and gains only a dividend of a token during battle. When a player wins the battle, the player can gain a monster (three lives). In other words, data representing the monster and its life is input to the player side and written into a memory. Then, it is made possible to play a game again using the data representing the monster and its life. The life of a monster is a numeric value having the meaning of so-called life (the number of lives), indicative of the limit of the number of times (when the physical strength value is lost, it is regarded as one time) the monster can be used in the game. On the other hand, when defeated, the life of the monster used is decreased by one. When a player wins and ends the game, the player gains the magic point as a bonus. The result of the game is recorded in the entry card.

The Tournament is a game in the form of a tournament in which a player competes with another player. In other words, players bet the magic points gained in the Mission and make their monsters to compete with each other. Only players having the magic point (10 to 30) specified for each tournament and monsters that meet the condition of participation can participate in the game. The condition of participation is that the number of remaining lives is equal to or greater than a value of criterion that the level is equal to or greater than a value of criterion, etc., which can be set in accordance with a game. A player pays a tournament fee (9 to 75 BETs), however, the magic point is used for the battle fee other than that. In other words, a player bets the magic point and gains the magic point as a dividend. A player gains a monster of the opponent each time the player wins, that is, data representing a monster corresponding to the opponent monster and its life is added. On the other hand, when defeated, the lives of all the monsters used in the battle are reduced by one, respectively. Therefore, when defeated in the battle, the number of times available of the monster is reduced. Here, a monster is represented on a card and displayed on the screen, therefore, to gain a monster means to gain a card of the monster on the screen. The card in hand can be used in a competition as a monster in hand. Thus, if a player continues to win to the last, the player wins the championship and can play the Jackpot-game in which to compete with Goddragon.

The Blend is a game aspect in which a plurality of monsters are combined to give birth to a new monster. In other words, by using data representing a plurality of monsters and their lives, data representing a new monster and its life is generated. When the same monsters are blended, the kind of monster remains the same and only their lives and scores are added. When different kinds of monster are blended, a new monster is generated and the life of the monster is half the total lives or half plus 0.5 and the score is initialized. When a Blend is performed, respective different credits in accordance with respective monsters are required. By the way, as a result of Blend, it is set that data representing a monster called "Goldmonster" is generated with a slight probability, which monster gives a large dividend although limited to only one battle.

The Shop is a game aspect in which a player purchases a monster for 10 credits. When a player operates to direct purchase, the credit possessed by the player is reduced by 10, data of any one of monsters is generated, and the player gains the card of the monster on the screen. By the way, although the probability is slight, it is set that data representing a monster called "Goldmonster" is generated as a result of purchase.

The Data is a game aspect in which the monsters possessed by a player or the score of the player is displayed. By specifying a particular monster, it is possible to display the score (the number of battles, the number of victories, the percentage of victories to the total number of battles, the total points gained in its life) of the monster alone.

FIG. 1 is an appearance view of the game machine according to the present embodiment. The game machine 1 is provided with the server device 2 arranged in the center, having a case the appearance of which is formed into a shape of a monster, and a plurality of client devices 3 around the server device 2. Each client device 3 comprises components required for the individual players to play a game, including a plurality of operation buttons and a display unit for displaying images. Each player plays a multiplayer competition game using the client device 3 and when a player wins the championship in the tournament, the player can participate in a free game in which the player competes with the server device 2 in the center. The case of the server device 2 having a shape of a monster enhances the effect of a rendering and provides the effect to raise the challenging spirit of a player.

FIG. 3 is a block diagram showing an electrical configuration of the server device 2. In the server device 2, the CPU 2a reads out data from the RAM 2b and the ROM 2c or writes data into the RAM 2b. Then, a control operation is performed in accordance with a program set in advance. In the ROM 2c, in addition to a control program for controlling the action of the game machine 1, data of the symbols that can be displayed on the reels, data representing each monster, and various kinds of tables (the arrangement of the symbols configuring the reel band as shown in FIG. 7) corresponding to the data representing each monster are stored as shown in FIG. 6 and FIG. 7, and these are read out and used as the need arises. The data representing each monster is displayed as a card until it is selected by a player.

The random number generation circuit 2e generates fixed random numbers. Data relating to images is output to the display unit 2g consisting of, for example, a liquid crystal display device, via the display unit control circuit 2f that performs image processing etc. On the display unit 2g, letters, still images, motion videos, etc., are displayed. It is not necessarily required for the server device 2 to have the display unit 2g. Data relating to audios is output from the CPU 2a to the loudspeaker 2i via the audio control unit 2h that performs audio processing, amplification, etc. The respective components perform transmission and reception of data to each other via the control bus 2n. Then, the server device 2 performs transmission and reception with each of the client devices 3-1 to 3-n via the input-output interface 2j and the bus N.

FIG. 4 is a block diagram showing an electrical configuration of the client device 3. The token discrimination device 3a judges whether or not a token is proper and the payout token counter 3b counts the number of tokens to be paid. The operation unit 3c comprises a plurality of operation buttons, a start button, etc., and inputs a signal when a player operates these operation buttons and the start button. The token payout device 3d performs payout of tokens. Data relating to images is output to the display unit 3f consisting of, for example, a liquid crystal display device, via the display unit control circuit 3e that performs image processing etc. On the display unit 3f, letters, still images, motion videos, etc., are displayed. For example, images as shown in FIG. 5 are displayed. Data relating to audios is output to the loudspeaker 3h via the audio control unit 3g that performs audio processing, amplification, etc. The respective components perform transmission and reception of data to each other via the control bus 3n while being controlled by the CPU 3i. The CPU 3i reads out data from the RAM 3j and the ROM 3k or writes data into the RAM 3j. Then, a control operation is performed in accordance with a program set in advance. In the ROM 3k, a program for controlling image display, a program for controlling audios, etc., are stored and these are read out and used as the need arises. The random number generation circuit 3m generates fixed random numbers. The client device 3 performs transmission and reception of data with the server device 2 via the input-output interface 3p.

The display unit 2g and the display unit 3f configure a display unit and the RAM 2b or the ROM 2c configures a storage unit. Further, the operation unit 3c configures a selection unit and the CPU 2a, the RAM 2b, and the ROM 2c configure a table creation unit. The CPU 2a and the random number generation circuit 2e configure a lottery device.

FIG. 5 is a diagram showing an example of a screen displayed on the display unit 3f of the client device 3. In the center of the screen 40, the three reels 41a to 41c that display a plurality of kinds of symbol in the varying or halted state are displayed. On the right end of the screen 40, the sub screen 42 that displays the state of the reels of the opponent in a competition is displayed. With the present game machine, a player can select the card of a monster by operating the operation buttons on the operation unit 3c. Then, the player associates the cards of a monster arbitrarily selected with each of the reels 41a to 41c. This operation may be performed by the player following guidance. For example, a message "which monster you select as a boss?" or a message "which monster you use for the first reel?" is displayed and at the same time, cards of a plurality of monsters are displayed on the screen. Then, the card of a monster can be determined in accordance with the operation using the operation buttons and when a "determination button (enter key)" is operated, the selected monster is associated with the reel.

In the area 43a on the left side of the screen 40, the monster 43b associated with the center reel 41b is displayed among the three monsters selected by the player. The name of the monster 43b is displayed on the name display area 43c provided below the reels 41a to 41c. The physical strength value of the monster 43b is displayed by the bar graph 43d. On the other hand, in the area 44a on the right side of the screen 40, the monster 44b associated with the center reel on the opponent side is displayed among the three monsters selected by another player, who will be the opponent in the competition, or the computer. The name of the monster 44b is displayed on the name display area 44c provided below the sub screen 42. The physical strength value of the monster 44b is displayed by the bar graph 44d.

In the dividend list 45, a dividend to be paid to a player is displayed in accordance with a prize-deserving sequence realized by a combination of symbols displayed on the respective reels 41a to 41c. In other words, after the monsters are associated with all of the reels, dividend list data is generated based on the data of the symbols included in the table. Based on the dividend list data, a dividend list is displayed on the screen.

Normally, when the respective symbols are displayed in the halted state on the respective reels 41a to 41c after displayed in the varying state, a rendering is performed by an animation in which the monster 43b and the monster 44b fight with each other on the top portion of the screen 40. For example, in the case of the offensive, an animation is displayed in which the monster hits, kicks, bites, etc., the opponent. An animation in which the monster blows a flame against the opponent etc. may be displayed. Further, the image of the monster may be changed in accordance with the property of the monster on the offensive side. For example, in the case of a two-footed monster, an animation in which the monster stamps, kicks the opponent, etc., is displayed. In the case of a monster with a motif of wild beasts, an animation in which the monster roars out, shows its teeth, etc., is displayed. In this manner, by changing the images of the scene of the offensive by the monster and the monster itself, it is made possible to make clear the offensive type, the property of the monster, etc. Further, the image display is prevented from becoming monotonous and it is made possible to perform an effective rendering. As a result, it is possible to impress a player with the scene of the offensive. Furthermore, when attacked by the opponent, the physical strength value of the monster decreases and at this time, it may also be possible to change the image of the monster. In other words, when the physical strength value of the attacked monster decreases, the scene in which the monster is injured and writhes in agony is displayed in an animation. Due to this, it is possible to make clear the offensive received and reduction in physical strength value. However, when a special offensive is carried out, a rendering by an effect animation using the entire screen 40 is displayed. For example, an animation in which a monster moves around on the entire screen 40, the size of a monster is increased, etc., is displayed. At this time, it may also be possible to change the color, to display flashing, or to display the image of lighting.

As shown in FIG. 6, there exist many kinds of symbol to be displayed on the respective reels 41a to 41c. In FIG. 6, the symbols 51a to 51c are those for carrying out a physical offensive. When certain symbols align in a line (prize-deserving line), the monster 43b selected by the player carries out a physical offensive against the opponent monster 44b. By the way, the fighting power is that of a symbol with the lowest level. The symbols 52a to 52c are those for carrying out a fire offensive. When certain symbols align in a line, the monster 43b carries out a fire offensive against the opponent monster 44b. By the way, the fighting power is that of a symbol with the lowest level. The symbols 53a to 53c are those for carrying out a magic offensive. When certain symbols align in a line, the monster 43b carries out a magic offensive against the opponent monster 44b. By the way, the fighting power is that of a symbol with the lowest level.

The symbol 54 is one for carrying out a multiple offensive. When the symbols 54 align in a line, the monster 43b carries out a physical offensive, a fire offensive, and a magic offensive simultaneously against the opponent monster 44b. At this time, each offensive is carried out with the fighting power supposed to be level 1. The level of the fighting power indicates the degree that the physical strength value of the opponent monster can be decreased and when the numeric value is large, it is possible to decrease the physical strength value of the opponent monster more. Further, it is possible for the symbol 54 to perform the same function as that of the symbol of a physical offensive, a fire offensive, or a magic offensive with level 1, that is, the symbol 51a, the symbol 52a, and the symbol 53a. The symbol 55 is one for restoring the physical strength. When the symbols 55 align in a line the physical strength value of the monster 43b is restored by a fixed numeric value. The symbol 56 is a wild symbol. The symbol 56 has a function of being replaced with any symbol except that of a monster. When the symbols align in a line, a free game starts, which can be started without betting. The symbols 57 to 59 are those representing the respective monsters. When one or more (three in total) monsters are revealed on the respective three reels 41a to 41c, the respective monsters' favorite tricks are displayed on the screen the player can put it into action by selecting one of the tricks according to the guidance on the screen. The favorite trick that can be put into action differs depending on the kind of a monster.

In the game machine according to the present embodiment, the level, favorite trick, reel property, and BET fee are determined for each monster. As shown in FIG. 7(A) to FIG. 7(C), these are displayed on the cards 60 to 62 representing monsters. The level represents the degree of the ability of the monster. The physical strength value is a value that determines the initial physical strength of the monster. The favorite trick is an attribute of the offensive that the monster has and can be increased or decreased. The reel property is determined by the ratio between the numbers of symbols representing a physical offensive, those representing a fire offensive, and those representing a magic offensive in the reel band. The bet fee is the number of BETs required to use the monster in a game. The BET fee differs from monster to monster and a monster with a higher level has a higher probability that the player will win, therefore, the BET fee is higher.

In the game machine according to the present embodiment, monsters configuring a reel band differ depending on the kind of monster. In other words, a table used as a reel band includes data of a plurality of kinds of symbol and differs from monster to monster. For example, as shown in FIG. 7(A), on a table corresponding to a monster called "Geropy", the symbols 51a representing a physical offensive and the symbols 52a representing a fire offensive are large in number, therefore, the offensive power is not high. In other words, even if the symbols align in a line, the degree that the physical strength value of the opponent monster can be decreased is low. On the other hand, the table is abundant in symbols 55 that restore the physical strength value by 30, therefore, the monster has many chances to recover even if attacked. As shown in FIG. 7(B), a table corresponding to a monster called "Demon" includes many symbols 51*a* and 51*b* representing a physical offensive and many symbols 53*a* to 53*c* representing a magic offensive, therefore, the offensive power is high. In other words, when the symbols align in a line, the degree that the physical strength value of the opponent monster can be decreased is high. As shown in FIG. 7(C), a table corresponding to a monster called "Bluedragon" includes many symbols 52*a* to 52*c* representing a fire offensive and also includes the two wild symbols 56, therefore, the offensive power is high. In other words, when the symbols align in a line, the degree that the physical strength value of the opponent monster can be decreased is high. As described above, the table specific to the respective monsters are stored in the ROM 2*c* and function as reel bands when associated with respective reels by a player.

As described above, a table includes a monster or data relating to the action of the monster, therefore, the monster selected by a player or the symbol relating to the monster is displayed in the varying or halted state. When the monster selected by the player or the symbol relating to the monster is displayed in the halted state, the monster takes the action of the offensive relating to the symbol, therefore, it is possible to inform the player in advance of the action of the monster by means of the display of the above-mentioned symbol in the halted state. For example, when the monster selected as above is "Bluedragon", the symbol representing Bluedragon and the symbol representing the favorite offensive of Bluedragon are included on the table, therefore, when a prize-deserving sequence due to the symbols is realized, it is possible to impress the player that a prize-deserving sequence specific to Bluedragon is realized by displaying an animation in which the offensive action specific to Bluedragon is taken.

Next, the operation of the game machine according to the present embodiment is explained. FIG. 8 is a flow chart showing a flow of a game. First, after betting the required number of BETs, a player determines a battle team (party) (step S1). Here, as shown in FIG. 9(A), a monster to be associated with the center reel is determined. The monster will be the "boss" and plays the leading role in the party and the policy of strategy is determined by its character. For example, as shown in the figure, a player on the left side tries to set a monster having a high recuperative power and good at a fight of attrition as the boss. A player on the right side tries to set a monster as the boss, which monster has a high magic offensive power, that is, with which monster, the degree is large that the physical strength value of the opponent monster is decreased when the symbols 53*a* to 53*c* for carrying out a magic offensive align in a line, or which monster corresponds to the reel including many symbols 53*a* to 53*c* on the table, or which monster corresponds to the reel including many symbols 53*c* in particular.

Next, monsters to be associated with the right reel and the left reel are determined. These monsters configure the party as the "members". At this stage, the opponent boss can be recognized by each other, therefore, each player determines monsters as members while estimating the opponent's strategy. For example, as shown in FIG. 9(B), the player on the left side observes the opponent boss and judges that the boss is a monster vulnerable to a flame (a fire offensive), that is, the degree is large that the physical strength value of the opponent is decreased when the symbols 52*a* to 52*c* for carrying out a fire offensive align on the player's side. The player on the right side tries to add a monster to the party, which monster is well-defended against a fire offensive, that is, with which monster, the degree is small that the physical strength value of its own is decreased when the symbols 52*a* to 52*c* for carrying out a fire offensive align in a line on the opponent side, because the boss monster of the player is vulnerable to a fire offensive. Since the game has two objects, one is to defeat the opponent in the competition and the other is to increase the number of tokens, selection of a monster (card) to be associated with a reel affects achievement of both the objects. In the present game machine, when a monster is associated with a reel, a dividend list is displayed in a real time manner. Therefore, it is possible for a player to select a monster to be associated with a reel from a strategic standpoint while comparing the reel property and the dividend list. The total value of the physical strength values of the three monsters configuring the party is set as an initial physical strength of the party.

When all of the monsters are associated with the reels, dividend list data is generated. The CPU 2*a* reads out the respective tables of the three monsters associated with the respective reels 41*a* to 41*c* and generates dividend list data representing a plurality of prize-deserving sequences and their dividends when they are realized using the data of the symbols included in the tables. When dividend list data is generated, the payout rate is taken into account. In other words, dividend list data is generated so that the predetermined value (number of tokens gained)/(number of tokens bet) is obtained. For example, the probability of realization of a prize-deserving sequence with a large dividend is reduced and the probability of realization of a prize-deserving sequence with a small dividend is increased. When dividend list data is generated, a dividend list is displayed on the screen 40.

Figure 10:
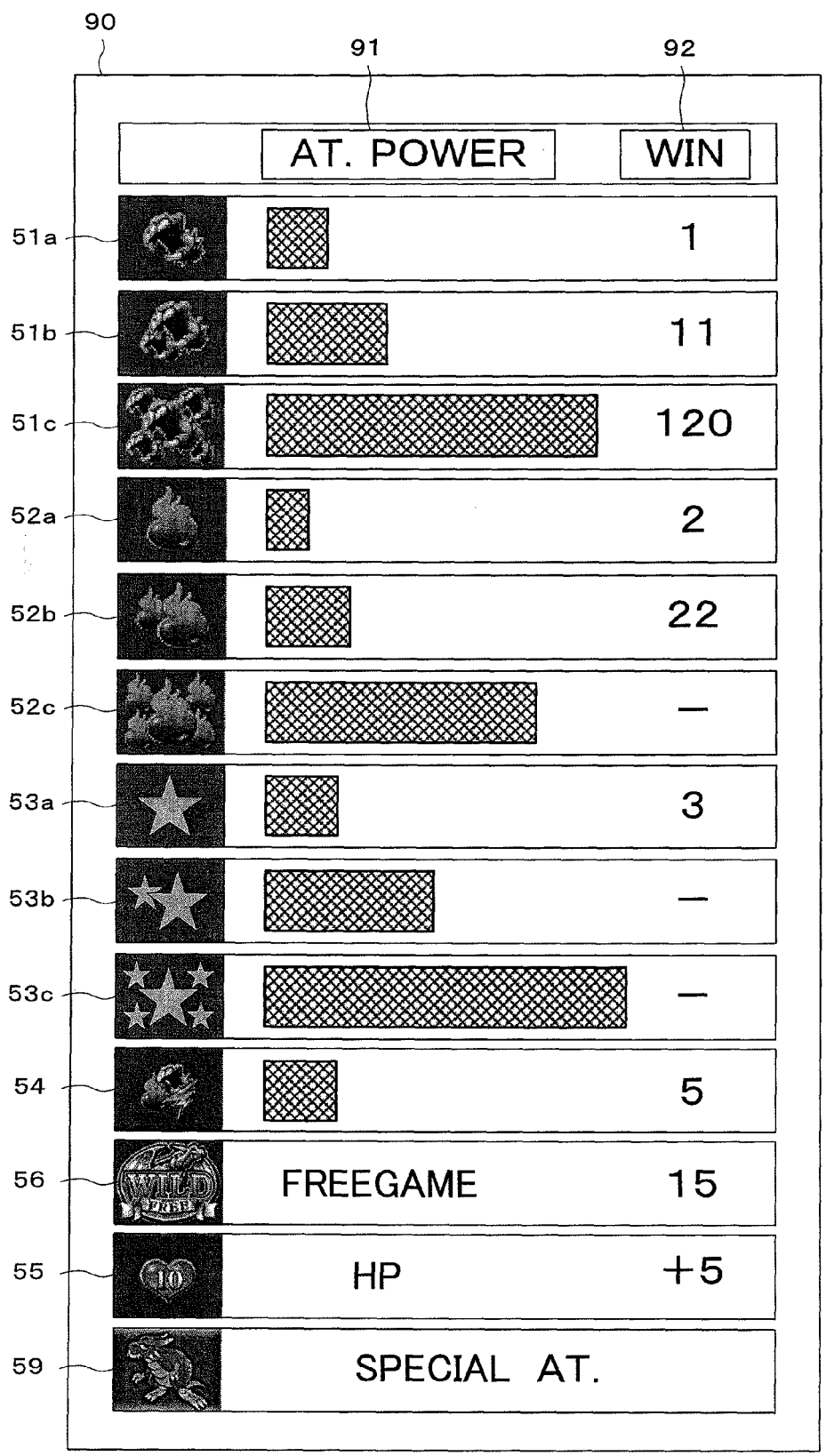
FIG. 10 is a view showing an exemplary dividend list.

FIG. 10 is a diagram showing an example of a dividend list. A dividend list 90 is determined for "AT. POWER" (91) shows an offensive power and "WIN" (92) shows the amount of payout. When the symbols included in the tables of the three monsters associated with the respective reels 41*a* to 41*c* are the symbols 51*a* to 51*c* for carrying out a physical offensive, the symbols 52*a* to 52*c* for carrying out a fire offensive, the symbols 53*a* to 53*c* for carrying out a magic offensive, the symbol 54 for carrying out a multiple offensive, the symbol 55 for restoring the physical strength, the symbol 56 as a wild symbol, and the symbol 59 representing Bluedragon, the prize-deserving sequences that can be realized using these symbols are determined and the dividend for each prize-deserving sequence is determined. For example, when the symbols 51*a* for carrying out a physical offensive align in a line, the offensive power (AT. POWER) is smaller in level compared to the symbols 51*b* and 51*c* and the payout (WIN) is 1. When the symbols 53*c* for carrying out a magic offensive align in a prize-deserving line, the offensive power (AT. POWER) is larger in level compared to that of the symbols 53*a* and 53*c* but no payout (WIN) is given. Here, it is set that when the symbol 59 representing Bluedragon is displayed in any of the places, a special offensive can be carried out to aim at the weak point of Bluedragon. The dividend list described above is just an example and this is not limited. If the displayed symbol is different, the dividend list is also different as a result. For example, instead of the symbol 59 representing Bluedragon, the monster called "Demon" may be acceptable.

Figure 11:
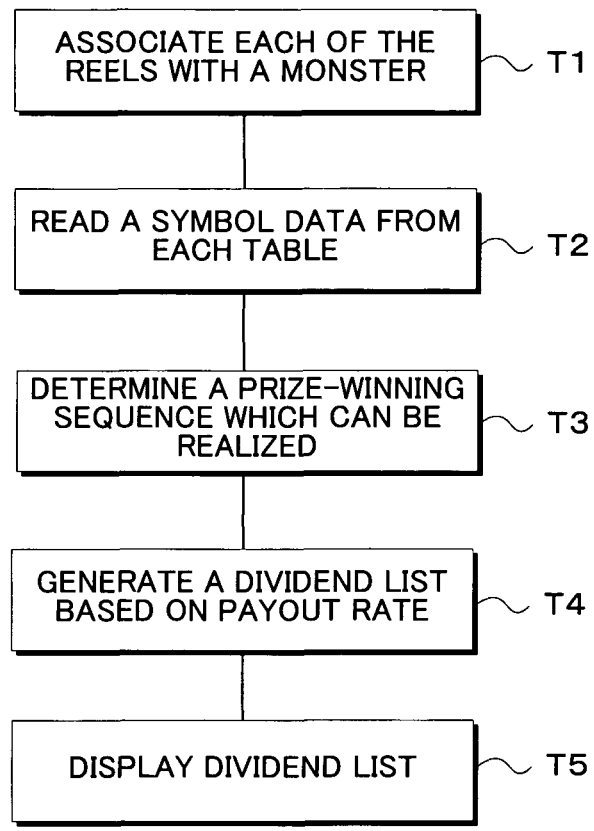
FIG. 11 is a flowchart showing the outline of the flow from generating a dividend list to displaying the dividend list on the screen.

FIG. 11 is a flow chart showing the outline of a flow from generation of dividend list data to display of the dividend list. A player associates the monsters with the respective reels 41*a* to 41*c* while taking the strategy into consideration as described above, and after the association of the monsters with the reels (step T1), the symbol data is read from the table of the monsters associated with the respective reels (step T2).

Next, prize-deserving sequences that can be realized are determined from the data of the symbols (step T3). Next, based on the payout rate determined in advance, dividend list data is generated (step T4). Finally, it is displayed on the screen as a dividend list 45 (step T5).

Next, in FIG. 8, each player rotates the reels by turns and carries out an offensive against the opponent party. When a player carries out an offensive (step S2), the player judges whether or not the opponent is defeated (step S3). In other words, the player judges whether or not the physical strength value of the opponent monster can be decreased to zero. For example, as shown in FIG. 9(C), a fire offensive is being carried out against the party of the player on the right side because the symbols of fire offensive align in a line in the party of the player on the left side. When the opponent is defeated, the player is the winner in the battle (step S4). If the opponent is not defeated, then the opponent carries out an offensive (step S5). When attacked by the opponent, the physical strength value of the party of the player decreases, therefore, it is judged whether or not the physical strength value of the party of the player still remains (step S6). Then, when the physical strength value of the party of the player still remains, the next step will be step S2, where the player carries out an offensive. On the other hand, in step S6, when no physical strength value of the party of the player remains, the player is the loser (step S7).

When the player on the left side wins as a result of the battle described above, as shown in FIG. 9(D), the player receives a bonus dividend, that is, a predetermined number of credits to be given to the winner in a battle and gains any one of the opponent monsters. In other words, data representing the monster and its life is added to the player side and written into a memory. Then, it is made possible to play a game again using the data representing the monster and its life. Further, the player gains the above-mentioned magic point. On the other hand, on the defeated player side on the right side, the lives of all the monsters in the party decrease by one.

Here, there is a fixed correspondence between the life value of the monster that the player on the left side has gained and the life value each monster configuring the party of the player on the right side has lost. For example, when the monster that the player on the left side has gained is a strong monster, its life value is decreased and on the other hand, when the monster that the player on the left side has gained is a weak monster, its life value is increased.

As described above, according to the game machine according to the present embodiment, a plurality of prize-deserving sequences and dividend list data representing a dividend when each prize-deserving sequence is realized are generated based on the data of the plurality of kinds of symbol in each table, therefore, it is possible to change the dividend list in accordance with the data of the symbol. Then, when the data of the symbol is changed, the dividend list is changed accordingly, therefore, it is made possible to change the dividend list in a real time manner following the change of the data of the symbol. Because of this, the dividend list, which used to be a stereotyped one, can be changed arbitrarily, therefore, the prize-deserving sequences that can be realized can be changed, and it is made possible to enhance amusement of the game. Further, a dividend list is displayed on the screen based on the generated dividend list data, therefore, it is possible to inform a player of a new dividend list.

As a modification example, it may also be possible to create a table having the data of a plurality of kinds of symbol that can be displayed on the reels when the monsters are associated with the respective reels by user's selection. In other words, as in the present embodiment, instead of that a plurality of tables are stored in advance in the ROM 2c, a table is created by executing a program when a monster is selected. Specifically, when a player associates a particular monster with a reel, a process for reading out the data of the symbol specific to the monster from the ROM 2c is performed and a process for creating a table is performed based on the data of the read-out symbol. Next, a process for forming a reel band from the created table is performed and the symbol is displayed in its varying or halted state using the reel band.

Due to this, the symbols to be displayed on the reels change in accordance with the monsters selected by a player. In other words, the symbols that can be displayed on each reel can be changed by selecting monsters, therefore, it is made possible to enhance amusement of the game. Further, a table to be used to display symbols is created, therefore, the property of randomness is enhanced compared to the case where a predetermined table is used and it is made possible to diversify the display of the symbols.

The operation characteristic to the present invention is performed by causing a computer to execute a game program. In other words, the game program is characterized by causing a computer to read and convert a series of processes into executable commands, which processes include: a process performing each of a varying state presentation that changes the display of a plurality of display areas so that each virtual reel in a reel group consisting of a plurality of virtual reels on which a plurality of symbols are arranged using the plurality of display areas as the game starts and a halted state presentation that displays a state in which any one of the symbols is halted in the plurality of display areas; a process for storing a lottery table for selecting for each play any one of a plurality of sequences represented by a combination of symbols displayed in their halted state in the display areas, and data of the virtual reel corresponding to the prize-winning probability of each sequence in the lottery table; a process for generating dividend list data representing a dividend when at least one of the prize-deserving sequences is realized based on the lottery table; a process for displaying the virtual reel group corresponding to the lottery table and performing the varying state presentation or the halted state presentation in accordance with the lottery result using the lottery table as the play proceeds; and a process for displaying a dividend list on the screen using the generated dividend list.

As described above, dividend list data representing a dividend when at least one of the prize-deserving sequences is realized is generated based on the lottery table and a dividend list is displayed on the screen using the generated dividend list data, therefore, it is possible to change the dividend list in accordance with the data of the lottery table. Then, when the lottery table is changed, the dividend list is changed accordingly, therefore, it is made possible to change the dividend list in a real time manner following the change of the lottery table. Because of this, the dividend list, which used to be a stereotyped one, can be changed arbitrarily, therefore, the prize-deserving sequences that can be realized can be changed, and it is made possible to enhance amusement of the game. Further, a dividend list is displayed on the screen based on the generated dividend list data, therefore, it is possible to inform a player of a new dividend list.

The above-mentioned program is available in a state of being recorded in a recording medium such as CD-ROM and DVD. Further such a program is available by receiving signals transmitted by a computer, that is, a transmitter, via a transmission medium such as a communication network consisting of public telephone lines, private telephone lines, cable TV lines, radio communication lines, etc., configuring a network. The signals are computer data signals embodied in a predetermined carrier including a program. At the time of the transmission, it is only necessary to transmit at least part of the program in the transmission medium. In other words, it is not necessary for all the data configuring the above-mentioned program to present in the transmission medium at a time. Transmission methods for transmitting a program from the computer include continuous transmission of the data configuring the program and intermittent transmission thereof.

Fourth Embodiment

Into a game machine according to the present embodiment, a concept of "virtual BET" and "virtual WIN" is introduced, besides "token BET" to bet a token as a redeemable value and "token WIN" to gain a dividend as payout of a token (or addition to credit). The value of (virtual WIN)−(virtual BET) corresponds to an expected value to be paid as usual during the game and the following relational expression holds for the set value of the payout rate (P/O) on the game machine.

(P/O set value)=[(token WIN)+{(virtual WIN)−(virtual BET)}]/(token BET)

There are two concepts of value, that is, "credit" and "magic point" relating to the game machine according to the present embodiment. "Credit" relates to insertion or payout of a token as in the general token game. "Magic point" is a concept of value specific to the present game machine. In other words, it has nothing to do with credit directly and increases or decreases during a particular game, having peculiar BET and WIN concepts. Then, the magic point that a player has will be an object of virtual BET and virtual WIN.

A game machine according to the present embodiment is configured as a token game machine, that is, a slot machine employing a video reel system in which three reels are displayed on a video. By using the video reels, a multiplayer competition game, in which characters are made to compete with each other, is played. Each character is represented as a "monster" having its own character.

A player can select any three monsters from among a plurality of monsters. The selected monsters are each associated with each of the above-mentioned reels. Each reel uses a table in accordance with the associated monster. Due to this, a reel band having an arrangement of symbols corresponding to the monster is determined and the symbol specific to the monster is displayed in its varying or halted state. After the monsters are associated with all of the reels, a dividend list is created based on the data of the symbols included in the table. The dividend list data is displayed on the screen as a dividend list.

The physical strength value, the favorite trick (fighting ability or defending ability), and the arrangement of symbols in the reel band differ from monster to monster, therefore, a plurality of monsters are combined to realize various sequences. For example, such characteristics are generated that "vulnerable to a fire offensive but well defended against a magic offensive" or "the offensive power is low but the physical strength is high and good at a fight of attrition". Then, since the symbols to be arranged on one reel are fixed, it is not possible to set the character of a monster that is well defended against all kinds of offensive and there is established a relationship of strength like that between stone, scissors, and paper in a finger flashing game.

In the present game machine, the symbol is displayed in its varying state on the video reel and after a lapse of a predetermined time, it is displayed in its halted state and when a particular prize-deserving sequence is realized, a dividend is paid and a rendering of carrying out an offensive against the opponent monster is performed. The attacked monster decreases its physical strength value. Two players carry out an offensive and protect against the offensive by rotating the reels by turns and when the physical strength value of a monster of one of the players is decreased to zero, the other player wins the game.

The games played with the present game machine are divided into a Short play, an Original game, and a Jackpot game. A Short-play is ready when lines (1 to 5) are set by operating a bet button after inserting a token. In other words, this is a game that has obviated an entry card for reading and writing data via magnetism. A player competes with a computer (client device) using a predetermined monster. Because no entry card is required, a player can participate in a game readily. The object of the Short-play is to make a player understand the contents of the game and move to a "multi-player competition game" to be described later. After preparations are made, when a start button is operated, the reels rotate and if a predetermined combination of symbols appears, damage is given to the monster of the opponent (computer, here) and a dividend is paid. Each time the opponent monster is defeated, the player gains a victory bonus (for example, ten tokens) and if the player wins three consecutive games, it is made possible for him/her to play a Jackpot game to be described later.

By the way, the Short-play is played based on the following supplementary rules. (1) A player takes the first action in all of the battles, that is, the player is first to realize a sequence when the reels rotate and stop and gain its dividend. (2) The level of the opponent monster becomes higher in order of "1→2→3", therefore, the opponent becomes stronger each time the player wins. Here, the "level of a monster" is the offensive power that decreases the physical strength value of the opponent monster and the resistivity that prevents its own physical strength value from decreasing when attacked by the opponent, both the offensive power and the resistivity being expressed by a numeric value. For example, when the level of a monster becomes high, the resistivity increases and the reduction in physical strength value becomes less for the same offensive, or the offensive power increases and damage (reduction in physical strength value of the opponent) given to the opponent becomes greater by the same offensive (the same sequence), and the probability of the final victory becomes higher. (3) The physical strength value of the monster selected by the player is fully restored for each game. (4) When the monster selected by the player is defeated, the level of the opponent monster returns to 1 and the physical strength value is restored by half. (5) Immediately after a battle starts, the opponent monster does not carry out an offensive until the offensive of the player hits the monster. In other words, no prize-deserving sequence is realized on the opponent (computer) side until a particular prize-deserving sequence is realized on the player side. (6) When "the monster symbols (symbols representing predetermined monsters as described above)" align in a line during the battle, the monster of the player turns into a monster with a higher level. As a result, the probability of the victory of the player becomes higher. On the other hand, when defeated in the battle, the original situation returns. In other words, the probability of the victory of the player is returned to the state before it is raised. (7) When a Jackpot-game to be described later ends, the monster of the player turns into a monster with a higher level. As a result, the probability of the final victory of the player becomes higher. On the other hand, when defeated in the battle, the original situation returns. In other words, the probability of the victory of the player is returned to the state before it is raised.

The Jackpot game is a game in which a player competes with a computer (server device arranged in the center). The server device has a case formed into a monster called "Goddragon" and a monster selected by a player competes with "Goddragon". When the offensive against Goddragon is effective, that is, when a particular prize-deserving sequence is realized, the player is given a hit dividend, that is, a dividend corresponding to the realized prize-deserving sequence and all of the dividends can be gained as a bonus. When Goddragon is defeated, the player can further gain a clear bonus. The Jackpot game is a free game and all of the gained dividends are turned into the credit. In the Jackpot-game, the time for a play is limited and after a lapse of a predetermined time, an offensive is carried out automatically.

The Original game is a game played over a long period of time using an entry card for reading and writing data via magnetism. A player inserts an entry card into a card insertion slot to participate in a game. The Original game is provided with the following five kinds of game aspect. That is, (1) Mission, (2) Tournament, (3) Blend, (4) Shop, and (5) Data.

Mission is a game in which, for example, a player clears 12 stages and hidden stages and is a game aspect the object of which is to collect a magic point, which is a point specific to the game, and a monster. It is a game in which a player competes with a computer (client device) and gains only a dividend of a token, that is, a credit during battle. When a player wins the battle, the player can gain a monster (for example, three lives). In other words, data representing the monster and its life is input to the player side and written into a memory. Then, it is made possible to play a game again using the data representing the monster and its life. The life of a monster is a numeric value having the meaning of so-called life (the number of lives), indicative of the limit of the number of times (when the physical strength value is lost, it is regarded as one time) the monster can be used in the game. The life represents the remaining number of times available of the monster. On the other hand, when defeated, the life of the monster used is reduced by one. When a player wins and ends the game, the player gains the magic point as a bonus. The result of the game is recorded in the entry card.

In the Mission, the Mission challenging fee and the battle fee (the credit required each time the reels are rotated) correspond to BET and the dividend (credit gained at the time of hit) as a result of the battle corresponds to WIN. The life of the monster to be decreased when defeated corresponds to virtual BET and the monster gained at the time of victory and the magic point gained when the game is cleared correspond to virtual WIN.

The Tournament is a game in the form of a tournament in which a player competes with another player. In other words, players bet the magic points gained in the Mission and make their monsters to compete with each other. Only players having the magic point (10 to 30) specified for each tournament and monsters that meet the condition of participation can participate in the game. The condition of participation is that the number of remaining lives is equal to or greater than a value of criterion that the level is equal to or greater than a value of criterion, etc., which can be set in accordance with a game. A player pays a tournament fee (9 to 75 BETs), however, the magic point is used for the battle fee other than that. In other words, a player bets the magic point and gains the magic point as a dividend. A player gains a monster of the opponent each time the player wins, that is, data representing a monster corresponding to the opponent monster and its life is added. On the other hand, when defeated, the lives of all the monsters used in the battle are reduced by one, respectively. Therefore, when defeated in the battle, the number of times available of the monster is reduced. Here, a monster is represented on a card and displayed on the screen, therefore, to gain a monster means to gain a card of the monster on the screen. The card in hand can be used in a competition as a monster in hand. Thus, if a player continues to win to the last, the player wins the championship and can play the Jackpot-game in which to compete with Goddragon.

In the Tournament, the tournament participation fee corresponds to BET and the championship bonus (credit gained in a Jackpot game) corresponds to WIN. The battle fee (magic point required each time the reels are rotated) and the life of a monster to be decreased when defeated correspond to virtual BET and the dividend (magic point gained at the time of hit) as a result of the battle and the monster gained at the time of victory correspond to virtual WIN.

The Blend is a game aspect in which a plurality of monsters are combined to give birth to a new monster. In other words, by using data representing a plurality of monsters and their lives, data representing a new monster and its life is generated. When the same monsters are blended, the kind of monster remains the same and only their lives and scores are added. When different kinds of monster are blended, a new monster is generated and the life of the monster is half the total lives or half plus 0.5 and the score is initialized. When a Blend is performed, respective different credits in accordance with respective monsters are required. By the way, as a result of Blend, it is set that data representing a monster called "Goldmonster" is generated with a slight probability, which monster gives a large dividend although limited to only one battle.

The Shop is a game aspect in which a player purchases a monster for 10 credits. When a player operates to direct purchase, the credit possessed by the player is reduced by 10, data of any one of monsters is generated, and the player gains the card of the monster on the screen. By the way, although the probability is slight, it is set that data representing a monster called "Goldmonster" is generated as a result of purchase.

The Data is a game aspect in which the monsters possessed by a player or the score of the player is displayed. By specifying a particular monster, it is possible to display the score (the number of battles, the number of victories, the percentage of victories to the total number of battles, the total points gained in its life) of the monster alone.

FIG. 1 is an appearance view of the game machine according to the present embodiment. The game machine 1 is provided with the server device 2 arranged in the center, having a case the appearance of which is formed into a shape of a monster, and a plurality of client devices 3 around the server device 2. Each client device 3 comprises components required for the individual players to play a game, including a plurality of operation buttons and a display unit for displaying images. Each player plays a multiplayer competition game using the client device 3 and when a player wins the championship in the tournament, the player can participate in a free game in which the player competes with the server device 2 in the center. The case of the server device 2 having a shape of a monster enhances the effect of a rendering and provides the effect to raise the challenging spirit of a player.

FIG. 3 is a block diagram showing an electrical configuration of the server device 2. In the server device 2, the CPU 2a reads out data from the RAM 2b and the ROM 2c or writes data into the RAM 2b. Then, a control operation is performed in accordance with a program set in advance. In the ROM 2c, in addition to a control program for controlling the action of the game machine 1, data of the symbols that can be displayed on the reels, data representing each monster, and various kinds of tables (the arrangement of the symbols configuring the reel band as shown in FIG. 7) corresponding to the data representing each monster are stored as shown in FIG. 6 and FIG. 7, and these are read out and used as the need arises. The data representing each monster is displayed as a card until it is selected by a player.

The random number generation circuit 2e generates fixed random numbers. Data relating to images is output to the display unit 2g consisting of, for example, a liquid crystal display device, via the display unit control circuit 2f that performs image processing etc. On the display unit 2g, letters, still images, motion videos, etc., are displayed. It is not necessarily required for the server device 2 to have the display unit 2g. Data relating to audios is output from the CPU 2a to the loudspeaker 2i via the audio control unit 2h that performs audio processing, amplification, etc. The respective components perform transmission and reception of data to each other via the control bus 2n. Then, the server device 2 performs transmission and reception with each of the client devices 3-1 to 3-n via the input-output interface 2j and the bus N.

FIG. 4 is a block diagram showing an electrical configuration of the client device 3. The token discrimination device 3a judges whether or not a token is proper and the payout token counter 3b counts the number of tokens to be paid. The operation unit 3c comprises a plurality of operation buttons, a start button, etc., and inputs a signal when a player operates these operation buttons and the start button. The token payout device 3d performs payout of tokens. Data relating to images is output to the display unit 3f consisting of, for example, a liquid crystal display device, via the display unit control circuit 3e that performs image processing etc. On the display unit 3f, letters, still images, motion videos, etc., are displayed. For example, images as shown in FIG. 5 are displayed. Data relating to audios is output to the loudspeaker 3h via the audio control unit 3g that performs audio processing, amplification, etc. The respective components perform transmission and reception of data to each other via the control bus 3n while being controlled by the CPU 3i. The CPU 3i reads out data from the RAM 3j and the ROM 3k or writes data into the RAM 3j. Then, a control operation is performed in accordance with a program set in advance. In the ROM 3k, a program for controlling image display, a program for controlling audios, etc., are stored and these are read out and used as the need arises. The random number generation circuit 3m generates fixed random numbers. The client device 3 performs transmission and reception of data with the server device 2 via the input and output interface 3p.

The RAM 2b configures a main memory and a sub memory. In other words, the RAM 2b is divided into the main memory and the sub memory in the memory space and each plays each role. The display unit 2g and the display unit 3f configure a display unit and the operation unit 3c configures a data input unit. The CPU 2a, the RAM 2b, and the ROM 2c configure a game performing unit, a stop symbol determination unit, and a lottery device. The operation unit 3c configures a data input unit and the input and output interface 3j configures a communication interface.

FIG. 5 is a diagram showing an example of a screen displayed on the display unit 3f of the client device 3. In the center of the screen 40, the three reels 41a to 41c that display a plurality of kinds of symbol in the varying or halted state are displayed. On the right end of the screen 40, the sub screen 42 that displays the state of the reels of the opponent in a competition is displayed. With the present game machine, a player can select the card of a monster by operating the operation buttons on the operation unit 3c. Then, the player associates the cards of a monster arbitrarily selected with each of the reels 41a to 41c. This operation may be performed by the player following guidance. For example, a message "which monster you select as a boss?" or a message "which monster you use for the first reel?" is displayed and at the same time, cards of a plurality of monsters are displayed on the screen. Then, the card of a monster can be determined in accordance with the operation using the operation buttons and when a "determination button (enter key)" is operated, the selected monster is associated with the reel.

In the area 43a on the left side of the screen 40, the monster 43b associated with the center reel 41b is displayed among the three monsters selected by the player. The name of the monster 43b is displayed on the name display area 43c provided below the reels 41a to 41c. The physical strength value of the monster 43b is displayed by the bar graph 43d. On the other hand, in the area 44a on the right side of the screen 40, the monster 44b associated with the center reel on the opponent side is displayed among the three monsters selected by another player, who will be the opponent in the competition, or the computer. The name of the monster 44b is displayed on the name display area 44c provided below the sub screen 42. The physical strength value of the monster 44b is displayed by the bar graph 44d.

In the dividend list 45, a dividend to be paid to a player is displayed in accordance with a sequence realized by a combination of symbols displayed on the respective reels 41a to 41c. In other words, after the monsters are associated with all of the reels, dividend list data is generated based on the data of the symbols included in the table. Based on the dividend list data, a dividend list is displayed on the screen.

Normally, when the respective symbols are displayed in the halted state on the respective reels 41a to 41c after displayed in the varying state, a rendering is performed by an animation in which the monster 43b and the monster 44b fight with each other on the top portion of the screen 40. For example, in the case of the offensive, an animation is displayed in which the monster hits, kicks, bites, etc., the opponent. An animation in which the monster blows a flame against the opponent etc. may be displayed. Further, the image of the monster may be changed in accordance with the property of the monster on the offensive side. For example, in the case of a two-footed monster, an animation in which the monster stamps, kicks the opponent, etc., is displayed. In the case of a monster with a motif of wild beasts, an animation in which the monster roars out, shows its teeth, etc., is displayed. In this manner, by changing the images of the scene of the offensive by the monster and the monster itself, it is made possible to make clear the offensive type, the property of the monster, etc. Further, the image display is prevented from becoming monotonous and it is made possible to perform an effective rendering. As a result, it is possible to impress a player with the scene of the offensive. Furthermore, when attacked by the opponent, the physical strength value of the monster decreases and at this time, it may also be possible to change the image of the monster. In other words, when the physical strength value of the attacked monster decreases, the scene in which the monster is injured and writhes in agony is displayed in an animation. Due to this, it is possible to make clear the offensive received and reduction in physical strength value. However, when a special offensive is carried out, a rendering by an effect animation using the entire screen 40 is displayed. For example, an animation in which a monster moves around on the entire screen 40, the size of a monster is increased, etc., is displayed. At this time, it may also be possible to change the color, to display flashing, or to display the image of lighting.

As shown in FIG. 6, there exist many kinds of symbol to be displayed on the respective reels 41a to 41c. In FIG. 6, the symbols 51a to 51c are those for carrying out a physical offensive. When certain symbols align in a line (prize-deserving line), the monster 43b selected by the player carries out a physical offensive against the opponent monster 44b. By the way, the fighting power is that of a symbol with the lowest level. The symbols 52a to 52c are those for carrying out a fire offensive. When certain symbols align in a line, the monster 43b carries out a fire offensive against the opponent monster 44b. By the way, the fighting power is that of a symbol with the lowest level. The symbols 53a to 53c are those for carrying out a magic offensive. When certain symbols align in a line, the monster 43b carries out a magic offensive against the opponent monster 44b. By the way, the fighting power is that of a symbol with the lowest level.

The symbol 54 is one for carrying out a multiple offensive. When the symbols 54 align in a line, the monster 43b carries out a physical offensive, a fire offensive, and a magic offensive simultaneously against the opponent monster 44b. At this time, each offensive is carried out with the fighting power supposed to be level 1. The level of the fighting power indicates the degree that the physical strength value of the opponent monster can be decreased and when the numeric value is large, it is possible to decrease the physical strength value of the opponent monster more. Further, it is possible for the symbol 54 to perform the same function as that of the symbol of a physical offensive, a fire offensive, or a magic offensive with level 1, that is, the symbol 51a, the symbol 52a, and the symbol 53a. The symbol 55 is one for restoring the physical strength. When the symbols 55 align in a line the physical strength value of the monster 43b is restored by a fixed numeric value. The symbol 56 is a wild symbol. The symbol 56 has a function of being replaced with any symbol except that of a monster. When the symbols align in a line, a free game starts, which can be started without betting. The symbols 57 to 59 are those representing the respective monsters. When one or more (three in total) monsters are revealed on the respective three reels 41a to 41c, the respective monsters' favorite tricks are displayed on the screen the player can put it into action by selecting one of the tricks according to the guidance on the screen. The favorite trick that can be put into action differs depending on the kind of a monster.

In the game machine according to the present embodiment, the level, favorite trick, reel property, and BET fee are determined for each monster. As shown in FIG. 7(A) to FIG. 7(C), these are displayed on the cards 60 to 62 representing monsters. The level represents the degree of the ability of the monster. The physical strength value is a value that determines the initial physical strength of the monster. The favorite trick is an attribute of the offensive that the monster has and can be increased or decreased. The reel property is determined by the ratio between the numbers of symbols representing a physical offensive, those representing a fire offensive, and those representing a magic offensive in the reel band. The bet fee is the number of BETs required to use the monster in a game. The BET fee differs from monster to monster and a monster with a higher level has a higher probability that the player will win, therefore, the BET fee is higher.

In the game machine according to the present embodiment, monsters configuring a reel band differ depending on the kind of monster. In other words, a table used as a reel band includes data of a plurality of kinds of symbol and differs from monster to monster. For example, as shown in FIG. 7(A), on a table corresponding to a monster called "Geropy", the symbols 51a representing a physical offensive and the symbols 52a representing a fire offensive are large in number, therefore, the offensive power is not high. In other words, even if the symbols align in a line, the degree that the physical strength value of the opponent monster can be decreased is low. On the other hand, the table is abundant in symbols 55 that restore the physical strength value by 30, therefore, the monster has many chances to recover even if attacked. As shown in FIG. 7(B), a table corresponding to a monster called "Demon" includes many symbols 51a and 51b representing a physical offensive and many symbols 53a to 53c representing a magic offensive, therefore, the offensive power is high. In other words, when the symbols align in a line, the degree that the physical strength value of the opponent monster can be decreased is high. As shown in FIG. 7(C), a table corresponding to a monster called "Bluedragon" includes many symbols 52a to 52c representing a fire offensive and also includes the two wild symbols 56, therefore, the offensive power is high. In other words, when the symbols align in a line, the degree that the physical strength value of the opponent monster can be decreased is high. As described above, the table specific to the respective monsters are stored in the ROM 2c and function as reel bands when associated with respective reels by a player.

As described above, a table includes a monster or data relating to the action of the monster, therefore, the monster selected by a player or the symbol relating to the monster is displayed in the varying or halted state. When the monster selected by the player or the symbol relating to the monster is displayed in the halted state, the monster takes the action of the offensive relating to the symbol, therefore, it is possible to inform the player in advance of the action of the monster by means of the display of the above-mentioned symbol in the halted state. For example, when the monster selected as above is "Bluedragon", the symbol representing Bluedragon and the symbol representing the favorite offensive of Bluedragon are included on the table, therefore, when a prize-deserving sequence due to the symbols is realized, it is possible to impress the player that a prize-deserving sequence specific to Bluedragon is realized by displaying an animation in which the offensive action specific to Bluedragon is taken.

Next, the operation of the game machine according to the present embodiment is explained. First, in the Short play, it is assumed that a party is composed of three of the same monsters. Therefore, the three reels display symbols based on the same table. Since the table includes only one kind of symbol for performing the favorite trick of the monster, it is possible for the monster to perform only one favorite trick. As a monster of a player, any one of monsters with the lowest level (for example, level 1) is selected. If the player loses a game, a monster is selected again by lottery. As a monster to be an opponent to the player, any one of monsters with a level slightly higher than the lowest level (for example, level 2) is selected in the first round. Then, in the second round, any one of monsters with, for example, level 3 is selected, and in the third round, any one of monsters with a still higher level, for example, level 4 is selected. After preparations are made, when a start button is operated, the reels rotate and if a predetermined combination of symbols appears, damage is given to the monster of the opponent (computer, here) and a dividend is paid. Each time the opponent monster is defeated, the player gains a victory bonus (for example, a credit of ten tokens) and if the player wins three consecutive games, it is made possible to play the Jackpot game. In the Jackpot game, the same monster appears at all times.

Next, the Mission is explained. In Mission 1, a player plays one battle game with an opponent. After paying a challenging fee (for example, three BETs), the player determines members configuring a party while observing the boss (monster) of the opponent. The "boss" is a monster associated with the center reel and plays the leading role of the party and its character determines the policy of strategy. "Members" are monsters to be associated with the right reel and the left reel and configure the party together with the boss. During the battle, a credit is bet and a game to gain (WIN) the credit is played. The player first initiates an offensive and if the player wins, it is possible to gain a monster. In other words, data representing the monster is output to the RAM 2b. The monster the player gains is any one of the three opponent monsters. Further, the player gains one life and the magic point (5 MP). On the other hand, if defeated, the life of any one of the monsters in the party is decreased by one. The monster is selected at random.

In Mission 2, a player plays two battle games with an opponent. The order of the battle is the same as that in Mission 1 and two game are played with the same party. After paying a challenging fee (for example, four BETs), the player determines members configuring a party while observing the boss (monster) of the opponent. If the player wins the first game, the player gains any one of the three opponent monsters (two lives) and plays the second game. If the player loses the first game, the game is over. If the player wins the second game, the player becomes "Clear" and gains one more monster and the bonus magic point, for example, 10 MP. On the other hand, if defeated, the life of any one of the monsters in the party is decreased by one. The monster is selected at random.

In Mission 3, a player plays three battle games with an opponent. A party is composed of a boss and four members. By the way, a system is employed, in which a member (monster) once used is retreated into a monster holder. In other words, it is assumed that a monster selected as a member can be used only once, a monster selected as a boss is fixed, and a monster gained from the opponent can be used. If the player wins three consecutive games, the player becomes "Clear" and gains the bonus magic point.

In the first round, the player selects three monsters from the party to form a battle team and fights a battle. If the player wins the game, the player gains any one of the three monsters of the opponent (three lives). On the other hand, if defeated, the game is over at this point and the life of any one of monsters in the party is decreased by one. The monster is selected at random. In the second round, the player selects two members (monsters) from among the party consisting of the members (monsters) excluding the members used in the first round and the monster gained from the opponent and added to the party, forms a battle team, and fights a battle. If the player wins the game, the player gains any one of the three monsters of the opponent (three lives). On the other hand, if defeated, the game is over at this point and the life of anyone of monsters in the party is decreased by one. The monster is selected at random. In the third round, the player forms a battle team from the three monsters, that is the members left to the last and the monster gained from the opponent, and fights a battle. If the player wins the game, the player gains any one of the monsters of the opponent (three lives) and the bonus magic point (20 MP). On the other hand, if defeated, the game is over at this point and the life of any one of monsters in the party is decreased by one.

Next, in the Tournament, respective players form respective parties of their own and play tournament games. This is a game in which only players who have a specified magic point determined in advance can participate. The game proceeds in such a way that after paying a tournament participation fee on credit, a player bets the magic point and tries to win the magic point. Therefore, it is acceptable that the magic point becomes zero or negative. If a player wins, the player can gain a monster, however, if defeated, the life of a monster in the party is decreased. A player can make only one party participate in a game. By the way, if the number of players who participate in the Tournament is less than the number of players who can participate, a computer functions as a participant. A player who wins the championship in the Tournament can challenge the Jackpot game, which is a free game.

FIG. 8 is a flow chart showing a specific flow of the Tournament game. First, after betting the required number of BETs, a player determines a battle team (party) (step S1). Here, as shown in FIG. 9(A), a monster to be associated with the center reel is determined. The monster will be the "boss" and plays the leading role in the party and the policy of strategy is determined by its character. For example, as shown in the figure, a player on the left side tries to set a monster having a high recuperative power and good at a fight of attrition as the boss. A player on the right side tries to set a monster as the boss, which monster has a high magic offensive power, that is, with which monster, the degree is large that the physical strength value of the opponent monster is decreased when the symbols 53a to 53c for carrying out a magic offensive align in a line, or which monster corresponds to the reel including many symbols 53a to 53c on the table, or which monster corresponds to the reel including many symbols 53c in particular. Next, monsters to be associated with the right reel and the left reel are determined. These monsters configure the party as the "members". At this stage, the opponent boss can be recognized by each other, therefore, each player determines monsters as members while estimating the opponent's strategy. For example, as shown in FIG. 9(B), the player on the left side observes the opponent boss and judges that the boss is a monster vulnerable to a flame (a fire offensive), that is, the degree is large that the physical strength value is decreased when the symbols 52a to 52c for carrying out a fire offensive align on the player's side. The player on the right side tries to add a monster to the party, which monster is well-defended against a fire offensive, that is, with which monster, the degree is small that the physical strength value is decreased when the symbols 52a to 52c for carrying out a fire offensive align in a line on the opponent side, because the boss monster of the player is vulnerable to a fire offensive. Since the game has two objects, one is to defeat the opponent in the competition and the other is to increase the number of tokens, selection of a monster (card) to be associated with a reel affects achievement of both the objects. In the present game machine, when a monster is associated with a reel, a dividend list is displayed in a real time manner. Therefore, it is possible for a player to select a monster to be associated with a reel from a strategic standpoint while comparing the reel property and the dividend list. The total value of the physical strength values of the three monsters configuring the party is set as an initial physical strength of the party. When all of the monsters are associated with the reels, dividend list data is generated and displayed as a dividend list on the screen 40.

Next, in FIG. 8, each player rotates the reels by turns and carries out an offensive against the opponent party. When a player carries out an offensive (step S2), the player judges whether or not the opponent is defeated (step S3). In other words, the player judges whether or not the physical strength value of the opponent monster can be decreased to zero. For example, as shown in FIG. 9(C), a fire offensive is being carried out against the party of the player on the right side because the symbols of fire offensive align in a line in the party of the player on the left side. When the opponent is defeated, the player is the winner in the battle (step S4). If the opponent is not defeated, then the opponent carries out an offensive (step S5). When attacked by the opponent, the physical strength value of the party of the player decreases, therefore, it is judged whether or not the physical strength value of the party of the player still remains (step S6). Then, when the physical strength value of the party of the player still remains, the next step will be step S2, where the player carries out an offensive. On the other hand, in step S6, when no physical strength value of the party of the player remains, the player is the loser (step S7).

When the player on the left side wins as a result of the battle described above, as shown in FIG. 9(D), the player receives a bonus dividend, that is, a predetermined number of credits to be given to the winner in a battle and gains any one of the opponent monsters. In other words, data representing the monster and its life is added to the player side and written into a memory. Then, it is made possible to play a game again using the data representing the monster and its life. Further, the player gains the above-mentioned magic point (for example, 10 MP). On the other hand, on the defeated player side on the right side, the lives of all the monsters in the party decrease by one.

Here, there is a fixed correspondence between the life value of the monster that the player on the left side has gained and the life value each monster configuring the party of the player on the right side has lost. For example, when the monster that the player on the left side has gained is a strong monster, its life value is decreased and on the other hand, when the monster that the player on the left side has gained is a weak monster, its life value is increased.

As described above, in the Tournament, a method of performing BET and WIN (dividend) by the magic point is employed, it is possible to continue the Tournament irrespective of the credit. In other words, if a player pays a credit required as a participation fee, the game is not ended even if the magic point becomes zero or negative, therefore, the player can enjoy the Tournament game fully.

The operation characteristic to the present invention is performed by causing a computer to execute a game program. In other words, the game program is a game program that is started by input of first numeric value data reflecting a redeemable value as a trigger and characterized by causing a computer to read and convert a series of processes into executable commands, which processes include: a process for receiving the input of the first numeric value data or second numeric value data that reflects the value determined in the game at the data input unit; a process for storing the input first numeric value data in the main memory; a process for outputting the first numeric value data from the main memory and at the same time, reducing the first numeric value data by the amount corresponding to the amount of that output from the main memory; a process for storing the input second numeric value data in the sub memory; a process for outputting the second numeric value data from the sub memory and at the same time, reducing the second numeric value data by the amount corresponding to the amount of that output from the sub memory; and a process for performing a normal game on the condition that the first numeric value data is input from the data input unit and performing, on the other hand, a special game on the condition that the second numeric value data is input from the data input unit.

As described above, a special game is performed on the condition that the amount of the second numeric value data from the data input unit is specified, therefore, it is possible to perform the special game only by the second numeric value data irrespective of the amount of the first numeric value data stored in the main memory. Therefore, if the first numerical data is present in the main memory, it is made possible to continue the special game even if the second numeric value data becomes zero or negative during the special game. Due to this, it is possible for a player to enjoy the game fully. In particular, the present invention is suitable for a multilayer competition game.

The above-mentioned program is available in a state of being recorded in a recording medium such as CD-ROM and DVD. Further such a program is available by receiving signals transmitted by a computer, that is, a transmitter, via a transmission medium such as a communication network consisting of public telephone lines, private telephone lines, cable TV lines, radio communication lines, etc., configuring a network. The signals are computer data signals embodied in a predetermined carrier including a program. At the time of the transmission, it is only necessary to transmit at least part of the program in the transmission medium. In other words, it is not necessary for all the data configuring the above-mentioned program to present in the transmission medium at a time. Transmission methods for transmitting a program from the computer include continuous transmission of the data configuring the program and intermittent transmission thereof.

Fifth Embodiment

A game machine according to the present embodiment is configured as a token game machine and is a slot machine that employs a video reel system in which three reels are displayed on a video. By using the video reels, a multiplayer competition game is played in which characters compete with each other. Each character is represented as a "monster" having its own character.

A player can select any three monsters from among a plurality of monsters. A party is formed by the selected monsters and each monster is associated with each of the above-mentioned reels. Each reel uses a table in accordance with the associated monster. Due to this, a reel band having an arrangement of symbols corresponding to the monster is determined and the symbol specific to the monster is displayed in its varying or halted state. After the monsters are associated with all of the reels, a dividend list is created based on the data of the symbols included in the table. The dividend list data is displayed on the screen as a dividend list.

The physical strength value, the favorite trick (fighting ability or defending ability), and the arrangement of symbols in the reel band differ from monster to monster, therefore, a plurality of monsters are combined to realize various sequences. For example, such characteristics are generated that "vulnerable to a fire offensive but well defended against a magic offensive" or "the offensive power is low but the physical strength is high and good at a fight of attrition". Here, there is established a relationship like that between stone, scissors, and paper in a finger flashing game.

In the present game machine, the symbol is displayed in its varying state on the video reel and after a lapse of a predetermined time, it is displayed in its halted state and when a particular prize-deserving sequence is realized, a dividend is paid and a rendering of carrying out an offensive against the opponent monster is performed. The attacked monster decreases its physical strength value. Two players carry out an offensive and protect against the offensive by rotating the reels by turns and when the physical strength value of a monster of one of the players is decreased to zero, the other player wins the game.

Further, there are two concepts of value, that is, "credit" and "magic point" in regard to the present game machine.

"Credit" relates to insertion or payout of a token as in the general token game. "Magic point" is a concept of value specific to the present game machine. In other words, it has nothing to do directly with the credit and increases or decreases in a particular game, having a concept of its own BET and WIN (dividend).

The games played with the present game machine are divided into a Short play, an Original game, and a Jackpot game. A Short-play is ready when lines (1 to 5) are set by operating a bet button after inserting a token. In other words, this is a game that has obviated an entry card for reading and writing data via magnetism. A player competes with a computer (client device) using a predetermined monster. Because no entry card is required, a player can participate in a game readily. The object of the Short-play is to make a player understand the contents of the game and move to a "multi-player competition game" to be described later. After preparations are made, when a start button is operated, the reels rotate and if a predetermined combination of symbols appears, damage is given to the monster of the opponent (computer, here) and a dividend is paid. Each time the opponent monster is defeated, the player gains a victory bonus (for example, ten tokens) and if the player wins three consecutive games, it is made possible for him/her to play a Jackpot game to be described later.

By the way, the Short-play is played based on the following supplementary rules. (1) A player takes the first action in all of the battles, that is, the player is first to realize a sequence when the reels rotate and stop and gain its dividend. (2) The level of the opponent monster becomes higher in order of "1→2→3", therefore, the opponent becomes stronger each time the player wins. Here, the "level of a monster" is the offensive power that decreases the physical strength value of the opponent monster and the resistivity that prevents its own physical strength value from decreasing when attacked by the opponent, both the offensive power and the resistivity being expressed by a numeric value. For example, when the level of a monster becomes high, the resistivity increases and the reduction in physical strength value becomes less for the same offensive, or the offensive power increases and damage (reduction in physical strength value of the opponent) given to the opponent becomes greater by the same offensive (the same sequence), and the probability of the final victory becomes higher. (3) The physical strength value of the monster selected by the player is fully restored for each game. (4) When the monster selected by the player is defeated, the level of the opponent monster returns to 1 and the physical strength value is restored by half. (5) Immediately after a battle starts, the opponent monster does not carry out an offensive until the offensive of the player hits the monster. In other words, no prize-deserving sequence is realized on the opponent (computer) side until a particular prize-deserving sequence is realized on the player side. (6) When "the monster symbols (symbols representing predetermined monsters as described above)" align in a line during the battle, the monster of the player turns into a monster with a higher level. As a result, the probability of the victory of the player becomes higher. On the other hand, when defeated in the battle, the original situation returns. In other words, the probability of the victory of the player is returned to the state before it is raised. (7) When a Jackpot-game to be described later ends, the monster of the player turns into a monster with a higher level. As a result, the probability of the final victory of the player becomes higher. On the other hand, when defeated in the battle, the original situation returns. In other words, the probability of the victory of the player is returned to the state before it is raised.

The Jackpot game is a game in which a player competes with a computer (server device arranged in the center). The server device has a case formed into a monster called "Goddragon" and a monster selected by a player competes with "Goddragon". When the offensive against Goddragon is effective, that is, when a particular sequence is realized, the player is given a hit dividend, that is, a dividend corresponding to the realized sequence and all of the dividends can be gained as a bonus. When Goddragon is defeated, the player can further gain a clear bonus. The Jackpot game is a free game and all of the gained dividends are turned into the credit. In the Jackpot-game, the time for a play is limited and after a lapse of a predetermined time, an offensive is carried out automatically.

The Original game is a game played over a long period of time using an entry card for reading and writing data via magnetism. A player inserts an entry card into a card insertion slot to participate in a game. The Original game is provided with the following five kinds of game aspect. That is, (1) Mission, (2) Tournament, (3) Blend, (4) Shop, and (5) Data.

The Mission is a game in which, for example, a player clears 12 stages and hidden stages and is a game aspect the object of which is to collect a magic point, which is a point specific to the game, and a monster. It is a game in which a player competes with a computer (client device) and gains only a dividend of a token, that is, a credit during battle. When a player wins the battle, the player can gain a monster (three lives). In other words, data representing the monster and its life is input to the player side and written into a memory. Then, it is made possible to play a game again using the data representing the monster and its life. The life of a monster is a numeric value having the meaning of so-called life (the number of lives), indicative of the limit of the number of times (when the physical strength value is lost, it is regarded as one time) the monster can be used in the game. The life represents the remaining number of times available of the monster. On the other hand, when defeated, the life of the monster used is reduced by one. When a player wins and ends the game, the player gains the magic point as a bonus. The result of the game is recorded in the entry card.

The Tournament is a game in the form of a tournament in which a player competes with another player. In other words, players bet the magic points gained in the Mission and make their monsters to compete with each other. Only players having the magic point (10 to 30) specified for each tournament and monsters that meet the condition of participation can participate in the game. The condition of participation is that the number of remaining lives is equal to or greater than a value of criterion that the level is equal to or greater than a value of criterion, etc., which can be set in accordance with a game. A player pays a tournament fee (9 to 75 BETs), however, the magic point is used for the battle fee other than that. In other words, a player bets the magic point and gains the magic point as a dividend. A player gains a monster of the opponent each time the player wins, that is, data representing a monster corresponding to the opponent monster and its life is added. On the other hand, when defeated, the lives of all the monsters used in the battle are reduced by one, respectively. Therefore, when defeated in the battle, the number of times available of the monster is reduced. Here, a monster is represented on a card and displayed on the screen, therefore, to gain a monster means to gain a card of the monster on the screen. The card in hand can be used in a competition as a monster in hand. Thus, if a player continues to win to the last, the player wins the championship and can play the Jackpot-game in which to compete with Goddragon.

The Blend is a game aspect in which a plurality of monsters are combined to give birth to a new monster. In other words, by using data representing a plurality of monsters and their lives, data representing a new monster and its life is generated. When the same monsters are blended, the kind of monster remains the same and only their lives and scores are added. When different kinds of monster are blended, a new monster is generated and the life of the monster is half the total lives or half plus 0.5 and the score is initialized. When a Blend is performed, respective different credits in accordance with respective monsters are required. By the way, as a result of Blend, it is set that data representing a monster called "Goldmonster" is generated with a slight probability, which monster gives a large dividend although limited to only one battle.

The Shop is a game aspect in which a player purchases a monster for 10 credits. When a player operates to direct purchase, the credit possessed by the player is reduced by 10, data of any one of monsters is generated, and the player gains the card of the monster on the screen. By the way, although the probability is slight, it is set that data representing a monster called "Goldmonster" is generated as a result of purchase.

The Data is a game aspect in which the monsters possessed by a player or the score of the player are displayed. By specifying a particular monster, it is possible to display the score (the number of battles, the number of victories, the percentage of victories to the total number of battles, the total points gained in its life) of the monster alone.

FIG. 1 is an appearance view of the game machine according to the present embodiment. The game machine 1 is provided with the server device 2 arranged in the center, having a case the appearance of which is formed into a shape of a monster, and a plurality of client devices 3 around the server device 2. Each client device 3 comprises components required for the individual players to play a game, including a plurality of operation buttons and a display unit for displaying images. Each player plays a multiplayer competition game using the client device 3 and when a player wins the championship in the tournament, the player can participate in a free game in which the player competes with the server device 2 in the center. The case of the server device 2 having a shape of a monster enhances the effect of a rendering and provides the effect to raise the challenging spirit of a player.

FIG. 3 is a block diagram showing an electrical configuration of the server device 2. In the server device 2, the CPU 2a reads out data from the RAM 2b and the ROM 2c or writes data into the RAM 2b. Then, a control operation is performed in accordance with a program set in advance. In the ROM 2c, in addition to a control program for controlling the action of the game machine 1, data of the symbols that can be displayed on the reels, data representing each monster, and various kinds of tables (the arrangement of the symbols configuring the reel band as shown in FIG. 7) corresponding to the data representing each monster are stored as shown in FIG. 6 and FIG. 7, and these are read out and used as the need arises. The data representing each monster is displayed as a card until it is selected by a player.

The random number generation circuit 2e generates fixed random numbers. Data relating to images is output to the display unit 2g consisting of, for example, a liquid crystal display device, via the display unit control circuit 2f that performs image processing etc. On the display unit 2g, letters, still images, motion videos, etc., are displayed. It is not necessarily required for the server device 2 to have the display unit 2g. Data relating to audios is output from the CPU 2a to the loudspeaker 2i via the audio control unit 2h that performs audio processing, amplification, etc. The respective components perform transmission and reception of data to each other via the control bus 2n. Then, the server device 2 performs transmission and reception with each of the client devices 3-1 to 3-n via the input-output interface 2j and the bus N.

FIG. 4 is a block diagram showing an electrical configuration of the client device 3. The token discrimination device 3a judges whether or not a token is proper and the payout token counter 3b counts the number of tokens to be paid. The operation unit 3c comprises a plurality of operation buttons, a start button, etc., and inputs a signal when a player operates these operation buttons and the start button. The token payout device 3d performs payout of tokens. Data relating to images is output to the display unit 3f consisting of, for example, a liquid crystal display device, via the display unit control circuit 3e that performs image processing etc. On the display unit 3f, letters, still images, motion videos, etc., are displayed. For example, images as shown in FIG. 5 are displayed. Data relating to audios is output to the loudspeaker 3h via the audio control unit 3g that performs audio processing, amplification, etc. The respective components perform transmission and reception of data to each other via the control bus 3n while being controlled by the CPU 3i. The CPU 3i reads out data from the RAM 3j and the ROM 3k or writes data into the RAM 3j. Then, a control operation is performed in accordance with a program set in advance. In the ROM 3k, a program for controlling image display, a program for controlling audios, etc., are stored and these are read out and used as the need arises. The random number generation circuit 3m generates fixed random numbers. The client device 3 performs transmission and reception of data with the server device 2 via the input-output interface 3p.

The display unit 2g and the display unit 3f configure a display unit and the RAM 2b or the ROM 2c configures a storage unit. Further, the operation unit 3c configures an operation unit and an extraction unit, and the CPU 2a, the RAM 2b, and the ROM 2c configure a party forming unit and a game performing unit.

FIG. 5 is a diagram showing an example of a screen displayed on the display unit 3f of the client device 3. In the center of the screen 40, the three reels 41a to 41c that display a plurality of kinds of symbol in the varying or halted state are displayed. On the right end of the screen 40, the sub screen 42 that displays the state of the reels of the opponent in a competition is displayed. With the present game machine, a player can select the card of a monster by operating the operation buttons on the operation unit 3c. Then, the player associates the cards of a monster arbitrarily selected with each of the reels 41a to 41c. This operation may be performed by the player following guidance. For example, a message "which monster you select as a boss?" or a message "which monster you use for the first reel?" is displayed and at the same time, cards of a plurality of monsters are displayed on the screen. Then, the card of a monster can be determined in accordance with the operation using the operation buttons and when a "determination button (enter key)" is operated, the selected monster is associated with the reel.

In the area 43a on the left side of the screen 40, the monster 43b associated with the center reel 41b is displayed among the three monsters selected by the player. The name of the monster 43b is displayed on the name display area 43c provided below the reels 41a to 41c. The physical strength value of the monster 43b is displayed by the bar graph 43d. On the other hand, in the area 44a on the right side of the screen 40, the monster 44b associated with the center reel on the opponent side is displayed among the three monsters selected by another player, who will be the opponent in the competition, or the computer. The name of the monster 44b is displayed on the name display area 44c provided below the sub screen 42. The physical strength value of the monster 44b is displayed by the bar graph 44d.

In the dividend list 45, a dividend to be paid to a player is displayed in accordance with a sequence realized by a combination of symbols displayed on the respective reels 41a to 41c. Normally, when the respective symbols are displayed in the halted state on the respective reels 41a to 41c after displayed in the varying state, a rendering is performed by an animation in which the monster 43b and the monster 44b fight with each other on the top portion of the screen 40. For example, in the case of the offensive, an animation is displayed in which the monster hits, kicks, bites, etc., the opponent. An animation in which the monster blows a flame against the opponent etc. may be displayed. Further, the image of the monster may be changed in accordance with the property of the monster on the offensive side. For example, in the case of a two-footed monster, an animation in which the monster stamps, kicks the opponent, etc., is displayed. In the case of a monster with a motif of wild beasts, an animation in which the monster roars out, shows its teeth, etc., is displayed. In this manner, by changing the images of the scene of the offensive by the monster and the monster itself, it is made possible to make clear the offensive type, the property of the monster, etc. Further, the image display is prevented from becoming monotonous and it is made possible to perform an effective rendering. As a result, it is possible to impress a player with the scene of the offensive. Furthermore, when attacked by the opponent, the physical strength value of the monster decreases and at this time, it may also be possible to change the image of the monster. In other words, when the physical strength value of the attacked monster decreases, the scene in which the monster is injured and writhes in agony is displayed in an animation. Due to this, it is possible to make clear the offensive received and reduction in physical strength value. However, when a special offensive is carried out, a rendering by an effect animation using the entire screen 40 is displayed. For example, an animation in which a monster moves around on the entire screen 40, the size of a monster is increased, etc., is displayed. At this time, it may also be possible to change the color, to display flashing, or to display the image of lighting.

As shown in FIG. 6, there exist many kinds of symbol to be displayed on the respective reels 41a to 41c. In FIG. 6, the symbols 51a to 51c are those for carrying out a physical offensive. When certain symbols align in a line (prize-deserving line), the monster 43b selected by the player carries out a physical offensive against the opponent monster 44b. By the way, the fighting power is that of a symbol with the lowest level. The symbols 52a to 52c are those for carrying out a fire offensive. When certain symbols align in a line, the monster 43b carries out a fire offensive against the opponent monster 44b. By the way, the fighting power is that of a symbol with the lowest level. The symbols 53a to 53c are those for carrying out a magic offensive. When certain symbols align in a line, the monster 43b carries out a magic offensive against the opponent monster 44b. By the way, the fighting power is that of a symbol with the lowest level.

The symbol 54 is one for carrying out a multiple offensive. When the symbols 54 align in a line, the monster 43b carries out a physical offensive, a fire offensive, and a magic offensive simultaneously against the opponent monster 44b. At this time, each offensive is carried out with the fighting power supposed to be level 1. The level of the fighting power indicates the degree that the physical strength value of the opponent monster can be decreased and when the numeric value is large, it is possible to decrease the physical strength value of the opponent monster more. Further, it is possible for the symbol 54 to perform the same function as that of the symbol of a physical offensive, a fire offensive, or a magic offensive with level 1, that is, the symbol 51a, the symbol 52a, and the symbol 53a. The symbol 55 is one for restoring the physical strength. When the symbols 55 align in a line the physical strength value of the monster 43b is restored by a fixed numeric value. The symbol 56 is a wild symbol. The symbol 56 has a function of being replaced with any symbol except that of a monster. When the symbols align in a line, a free game starts, which can be started without betting. The symbols 57 to 59 are those representing the respective monsters. When one or more (three in total) monsters are revealed on the respective three reels 41a to 41c, the respective monsters' favorite tricks are displayed on the screen the player can put it into action by selecting one of the tricks according to the guidance on the screen. The favorite trick that can be put into action differs depending on the kind of a monster.

In the game machine according to the present embodiment, the level, favorite trick, reel property, and BET fee are determined for each monster. As shown in FIG. 7(A) to FIG. 7(C), these are displayed on the cards 60 to 62 representing monsters. The level represents the degree of the ability of the monster. The physical strength value is a value that determines the initial physical strength of the monster. The favorite trick is an attribute of the offensive that the monster has and can be increased or decreased. The reel property is determined by the ratio between the numbers of symbols representing a physical offensive, those representing a fire offensive, and those representing a magic offensive in the reel band. The bet fee is the number of BETs required to use the monster in a game. The BET fee differs from monster to monster and a monster with a higher level has a higher probability that the player will win, therefore, the BET fee is higher.

In the game machine according to the present embodiment, monsters configuring a reel band differ depending on the kind of monster. In other words, a table used as a reel band includes data of a plurality of kinds of symbol and differs from monster to monster. For example, as shown in FIG. 7(A), on a table corresponding to a monster called "Geropy", the symbols 51a representing a physical offensive and the symbols 52a representing a fire offensive are large in number, therefore, the offensive power is not high. In other words, even if the symbols align in a line, the degree that the physical strength value of the opponent monster can be decreased is low. On the other hand, the table is abundant in symbols 55 that restore the physical strength value by 30, therefore, the monster has many chances to recover even if attacked. As shown in FIG. 7(B), a table corresponding to a monster called "Demon" includes many symbols 51a and 51b representing a physical offensive and many symbols 53a to 53c representing a magic offensive, therefore, the offensive power is high. In other words, when the symbols align in a line, the degree that the physical strength value of the opponent monster can be decreased is high. As shown in FIG. 7(C), a table corresponding to a monster called "Bluedragon" includes many symbols 52a to 52c representing a fire offensive and also includes the two wild symbols 56, therefore, the offensive power is high. In other words, when the symbols align in a line, the degree that the physical strength value of the opponent monster can be decreased is high. As described above, the table specific to the respective monsters are stored in the ROM 2c and function as reel bands when associated with respective reels by a player.

As described above, a table includes a monster or data relating to the action of the monster, therefore, the monster selected by a player or the symbol relating to the monster is displayed in the varying or halted state. When the monster selected by the player or the symbol relating to the monster is displayed in the halted state, the monster takes the action of the offensive relating to the symbol, therefore, it is possible to inform the player in advance of the action of the monster by means of the display of the above-mentioned symbol in the halted state. For example, when the monster selected as above is "Bluedragon", the symbol representing Bluedragon and the symbol representing the favorite offensive of Bluedragon are included on the table, therefore, when a prize-deserving sequence due to the symbols is realized, it is possible to impress the player that a prize-deserving sequence specific to Bluedragon is realized by displaying an animation in which the offensive action specific to Bluedragon is taken.

Next, the operation of the game machine according to the present embodiment is explained. First, in the Short play, it is assumed that a party is composed of three of the same monsters. Therefore, the three reels display symbols based on the same table. Since the table includes only one kind of symbol for performing the favorite trick of the monster, it is possible for the monster to perform only one favorite trick. As a monster of a player, any one of monsters with the lowest level (for example, level 1) is selected. If the player loses a game, a monster is selected again by lottery. As a monster to be an opponent to the player, any one of monsters with a level slightly higher than the lowest level (for example, level 2) is selected in the first round. Then, in the second round, any one of monsters with, for example, level 3 is selected, and in the third round, any one of monsters with a still higher level, for example, level 4 is selected. After preparations are made, when a start button is operated, the reels rotate and if a predetermined combination of symbols appears, damage is given to the monster of the opponent (computer, here) and a dividend is paid. Each time the opponent monster is defeated, the player gains a victory bonus (for example, a credit of ten tokens) and if the player wins three consecutive games, it is made possible to play the Jackpot game. In the Jackpot game, the same monster appears at all times.

Next, the Mission is explained. In Mission 1, a player plays one battle game with an opponent. After paying a challenging fee (for example, three BETs), the player determines members configuring a party while observing the boss (monster) of the opponent. The boss is a monster associated with the center reel and plays the leading role of the party and its character determines the policy of strategy. "Members" are monsters to be associated with the right reel and the left reel and configure the party together with the boss. During the battle, a credit is bet and a game to gain (WIN) the credit is played. The player first initiates an offensive and if the player wins, it is possible to gain a monster. In other words, data representing the monster is output to the RAM 2b. The monster the player gains is any one of the three opponent monsters. Further, the player gains one life and the magic point (5 MP). On the other hand, if defeated, the life of any one of the monsters in the party is decreased by one. The monster is selected at random.

In Mission 2, a player plays two battle games with an opponent. The order of the battle is the same as that in Mission 1 and two game are played with the same party. After paying a challenging fee (for example, four BETs), the player determines members configuring a party while observing the boss (monster) of the opponent. If the player wins the first game, the player gains any one of the three opponent monsters (two lives) and plays the second game. If the player loses the first game, the game is over. If the player wins the second game, the player becomes "Clear" and gains one more monster and the bonus magic point, for example, 10 MP. On the other hand, if defeated, the life of any one of the monsters in the party is decreased by one. The monster is selected at random.

In Mission 3, a player plays three battle games with an opponent. A party is composed of a boss and four members. By the way, a system is employed, in which a member (monster) once used is retreated into a monster holder. In other words, it is assumed that a monster selected as a member can be used only once, a monster selected as a boss is fixed, and a monster gained from the opponent can be used. As described above, a member (monster) used once is retreated into the monster holder, therefore, a monster once used in a battle cannot be used any longer. Due to this, the level of difficulty in forming a party is increased and it is made possible to excite a player's desire to win the game to gain a monster from the opponent. If the player wins three consecutive games, the player becomes "Clear" and gains the bonus magic point.

In the first round, the player selects three monsters from the party to form a battle team and fights a battle. If the player wins the game, the player gains any one of the three monsters of the opponent (three lives). On the other hand, if defeated, the game is over at this point and the life of any one of monsters in the party is decreased by one. The monster is selected at random. In the second round, the player selects two members (monsters) from among the party consisting of the members (monsters) excluding the members used in the first round and the monster gained from the opponent and added to the party, forms a battle team, and fights a battle. If the player wins the game, the player gains any one of the three monsters of the opponent (three lives). On the other hand, if defeated, the game is over at this point and the life of anyone of monsters in the party is decreased by one. The monster is selected at random. In the third round, the player forms a battle team from the three monsters, that is the members left to the last and the monster gained from the opponent, and fights a battle. If the player wins the game, the player gains any one of the monsters of the opponent (three lives) and the bonus magic point (20 MP). On the other hand, if defeated, the game is over at this point and the life of any one of monsters in the party is decreased by one.

As described above, a party is newly formed using the gained monster when the next game is played, therefore, the more times the player win the game, the player's monsters increase in number to diversify the party configurations, and it is made possible for the games to have a higher strategic characteristic.

Next, in the Tournament, respective players form respective parties of their own and play tournament games. This is a game in which only players who have a specified magic point determined in advance can participate. The game proceeds in such a way that after paying a tournament participation fee on credit, a player bets the magic point and tries to win the magic point. Therefore, it is acceptable that the magic point becomes zero or negative. In the Tournament, a player wins the first prize if the player wins three consecutive games. At first, a player has seven monsters and the monster used once is moved to the monster holder and confined therein. Therefore, the monster cannot be used in the next and following games. However, if a player wins a competition, the player can gain a monster and use the gained monster in the next and following games. Therefore, if a player wins three consecutive games, the player will use up all the monsters including the gained monster as a result. On the other hand, if defeated in the competition, the life of a monster in the party is decreased. A player can make only one party participate in a game. By the way, if the number of players who participate in the Tournament is less than the number of players who can participate, a computer functions as a participant. A player who wins the championship in the Tournament can challenge the Jackpot game, which is a free game.

FIG. 8 is a flow chart showing a specific flow of the Tournament game. First, after betting the required number of BETs, a player determines a battle team (party) (step S1). Here, as shown in FIG. 9(A), a monster to be associated with the center reel is determined. The monster will be the "boss" and plays the leading role in the party and the policy of strategy is determined by its character. For example, as shown in the figure, a player on the left side tries to set a monster having a high recuperative power and good at a fight of attrition as the boss. A player on the right side tries to set a monster as the boss, which monster has a high magic offensive power, that is, with which monster, the degree is large that the physical strength value of the opponent monster is decreased when the symbols 53*a* to 53*c* for carrying out a magic offensive align in a line, or which monster corresponds to the reel including many symbols 53*a* to 53*c* on the table, or which monster corresponds to the reel including many symbols 53*c* in particular. Next, monsters to be associated with the right reel and the left reel are determined. These monsters configure the party as the "members". At this stage, the opponent boss can be recognized by each other, therefore, each player determines monsters as members while estimating the opponent's strategy. For example, as shown in FIG. 9(B), the player on the left side observes the opponent boss and judges that the boss is a monster vulnerable to a flame (a fire offensive), that is, the degree is large that the physical strength value is decreased when the symbols 52*a* to 52*c* for carrying out a fire offensive align on the player's side. The player on the right side tries to add a monster to the party, which monster is well-defended against a fire offensive, that is, with which monster, the degree is small that the physical strength value is decreased when the symbols 52*a* to 52*c* for carrying out a fire offensive align in a line on the opponent side, because the boss monster of the player is vulnerable to a fire offensive. Since the game has two objects, one is to defeat the opponent in the competition and the other is to increase the number of tokens, selection of a monster (card) to be associated with a reel affects achievement of both the objects. In the present game machine, when a monster is associated with a reel, a dividend list is displayed in a real time manner. Therefore, it is possible for a player to select a monster to be associated with a reel from a strategic standpoint while comparing the reel property and the dividend list. The total value of the physical strength values of the three monsters configuring the party is set as an initial physical strength of the party. When all of the monsters are associated with the reels, dividend list data is generated and displayed as a dividend list on the screen 40.

Next, each player rotates the reels by turns and carries out an offensive against the opponent party. When a player carries out an offensive (step S2), the player judges whether or not the opponent is defeated (step S3). In other words, the player judges whether or not the physical strength value of the opponent monster can be decreased to zero. For example, as shown in FIG. 9(C), a fire offensive is being carried out against the party of the player on the right side because the symbols of fire offensive align in a line in the party of the player on the left side. When the opponent is defeated, the player is the winner in the battle (step S4). If the opponent is not defeated, then the opponent carries out an offensive (step S5). When attacked by the opponent, the physical strength value of the party of the player decreases, therefore, it is judged whether or not the physical strength value of the party of the player still remains (step S6). Then, when the physical strength value of the party of the player still remains, the next step will be step S2, where the player carries out an offensive. On the other hand, in step S6, when no physical strength value of the party of the player remains, the player is the loser (step S7).

When the player on the left side wins as a result of the battle described above, as shown in FIG. 9(D), the player receives a bonus dividend, that is, a predetermined number of credits to be given to the winner in a battle and gains any one of the opponent monsters. In other words, data representing the monster and its life is added to the player side and written into a memory. Then, it is made possible to play a game again using the data representing the monster and its life. Further, the player gains the above-mentioned magic point (for example, 10 MP). On the other hand, on the defeated player side on the right side, the lives of all the monsters in the party decrease by one.

Here, there is a fixed correspondence between the life value of the monster that the player on the left side has gained and the life value each monster configuring the party of the player on the right side has lost. For example, when the monster that the player on the left side has gained is a strong monster, its life value is decreased and on the other hand, when the monster that the player on the left side has gained is a weak monster, its life value is increased. In other words, the number of lives the loser side in the competition loses is equivalent to the monster and the number of lives input to the winner side in the competition, therefore, it is made possible to keep constant a payout rate to be set.

By the way, it may also be possible to cause any one of monsters configuring the party to become extinct when defeated in the competition. In this case also, the monster and its life that the winner side in the competition gains is assumed to be approximately equivalent to the monster that has become extinct. Due to this, it is made possible to keep almost constant the total of the game values. Due to this, even if many players participate in a game and have a competition, it is unlikely that the value of a character or the value of a game increases or decreases, and it is possible to attract the interest of a player continuously. For example, when the number of lives that a monster that has become extinct on the loser side in the competition is three, then the number of lives of the monster that the winner side in the battle is set to three. Further, it may also be possible to set so that the winner side gains a monster different from the monster that has become extinct on the lower side in the competition. In this case, the winner side gains a monster and its life equivalent to the monster that has become extinct and its life. For example, when a monster having a very high fighting ability becomes extinct on the loser side and its number of lives is 1, it may also be possible to set the number of lives of a monster that the winner side gains to five although it has a low fighting ability.

The operation characteristic to the present invention is performed by causing a computer to execute a game program. In other words, the game program is a game program for playing a multiplayer competition game in which two or more players try to fight to gain characters and characterized by causing a computer to read and convert a series of processes into executable commands, which processes include: a process for performing transmission and reception of data with another game machine or server device; a process for inputting a signal based on the input operation of a player; a process for producing a display relating to the game; a process for storing data representing a plurality of kinds of character given different characteristics, respectively, and the remaining number of times available; a process for extracting the data representing the predetermined number of characters and the remaining number of times available from the data representing the plurality of kinds of character and the remaining number of times available with the player's selecting operation as a trigger; a process for forming data representing the party composed of the respective characters by combining the extracted data representing the plurality of kinds of character and the remaining number of times available; a process for performing the game using the data representing the formed party and the data representing the party input from the other game machine; and a process for adding the data representing any one of the characters configuring the defeated party of the other game machine or the server device and the remaining number of times available when the other game machine or server device is defeated as a result of the competition.

As described above, a party is formed by a plurality of characters and a multiplayer competition game is played with the party, therefore, the configuration of the party will affect the result of the game, that is, determine the winner and the loser. As a result, it is possible to realize a multiplayer competition game having a high strategic characteristic. If a player wins a competition, data representing any one of the characters configuring the party on the defeated side in the competition and the remaining number of times available is added, therefore, the player on the victory side can get a new character. Due to this, it is possible to play a multiplayer competition game in which players try to fight to gain characters. By the way, on the defeated side in the competition, it may also be possible to reduce the remaining number of times available of each character or change nothing. Further, it may also be possible to cause the data representing any one of the characters and the remaining number of times available to become extinct. Due to this, the meaning of the action to fight to gain characters is further enhanced.

The above-mentioned program is available in a state of being recorded in a recording medium such as CD-ROM and DVD. Further such a program is available by receiving signals transmitted by a computer, that is, a transmitter, via a transmission medium such as a communication network consisting of public telephone lines, private telephone lines, cable TV lines, radio communication lines, etc., configuring a network. The signals are computer data signals embodied in a predetermined carrier including a program. At the time of the transmission, it is only necessary to transmit at least part of the program in the transmission medium. In other words, it is not necessary for all the data configuring the above-mentioned program to present in the transmission medium at a time. Transmission methods for transmitting a program from the computer include continuous transmission of the data configuring the program and intermittent transmission thereof.

REFERENCE NUMERAL 1 game machine
2 server device
2a CPU
2b RAM
2c ROM
2e random number generation circuit
2f display unit control circuit
2g display unit
2h audio control unit
2i loudspeaker
2j input-output interface
2n control bus N bus
3 client device
3a token discrimination device
3b payout token counter
3c operation unit
3d token payout device
3e display unit control circuit
3f display unit
3g audio control unit
3h loudspeaker
3i CPU
3j RAM
3k ROM
3m random number generation circuit
3n control bus
3p input-output interface
40 screen
41a-41c reel
42 sub-window
43a area
43b monster
43c name display area
43d bar graph
44a area
44b monster
44c name display area
44d bar graph
45 dividend list
51a-51c symbol
52a-52c symbol
53a-53c symbol
54-59 various symbols
60-62 card representing a monsters
70 display unit
70a physical strength value display area
70b character image display area
70c offensive selection image display area
71 player manipulator
72 physical strength value
73 offensive selector
74 physical strength value calculator
75 physical strength value display controller
76 winner/loser determinator
77 character image display controller
77a character image storage
78 offensive selection image display controller
78a storage
78b offensive selection display controller
79 character property
80 character data storage
90 dividend list

The invention claimed is:

1. A game system comprising a plurality of client devices and a server device which transmits and receives data to and from each of said client devices, and performing a multiplayer competition game in which a plurality of players compete for characters, wherein
each of said client devices comprises:
an operation unit with which a player performs input operation of signals; and
a display unit for displaying a situation of the game;
said server device comprises:
a storage unit for storing data representing a plurality of types of characters, each of which has been input by each of said client devices and provided with a different property and a remaining number of times available for use of said characters in formation of a party;

an extraction unit for extracting, triggered by the player's selecting operation at each of said client devices, data representing a predetermined number of characters and their remaining number of times available for use in formation of a party from the data representing said plurality of types of characters and their remaining number of times available for use in formation of a party;

a party formation unit for generating, for each of said client devices, data representing a party consisting of each of said selected characters, by combining the data representing said extracted characters and their remaining number of times available for use in formation of a party; and a game performing unit for performing the multiplayer competition game in which an offensive of one party causes a total physical strength value of the other party to become a value equal to or lower than a predetermined value and thereby determines a winner and a loser between the plurality of client devices, using said data representing said formed party, wherein said game performing unit transfers the data which is stored in association with said client device of a side defeated in said competition and which represents any one of the characters configuring said party, together with its remaining number of times available for use in formation of a party, and stores said data and said remaining number of times available for use in formation of a party in association with said client device of the side which won said competition, said transferred character having a physical strength value that decreases when receiving an offensive for each of said transferred remaining number of times available for use in formation of a party, wherein the remaining number of times available of the character configuring said party is decreased by a certain number if it is defeated in said competition, whereas the character and its remaining number of times available added to the side which won said competition is approximately equal to said decreased number of times available of the character.

2. A game machine which performs a multiplayer competition game in which a plurality of players compete with each other for capturing characters, comprising:

a communication interface for transmitting and receiving data to and from another game machine or server device;

an operation unit with which a player performs input operation of signals; and a display unit for displaying the situation of the game;

a storage unit for storing data representing a plurality of types of characters, each provided with a different property, and a remaining numbers of times available for use of said characters in formation of a party;

an extraction unit for extracting, triggered by the player's selecting operation, data representing a predetermined number of characters and their remaining number of times available for use in formation of a party from the data representing said plurality of types of characters and their remaining number of times available for use in formation of a party;

a party formation unit for generating data representing a party consisting of each of said selected characters, by combining the data representing said extracted characters and their remaining number of times available for use in formation of a party; and a game performing unit for performing the multiplayer competition game in which an offensive of one party causes a total physical strength value of the other party to become a value equal to or lower than a predetermined value and thereby determines a winner and a loser, using said data representing said formed party, and data representing the party input from said another game machine, wherein when, as a result of said competition, said another game machine or server device is defeated in the game, said game performing unit transfers the data representing any one of the characters configuring said party stored in said another game machine or server device which is defeated in said competition, together with its remaining number of times available for use in formation of a party, and stores said data and said remaining number of times available for use in formation of a party in said storage unit, said transferred character having a physical strength value that decreases when receiving an offensive for each of said transferred remaining number of times available for use in formation of a party, wherein the remaining number of times available of the character configuring said party is decreased by a certain number if it is defeated in said competition, whereas the character and its remaining number of times available added to the side which won said competition is approximately equal to said decreased number of times available of the character.

3. The game system according to claim 1, wherein the data representing any one of the characters configuring said party is deleted upon losing said competition, whereas the character and its remaining number of times available added to the side which won said competition are approximately equal to said deleted character.

4. The game system according to claim 1, wherein said party formation unit newly generates, when performing the next game, data representing said party, using the data representing said character and its remaining number of times available for use in formation of a party.

5. The game system according to claim 1, wherein said extraction unit disables, at the next and subsequent games, extraction of at least one of the data representing the character and its remaining number of times available for use in formation of a party, which together compose the data representing the party used when performing said game.

6. The game system according to claim 1, wherein said storage unit stores a plurality of types of tables including data representing a plurality of types of characters, each of which is provided with a different property, and data of a plurality of types of symbols which are determined in association with the data representing each of said characters and can be displayed on said display areas, said party formation unit associates, for each of display areas, said data representing said characters, said display unit reads said table corresponding to the data representing said characters, and performs, on said display areas associated with the data representing said characters, a varying state presentation in which a plurality of symbols having been in their halted state on a plurality of display areas are constantly varied into a variety of symbols and displayed, and a halted state presentation in which said symbols being presented in the varying state are halted again and displayed on each of said display areas.

7. A game program embodied in a non-transitory tangible medium for making a communicable game machine perform a multiplayer competition game in which a plurality of players compete for characters, and causes a computer to read and convert a series of processes into executable commands, said processes comprising:

a process for transmitting and receiving data to and from another game machine or server device, a process for inputting signals based on the player's input operation;

a process for displaying a situation of the game;

a process for storing data representing a plurality of types of characters, each provided with a different property, and a remaining numbers of times available for use of said characters in formation of a party;

a process for extracting, triggered by the player's selecting operation, data representing a predetermined number of characters and their remaining number of times available for use in formation of a party from the data representing said plurality of types of characters and their remaining number of times available for use in formation of a party;

a process for generating data representing a party consisting of each of said selected characters, by combining the data representing said extracted characters and their remaining number of times available for use in formation of a party;

a process for performing the multiplayer competition game in which an offensive of one party causes a total physical strength value of the other party to become a value equal to or lower than a predetermined value and thereby determines a winner and a loser, using said data representing said formed party, and data representing the party input from said another game machine, and a process for transferring, when, as a result of said game being performed, said another game machine or server device is defeated in the game, the data representing any one of the characters configuring said party stored in said another game machine or server device which loses the competition, together with its remaining number of times available for use in formation of a party and storing said data and said remaining number of times available for use in formation of a party in said game machine, said transferred character having a physical strength value that decreases when receiving an offensive for each of said transferred remaining number of times available for use in formation of a party, wherein the remaining number of times available of the character configuring said party is decreased by a certain number if it is defeated in said competition, whereas the character and its remaining number of times available added to the side which won said competition is approximately equal to said decreased number of times available of the character.

* * * * *